United States Patent
Kramme et al.

(10) Patent No.: US 10,832,248 B1
(45) Date of Patent: Nov. 10, 2020

(54) REDUCING FALSE POSITIVES USING CUSTOMER DATA AND MACHINE LEARNING

(71) Applicant: STATE FARM MUTUAL AUTOMOBILE INSURANCE COMPANY, Bloomington, IL (US)

(72) Inventors: Timothy Kramme, Parker, TX (US); Elizabeth Flowers, Bloomington, IL (US); Reena Batra, Alpharetta, GA (US); Miriam Valero, Bloomington, IL (US); Puneit Dua, Bloomington, IL (US); Shanna L. Phillips, Bloomington, IL (US); Russell Ruestman, Minonk, IL (US); Bradley A. Craig, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 103 days.

(21) Appl. No.: 15/465,827

(22) Filed: Mar. 22, 2017

Related U.S. Application Data

(60) Provisional application No. 62/365,699, filed on Jul. 22, 2016, provisional application No. 62/331,530, (Continued)

(51) Int. Cl.
  *G06Q 20/40* (2012.01)
  *G06Q 20/32* (2012.01)
(52) U.S. Cl.
  CPC ..... *G06Q 20/4016* (2013.01); *G06Q 20/3224* (2013.01)

(58) Field of Classification Search
  CPC .................................................. G06Q 20/4016
  See application file for complete search history.

(56) References Cited

U.S. PATENT DOCUMENTS 5,467,341 A * 11/1995 Matsukane ........... H04L 1/1887
  370/253
5,708,422 A    1/1998 Blonder et al.
  (Continued)

OTHER PUBLICATIONS

Expert System, "Definition of Machine Learning", expertsystem.com/machine-learning-definition, Mar. 7, 2017 (Year: 2017).*
(Continued)

*Primary Examiner* — Scott C Anderson
(74) *Attorney, Agent, or Firm* — Lee & Hayes, P.C.

(57) ABSTRACT

A method of detecting whether electronic fraud alerts are false positives includes receiving data detailing a financial transaction, inputting the data into a rules-based engine that determines whether to generate an electronic fraud alert for the financial transaction based upon the data, and, when an electronic fraud alert is generated, inputting the data into a machine learning program trained to identify one or more facts indicated by the data. The method may also include determining whether the identified facts can be verified by customer data and, in response to determining that the facts can be verified, retrieving or receiving first customer data. The method may further include verifying that the electronic fraud alert is not a false positive based upon analysis of the first customer data, and transmitting the verified electronic fraud alert to a mobile device of the customer to alert the customer to fraudulent activity.

20 Claims, 20 Drawing Sheets

Related U.S. Application Data filed on May 4, 2016, provisional application No. 62/318,423, filed on Apr. 5, 2016, provisional application No. 62/313,196, filed on Mar. 25, 2016.

(56) References Cited

U.S. PATENT DOCUMENTS

| | | |
|---|---|---|
| 5,748,780 A | 5/1998 | Stolfo |
| 5,774,882 A | 6/1998 | Keen et al. |
| 5,819,226 A | 10/1998 | Gopinathan et al. |
| 5,825,863 A | 10/1998 | Walker |
| 5,862,183 A | 1/1999 | Lazaridis et al. |
| 6,018,723 A | 1/2000 | Siegel et al. |
| 6,094,643 A | 7/2000 | Anderson et al. |
| 6,119,103 A | 9/2000 | Basch et al. |
| 6,170,744 B1 | 1/2001 | Lee et al. |
| 6,215,358 B1 * | 4/2001 | Hon .......... H03F 1/306 |
| | | 330/289 |
| 6,269,169 B1 | 7/2001 | Funk et al. |
| 6,301,579 B1 * | 10/2001 | Becker .......... G06F 16/283 |
| 6,437,812 B1 | 8/2002 | Giles et al. |
| 6,839,682 B1 | 1/2005 | Blume et al. |
| 6,948,656 B2 | 9/2005 | Williams |
| 7,251,624 B1 | 7/2007 | Lee et al. |
| 7,377,425 B1 | 5/2008 | Ma et al. |
| 7,428,984 B1 | 9/2008 | Crews et al. |
| 7,494,052 B1 | 2/2009 | Carpenter et al. |
| 7,548,886 B2 | 6/2009 | Kirkland et al. |
| 7,552,865 B2 | 6/2009 | Varadarajan |
| 7,707,108 B2 | 4/2010 | Brown et al. |
| 7,735,721 B1 | 6/2010 | Ma et al. |
| 7,788,195 B1 | 8/2010 | Subramanian et al. |
| 7,849,029 B2 | 12/2010 | Crooks et al. |
| 7,857,212 B1 | 12/2010 | Matthews |
| 7,865,427 B2 | 1/2011 | Wright et al. |
| 7,870,078 B2 | 1/2011 | Clark et al. |
| 7,962,418 B1 | 6/2011 | Wei et al. |
| 8,073,691 B2 | 12/2011 | Rajakumar |
| 8,078,515 B2 | 12/2011 | John |
| 8,145,561 B1 | 3/2012 | Zhu |
| 8,162,125 B1 | 4/2012 | Csulits et al. |
| 8,306,889 B2 | 11/2012 | Leibon et al. |
| 8,352,315 B2 | 1/2013 | Faith et al. |
| 8,380,629 B2 | 2/2013 | Carlson et al. |
| 8,413,234 B1 | 4/2013 | Zang et al. |
| 8,458,069 B2 | 6/2013 | Adjaoute |
| 8,478,688 B1 | 7/2013 | Villa et al. |
| 8,478,692 B2 | 7/2013 | Carlson et al. |
| 8,484,132 B1 | 7/2013 | Christiansen et al. |
| 8,650,080 B2 | 2/2014 | O'Connell et al. |
| 8,666,841 B1 | 3/2014 | Claridge et al. |
| 8,712,912 B2 | 4/2014 | Carlson et al. |
| 8,748,688 B1 | 6/2014 | Miller et al. |
| 8,748,692 B2 | 6/2014 | Suzuki |
| 8,773,564 B2 | 7/2014 | Parks |
| 8,805,737 B1 | 8/2014 | Chen et al. |
| 8,983,868 B1 | 3/2015 | Sehrer |
| 9,148,869 B2 | 9/2015 | Van Heerden et al. |
| 9,213,990 B2 | 12/2015 | Adjaoute |
| 9,286,618 B2 | 3/2016 | Lo Faro et al. |
| 9,330,416 B1 | 5/2016 | Zaslavsky et al. |
| 9,367,843 B2 | 6/2016 | Jurss |
| 9,392,008 B1 | 7/2016 | Michel et al. |
| 9,472,194 B2 | 10/2016 | Jones |
| 9,483,765 B2 | 11/2016 | Sahadevan et al. |
| 9,519,903 B2 | 12/2016 | Kannan et al. |
| 9,569,767 B1 | 2/2017 | Lewis et al. |
| 9,607,318 B1 | 3/2017 | Gerchikov et al. |
| 9,691,066 B2 | 6/2017 | McGuinness et al. |
| 9,721,253 B2 | 8/2017 | Gideoni et al. |
| 9,779,403 B2 | 10/2017 | Ranganath |
| 9,818,105 B2 | 11/2017 | Jung et al. |
| 9,858,575 B2 | 1/2018 | Meredith et al. |
| 9,883,040 B2 | 1/2018 | Strong et al. |
| 9,916,606 B2 | 3/2018 | Stroh |
| 9,934,498 B2 | 4/2018 | Jung et al. |
| 9,947,055 B1 | 4/2018 | Roumeliotis |
| 9,953,326 B2 | 4/2018 | Plymouth et al. |
| 10,013,646 B2 | 7/2018 | Ching |
| 10,037,532 B2 | 7/2018 | Birukov et al. |
| 10,043,071 B1 | 8/2018 | Wu |
| 10,373,140 B1 | 8/2019 | Chang et al. |
| 10,565,585 B2 | 2/2020 | Sharan et al. |
| 2002/0099649 A1 | 7/2002 | Lee et al. |
| 2002/0133721 A1 * | 9/2002 | Adjaoute .......... G06Q 20/04 |
| | | 726/23 |
| 2002/0147694 A1 | 10/2002 | Dempsey et al. |
| 2002/0169717 A1 | 11/2002 | Challener |
| 2003/0033228 A1 * | 2/2003 | Bosworth-Davies .......... |
| | | G06Q 20/04 |
| | | 705/35 |
| 2003/0144952 A1 | 7/2003 | Brown et al. |
| 2003/0172036 A1 | 9/2003 | Feigenbaum |
| 2003/0182194 A1 | 9/2003 | Choey et al. |
| 2004/0085195 A1 | 5/2004 | McKibbon |
| 2004/0254868 A1 | 12/2004 | Kirkland et al. |
| 2005/0097046 A1 | 5/2005 | Singfield |
| 2005/0097051 A1 | 5/2005 | Madill, Jr. et al. |
| 2005/0154676 A1 | 7/2005 | Ronning et al. |
| 2005/0182712 A1 | 8/2005 | Angell |
| 2005/0188349 A1 | 8/2005 | Bent et al. |
| 2006/0041464 A1 | 2/2006 | Powers et al. |
| 2006/0041506 A1 | 2/2006 | Mason et al. |
| 2006/0041508 A1 | 2/2006 | Pham et al. |
| 2006/0065717 A1 | 3/2006 | Hurwitz et al. |
| 2006/0282660 A1 | 12/2006 | Varghese et al. |
| 2007/0094137 A1 | 4/2007 | Phillips et al. |
| 2007/0100773 A1 | 5/2007 | Wallach |
| 2007/0106582 A1 | 5/2007 | Baker et al. |
| 2007/0179840 A1 | 8/2007 | Jain |
| 2007/0192240 A1 | 8/2007 | Crooks |
| 2007/0226095 A1 | 9/2007 | Petriuc |
| 2007/0244782 A1 | 10/2007 | Chimento |
| 2007/0275399 A1 | 11/2007 | Lathrop et al. |
| 2007/0288641 A1 | 12/2007 | Lee et al. |
| 2008/0059351 A1 | 3/2008 | Richey et al. |
| 2008/0106726 A1 | 5/2008 | Park |
| 2008/0288299 A1 | 11/2008 | Schultz |
| 2009/0018934 A1 | 1/2009 | Peng et al. |
| 2009/0018940 A1 | 1/2009 | Wang et al. |
| 2009/0044279 A1 | 2/2009 | Crawford et al. |
| 2009/0083080 A1 | 3/2009 | Brooks |
| 2009/0099884 A1 * | 4/2009 | Hoefelmeyer .......... G06Q 40/02 |
| | | 705/7.38 |
| 2009/0106134 A1 | 4/2009 | Royyuru |
| 2009/0204254 A1 | 6/2009 | Weber |
| 2009/0192855 A1 | 7/2009 | Subramanian et al. |
| 2009/0323972 A1 | 12/2009 | Kohno et al. |
| 2010/0023455 A1 | 1/2010 | Dispensa et al. |
| 2010/0094767 A1 | 4/2010 | Miltonberger |
| 2010/0114774 A1 | 5/2010 | Linaman et al. |
| 2010/0274691 A1 | 10/2010 | Hammad et al. |
| 2010/0293090 A1 | 11/2010 | Domenikos et al. |
| 2010/0320266 A1 | 12/2010 | White |
| 2011/0055074 A1 | 3/2011 | Chen et al. |
| 2011/0066493 A1 | 3/2011 | Faith et al. |
| 2011/0184845 A1 | 7/2011 | Bishop |
| 2011/0208601 A1 | 8/2011 | Ferguson et al. |
| 2011/0225064 A1 | 9/2011 | Fou |
| 2011/0238510 A1 | 9/2011 | Rowen et al. |
| 2011/0238566 A1 | 9/2011 | Santos |
| 2011/0258118 A1 | 10/2011 | Ciurea |
| 2011/0264612 A1 | 10/2011 | Ryman-Tubb |
| 2012/0036037 A1 * | 2/2012 | Xiao .......... G06Q 30/00 |
| | | 705/26.7 |
| 2012/0047072 A1 | 2/2012 | Larkin |
| 2012/0070062 A1 | 3/2012 | Houle et al. |
| 2012/0109821 A1 | 5/2012 | Barbour et al. |
| 2012/0158566 A1 * | 6/2012 | Fok .......... G06Q 40/00 |
| | | 705/35 |
| 2012/0173570 A1 | 7/2012 | Golden |
| 2012/0209773 A1 | 8/2012 | Ranganathan |
| 2012/0214442 A1 | 8/2012 | Crawford et al. |
| 2012/0216260 A1 | 8/2012 | Crawford et al. |
| 2012/0226613 A1 | 9/2012 | Adjaoute |

(56) References Cited

U.S. PATENT DOCUMENTS

| | | | |
|---|---|---|---|
| 2012/0245967 A1 | 9/2012 | Dispensa et al. | |
| 2013/0013491 A1 | 1/2013 | Selway et al. | |
| 2013/0018781 A1 | 1/2013 | Prada Peyser et al. | |
| 2013/0024339 A1 | 1/2013 | Choudhuri et al. | |
| 2013/0024358 A1 | 1/2013 | Choudhuri et al. | |
| 2013/0024373 A1* | 1/2013 | Choudhuri | G06Q 30/018 705/42 |
| 2013/0046692 A1 | 2/2013 | Grigg et al. | |
| 2013/0085942 A1 | 4/2013 | Shirol | |
| 2013/0218758 A1 | 8/2013 | Koenigsbrueck et al. | |
| 2013/0262311 A1 | 10/2013 | Buhrmann et al. | |
| 2013/0290119 A1* | 10/2013 | Howe | G06Q 20/20 705/16 |
| 2013/0297501 A1 | 11/2013 | Monk et al. | |
| 2014/0012701 A1 | 1/2014 | Wall et al. | |
| 2014/0012738 A1 | 1/2014 | Woo | |
| 2014/0052621 A1 | 2/2014 | Love | |
| 2014/0058962 A1 | 2/2014 | Davoodi et al. | |
| 2014/0067656 A1 | 3/2014 | Cohen Ganor et al. | |
| 2014/0074762 A1 | 3/2014 | Campbell | |
| 2014/0101050 A1 | 4/2014 | Clarke et al. | |
| 2014/0201126 A1 | 7/2014 | Zadeh et al. | |
| 2014/0207637 A1 | 7/2014 | Groarke | |
| 2014/0207674 A1 | 7/2014 | Schroeder et al. | |
| 2014/0244317 A1 | 8/2014 | Roberts et al. | |
| 2014/0244503 A1 | 8/2014 | Sadlier | |
| 2014/0266669 A1 | 9/2014 | Fadell et al. | |
| 2014/0279312 A1 | 9/2014 | Mason et al. | |
| 2014/0279494 A1 | 9/2014 | Wiesman et al. | |
| 2014/0279503 A1 | 9/2014 | Bertanzetti et al. | |
| 2014/0282856 A1 | 9/2014 | Duke et al. | |
| 2014/0310160 A1 | 10/2014 | Kumar et al. | |
| 2014/0310176 A1* | 10/2014 | Saunders | G06Q 20/405 705/44 |
| 2014/0324677 A1 | 10/2014 | Walraven et al. | |
| 2014/0337217 A1 | 11/2014 | Howe et al. | |
| 2014/0358592 A1 | 12/2014 | Wedig et al. | |
| 2014/0373114 A1 | 12/2014 | Franca-Neto et al. | |
| 2015/0012436 A1 | 1/2015 | Poole et al. | |
| 2015/0032604 A1 | 1/2015 | Kearns et al. | |
| 2015/0032621 A1 | 1/2015 | Kar et al. | |
| 2015/0039504 A1 | 2/2015 | Ebbert | |
| 2015/0039513 A1 | 2/2015 | Adjaoute | |
| 2015/0046216 A1 | 2/2015 | Adjaoute | |
| 2015/0046220 A1 | 2/2015 | Gerard et al. | |
| 2015/0089615 A1 | 3/2015 | Krawczyk et al. | |
| 2015/0106260 A1 | 4/2015 | Andrews et al. | |
| 2015/0106268 A1 | 4/2015 | Carroll et al. | |
| 2015/0120502 A1 | 4/2015 | Jung et al. | |
| 2015/0142595 A1 | 5/2015 | Acuna-Rohter | |
| 2015/0161611 A1 | 6/2015 | Duke et al. | |
| 2015/0178715 A1 | 6/2015 | Buhrmann et al. | |
| 2015/0186888 A1 | 7/2015 | Katz et al. | |
| 2015/0186891 A1 | 7/2015 | Wagner et al. | |
| 2015/0193768 A1 | 7/2015 | Douglas et al. | |
| 2015/0199699 A1 | 7/2015 | Milton et al. | |
| 2015/0199738 A1 | 7/2015 | Jung et al. | |
| 2015/0213246 A1 | 7/2015 | Turgeman et al. | |
| 2015/0227934 A1 | 8/2015 | Chauhan | |
| 2015/0227935 A1 | 8/2015 | Adjaoute | |
| 2015/0235221 A1 | 8/2015 | Murphy, Jr. et al. | |
| 2015/0242856 A1 | 8/2015 | Dhurandhar et al. | |
| 2015/0254659 A1 | 9/2015 | Kulkarni et al. | |
| 2015/0262184 A1 | 9/2015 | Wang et al. | |
| 2015/0269578 A1 | 9/2015 | Subramanian et al. | |
| 2015/0276237 A1 | 10/2015 | Daniels et al. | |
| 2015/0379430 A1 | 12/2015 | Dirac et al. | |
| 2016/0044048 A1 | 2/2016 | Hamidi et al. | |
| 2016/0055568 A1 | 2/2016 | Vidal et al. | |
| 2016/0063501 A1 | 3/2016 | Kalyan et al. | |
| 2016/0071105 A1 | 3/2016 | Groarke et al. | |
| 2016/0078443 A1 | 3/2016 | Tomasofsky et al. | |
| 2016/0086184 A1 | 3/2016 | Carpenter et al. | |
| 2016/0086185 A1 | 3/2016 | Adjaoute | |
| 2016/0104163 A1 | 4/2016 | Aquino et al. | |
| 2016/0132851 A1 | 5/2016 | Desai et al. | |
| 2016/0132882 A1 | 5/2016 | Choudhuri et al. | |
| 2016/0132886 A1 | 5/2016 | Burke et al. | |
| 2016/0140561 A1 | 5/2016 | Cowan | |
| 2016/0140562 A1 | 5/2016 | Birukov et al. | |
| 2016/0162895 A1 | 6/2016 | Nuzum et al. | |
| 2016/0171498 A1 | 6/2016 | Wang et al. | |
| 2016/0171499 A1 | 6/2016 | Meredith et al. | |
| 2016/0203490 A1 | 7/2016 | Gupta et al. | |
| 2016/0210631 A1 | 7/2016 | Ramasubramanian et al. | |
| 2016/0210857 A1 | 7/2016 | Gao et al. | |
| 2016/0232465 A1 | 8/2016 | Kurtz et al. | |
| 2016/0253731 A1 | 9/2016 | Ketchel, III et al. | |
| 2016/0283945 A1 | 9/2016 | Gonzalez | |
| 2016/0300214 A1 | 10/2016 | Chaffin et al. | |
| 2016/0342963 A1 | 11/2016 | Zoldi et al. | |
| 2017/0011382 A1 | 1/2017 | Zoldi et al. | |
| 2017/0070484 A1 | 3/2017 | Kruse et al. | |
| 2017/0103398 A1 | 4/2017 | Napsky et al. | |
| 2017/0178134 A1 | 6/2017 | Senci et al. | |
| 2017/0193727 A1 | 7/2017 | Van Horn et al. | |
| 2017/0201498 A1 | 7/2017 | Baig et al. | |
| 2017/0221062 A1 | 8/2017 | Katz et al. | |
| 2017/0236125 A1 | 8/2017 | Guise et al. | |
| 2017/0243220 A1* | 8/2017 | Phillips | G06Q 20/4016 |
| 2017/0261852 A1 | 9/2017 | Kato et al. | |
| 2017/0270526 A1 | 9/2017 | Fitzgerald | |
| 2017/0286962 A1* | 10/2017 | Lai | G06Q 20/24 |
| 2017/0323345 A1 | 11/2017 | Flowers et al. | |
| 2018/0053114 A1 | 2/2018 | Adjaoute | |
| 2018/0060839 A1 | 3/2018 | Murali | |
| 2018/0158062 A1 | 6/2018 | Kohli | |
| 2018/0182029 A1 | 6/2018 | Vinay | |
| 2018/0232605 A1 | 8/2018 | Chen et al. | |
| 2019/0188212 A1 | 6/2019 | Miller et al. | |

OTHER PUBLICATIONS

"A Brief Review of Machine Learning and its Application", 2009 Intl Conf. on Information Engineering and Computer Science, Proceedings of, Dec. 2009 (Year: 2009).*

Bhatla et al, "Understanding Credit Card Frauds", Cards Business Review #2003-01, Jun. 2003, 17 pages.

"Mastercard Merchant Identifier API", Oct. 14, 2015, ProgrammableWeb website, retrieved from Internet Archive Wayback Machine: https://web.archive.org/web/20151014154922/http://www.programmableweb.com/api/mastercard-merchant-identifier (Year 2015), 3 pages.

Tips for Managing Rewards Credit Cards, Apr. 13, 2014, Frequent Flyer Tales blog, retrieved from Internet Archive Wayback Machine: <https://web.archive.org/web/20140413142932/https://www.rewardexpert.conn/blog/tips-for-managing-rewards-credit-cards/> (Year: 2014), 6 pages.

Credit Card Accountability Responsibility and Disclosure Act of 2009, 123 Stat. 1734, Public Law 111-24, 111th Congress, May 22, 2009 (Year: 2009), 37 pages.

Office Action for U.S. Appl. No. 15/466,014, dated Jan. 25, 2019, Kramme, "Identifying False Positive Geolocation-Based Fraud Alerts", 32 pages.

Office Action for U.S. Appl. No. 15/466,002, dated Oct. 16, 2019, Kramme, "Reducing False Positive Fraud Alerts for Card-Present Financial Transactions", 26 pages.

Office Action for U.S. Appl. No. 15/465,671, dated Oct. 31, 2019, Kramme, "Preempting or Resolving Fraud Disputes Relating to Billing Aliases", 31 pages.

Office Action for U.S. Appl. No. 15/465,868, dated Nov. 19, 2018, Kramme, "Facilitating Fraud Dispute Resolution Using Machine Learning", 29 pages.

Office Action for U.S. Appl. No. 15/465,842, dated Nov. 27, 2019, Kramme, "Automated Fraud Classification Using Machine Learning", 30 pages.

Office Action for U.S. Appl. No. 15/466,002, dated Dec. 27, 2018, Kramme, "Reducing False Positive Fraud Alerts for Card-Present Financial Transactions", 35 pages.

(56) References Cited

OTHER PUBLICATIONS

Office Action for U.S. Appl. No. 15/466,009, dated Dec. 27, 2018, Kramme, "Reducing False Positive Fraud Alerts for Online Financial Transactions", 33 pages.
Office Action for U.S. Appl. No. 15/465,981, dated Feb. 20, 2019, Kramme, "Identifying Fraudulent Instruments and Identification", 41 pages.
Office Action for U.S. Appl. No. 15/465,977, dated Feb. 25, 2019, Kramme, "Document-Based Fraud Detection", 8 pages.
Office Action for U.S. Appl. No. 15/465,838, dated Mar. 20, 2019, Kramme, "Detecting Financial Fraud Using Spending Pattern Data for Individual Cardholders", 28 pages.
Office Action for U.S. Appl. No. 15/465,621, dated Mar. 5, 2019, Kramme, "Reducing False Positives Based Upon Customer Online Activity", 21 pages.
Office Action for U.S. Appl. No. 15/465,880, dated Apr. 15, 2019, Kramme, "Preempting or Resolving Fraud Disputes Relating to Introductory Offer Expirations", 25 pages.
Office Action for U.S. Appl. No. 15/465,868, dated Apr. 18, 2019, Kramme, "Facilitating Fraud Dispute Resolution Using Machine Learning", 29 pages.
Office Action for U.S. Appl. No. 15/465,671, dated Apr. 24, 2019, Kramme, "Preempting or Resolving Fraud Disputes Relating to Billing Aliases", 35 pages.
Office Action for U.S. Appl. No. 15/465,863, dated Apr. 30, 2019, Kramme, "Identifying Application-Related Fraud", 19 pages.
Office Action for U.S. Appl. No. 15/465,977, dated Jun. 11, 2019, Kramme, "Document-Based Fraud Detection", 10 pages.
Office Action for U.S. Appl. No. 15/466,009, dated Jun. 17, 2019, Kramme, "Reducing False Positive Fraud Alerts for Online Financial Transactions", 25 pages.
Office Action for U.S. Appl. No. 15/465,821, dated Jun. 27, 2019, Kramme, "Reducing False Positives Based Upon Customer Online Activity", 24 pages.
Office Action for U.S. Appl. No. 15/466,002, dated Jun. 6, 2019, Kramme, "Reducing False Positive Fraud Alerts for Card-Present Financial Transactions", 25 pages.
Office Action for U.S. Appl. No. 15/465,838, dated Jul. 1, 2019, Kramme, "Detecting Financial Fraud Using Spending Pattern Data for Individual Cardholders", 39 pages.
Office Action for U.S. Appl. No. 15/466,014, dated Jul. 12, 2019, Kramme, "Identifying False Positive Geolocation-Based Fraud Alerts", 25 pages.
Office Action for U.S. Appl. No. 15/465,680, dated Aug. 20, 2019, Kumme, "Preempting or Resolving Fraud Disputes Relating to Introductory Offer Expirations", 27 pages.
Office Action for U.S. Appl. No. 15/465,863, dated Aug. 30, 2019, Kramme, "Identifying Application-Related Fraud", 21 pages.
Office Action for U.S. Appl. No. 15/465,981, dated Aug. 6, 2019, Kramme, "Identifying Fraudulent Instruments and Identification", 42 pages.
Abdelhalim, et. al., "The impact of Google Hacking on Identiy and Application Fraud", 2007 IEEE Pacific Rim Conference on Communications, Computers and Signal Processing, Aug. 2007, pp. 240-244.
Bose, "Intelligent Technologies for Managing Fraud and Identity Theft", Third International Conference on Information Technology: New Generations (ITNG'06), Apr. 2006, pp. 446-451.
Cho, et. al., "Detection and Response of Identity Theft within a Company Utilizing Location Information," International Conference on Platform Technology and Service (PlatCon), Feb. 2016 , 5 pages.
Council, "How to Extract Reliable Data from Invoices" retrieved on Dec. 5, 2019, at <<https://www.parascript.com/blog/how-to-extract-reliable-date-from-invoices/>>Parascript blog, Mar. 10, 2016, pp. 1-4.
Ji, et. al., "Systems Plan for Combating identity Theft—A Theoretical Framework," 2007 International Conference on Wireless Communications, Networking and Mobile Computing, Shanghai, Sep. 2007, pp. 6402-6405.
Van der Merwe, et. al., "Phishing in the System of Systems Settings: Mobile Technology", 2005 IEEE International Conference on Systems, Man and Cybernetics, Oct. 2005, vol. 1, pp. 492-496.
Office Action for U.S. Appl. No. 15/465,880, dated Dec. 12, 2019, dated Dec. 12, 2019, Kramme, "Preempting or Resolving Fraud Disputes Relating to Introductory Offer Expirations", 39 Pages.
Office action for U.S. Appl. No. 15/465,977, dated Dec. 12, 2019, Kramme,"Document-Based Fraud Detection", 10 pages.
Non Final Office Action dated Dec. 18, 2019 for U.S. Appl. No. 15/465,856 "Identifying Potential Chargeback Scenarios Using Machine Learning" Kramme, 22 pages.
Non Final Office Action dated Dec. 18, 2019 for U.S. Appl. No. 15/465,863 "Identifying Application-Related Fraud" Kramme, 17 pages.
Non Final Office Action dated Dec. 19, 2019 for U.S. Appl. No. 15/465,821 "Reducing False Positives Based Upon Customer Online Activity" Kramme, 22 pages.
Office Action for U.S. Appl. No. 15/465,838, dated Dec. 4, 2019, Kramme,"Detecting Financial Fraud Using Spending Pattern Data for Individual Cardholders", 45 Pages.
Singh,et al.. "Fraud Detection by Monitoring Customer Behavior and Activities", International Journal of Computer Applications, vol. 111, No. 11, Feb. 2015, pp. 23-32.
Aimeur, et. al. "The ultimate invasion of privacy: Identity theft", Ninth Annual International Conference on Privacy, Security, and Trust, Montreal, Quebec, 2011, pp. 24-31.
Gold, "Identity Crisis?", Engineering & Technology, vol. 8, No. 10, Nov. 2013, pp. 32-35.
Kossman, "7 merchant tips to understanding EMV fraud liability shift", CreditCards.com, Oct. 1, 2015, retrieved from <<https://www.creditcards.com/credit-card-news/understanding-emv-fraud-liability-shift-1271.php>>.
Non Final Office Action dated Feb. 20, 2020 for U.S. Appl. No. 15/465,868 "Facilitating Fraud Dispute Resolution Using Machine Learning" Kramme, 39 pages.
Final Office Action dated Mar. 5, 2020 for U.S. Appl. No. 15/465,838, "Detecting Financial Fraud Using Spending Pattern Data for Individual Cardholders", Kramme, 52 pages.
Final Office Action dated Feb. 24, 2020 for U.S. Appl No. 15/466,002 "Reducing False Positive Fraud Alerts for Card-Present Financial Transactions" Kramme, 29 pages.
Non Final Office Action dated Feb. 3, 2020 for U.S. Appl. No. 15/465,858 "Identifying Chargeback Scenarios Based Upon Non-Compliant Merchant Computer Terminals" Kramme, 48 pages.
Non Final Office Action dated Mar. 12, 2020 for U.S. Appl. No. 15/466,009 "Reducing False Positive Fraud Alerts for Online Financial Transactions" Kramme, 24 pages.
Final Office Action dated Apr. 28, 2020 for U.S. Appl. No. 15/465,863 "Identifying Application-Related Fraud" Kramme, 14 pages.
Office Action for U.S. Appl. No. 15/465,671, dated Apr. 3, 2020, Kramme, "Preempting or Resolving Fraud Disputes Relating to Billing Aliases", 38 pages.
Non Final Office Action dated Apr. 8, 2020 for U.S. Appl. No. 15/466,014 "Identifying False Positive Geolocation-Based Fraud Alerts" Krarnme, 26 pages.
Final Office Action dated Apr. 9, 2020 for U.S. Appl. No. 15/465,821 "Reducing False Positives Based Upon Customer Online Activity" Kramme, 23 pages.
Non Final Office Action dated Apr. 9, 2020 for U.S. Appl. No. 15/465,977 "Document-Based Fraud Detection" Kramme, 10 pages.
Final Office Action dated Jun. 2, 2020 for U.S. Appl. 15/465,858, "Identifying Chargeback Scenarios Based Upon Non-Compliant Merchant Computer Terminals", Kramme, 13 pages.
Final Office Action dated Jun. 10, 2020 for U.S. Appl. No. 15/465,880, "Preempting or Resolving Fraud Disputes Relating to Introductory Offer Expirations", Kramme, 37 pages.
Final Office Action dated May 21, 2020 for U.S. Appl. No. 15/465;856 "Identifying Potential Chargeback Scenarios Using Machine Learning" Kramme, 22 pages.
Final Office Action dated May 28, 2020 for U.S. Appl. No. 15/465,842 "Automated Fraud Classification Using Machine Learning" Krarnrne, 32 pages.

(56) References Cited

OTHER PUBLICATIONS

Non Final Office Action dated Jul. 14, 2020 for U.S. Appl. No. 15/465,838 "Detecting Financial Fraud Using Spending Pattern Data for Individual Cardholders" Kramme, 56 pages.

Non Final Office Action dated Jul. 21, 2020 for U.S. Appl. No. 15/465,981 "Identifying Fraudulent Instruments and Identification" Krarnme, 33 pages.

Final Office Action dated Aug. 24, 2020 for U.S. Appl. No. 15/466;009, "Reducing False Positive Fraud Alerts for Online Financial Transactions", Kramme, 27 pages.

Non Final Office Action dated Aug. 26, 2020 for U.S. Appl. No. 15/466,014, "Identifying False Positive Geolocation-Based Fraud Alerts", Kramme, 26 pages.

Non Final Office Acrion Dated Aug. 27, 2020 for U.S. Appl. No. 16/540,505, "Reducing False Positives Using Customer Feedback and Machine Learning", Kramme, 33 pages.

Final Office Action dated Jul. 23, 2020 for U.S. Appl. No. 15/465,868, "Facilitating Fraud Dispute Resolution Using Machine Learning", Kramme, 68 pages.

Final Office Action dated Jul. 24, 2020 for U.S. Appl. No. 15/931,560, "Identifying Chargeback Scenarios Based Upon Non-Compliant Merchant Computer Terminals", Kramme, 61 pages.

\* cited by examiner

220

222
INTEREST-BASED FACTORS

Cardholder searched online for purchased product/service
+94

Cardholder visited website associated with merchant
+71

Cardholder endorsed (e.g., "liked") merchant or product/service provided by merchant via social media account
+56

Cardholder visited website associated with competitor of merchant
+50

Cardholder searched online for different product/service in same price range as transaction
+5

Cardholder entered search terms indicative of need for product/service provided by merchant ("need score" = $X$)
**+0.2*$X$**

224
LOCATION-BASED FACTORS

Cardholder checked in to flight near location where transaction was initiated
+80

Cardholder visited website associated with place near or in which transaction was initiated
+63

Cardholder endorsed (e.g., "liked") place, near or in which transaction was initiated, via social media account
+28

```
Search term included name of
purported applicant
+60
```

```
Search term also included word
"address" or "residence"
+24
```

```
Search term also included word
"employer" or "job" or "career"
+9
```

COUNTERFEIT FACTORS — 292

Dimensions and/or angles outside tolerance
+82

Color matching outside tolerance
+74

Line thickness outside tolerance
+55

Font matching outside tolerance
+50

FORGERY FACTORS — 294

Signature match outside tolerance
+99

Handwriting match outside tolerance
+59

Information format mismatch (e.g., "9.12.16" versus "9/12/2016")
+28

*FIG. 4F*

REDUCING FALSE POSITIVES USING CUSTOMER DATA AND MACHINE LEARNING

CROSS-REFERENCE TO RELATED APPLICATIONS

This claims the benefit of U.S. Patent Application No. 62/313,196, filed on Mar. 25, 2016 and entitled "Reducing Financial Fraud Using Machine Learning and Other Techniques," U.S. Patent Application No. 62/318,423, filed on Apr. 5, 2016 and entitled "Reducing Financial Fraud Using Machine Learning and Other Techniques," U.S. Patent Application No. 62/331,530, filed on May 4, 2016 and entitled "Reducing Financial Fraud Using Machine Learning and Other Techniques," and U.S. Patent Application No. 62/365,699, filed on Jul. 22, 2016 and entitled "Detecting and/or Preventing Financial Fraud Using Geolocation Data," the disclosures of which are hereby incorporated herein by reference in their entireties.

FIELD OF THE DISCLOSURE

The present disclosure generally relates to financial fraud and, more specifically, to processing techniques that use customer data and/or machine learning to reduce false positive fraud alerts.

BACKGROUND

Financial fraud, in its many forms, is a problem of enormous magnitude and scope, causing billions of dollars in economic losses and impacting many millions of people. Types of financial fraud include use of a lost or stolen card, account takeover, skimming, chargeback ("friendly") fraud, counterfeiting, forgeries and application (e.g., loan application) fraud, to name just a few. The problem only continues to grow as various technological advances, intended to improve convenience and efficiency in the marketplace, provide new opportunities for bad actors. For example, an ever-increasing amount of fraud may be linked to online transactions made via the Internet.

Various software applications have been developed to detect potentially fraudulent transactions. For example, dollar amounts and geographic locations have generally been used to flag particular credit or debit card transactions, with cardholders then being contacted by employees of the card issuer to determine whether the transactions were indeed fraudulent. To ensure that most instances of fraud are captured, however, such techniques generally have a low threshold for triggering a fraud alert. As a result, numerous fraud alerts are false positives. The prevalence of false positives leads to a large cost in terms of the drain on human resources (e.g., calling customers to discuss each suspect transaction, and/or other manual investigation techniques), and considerable distraction or annoyance for cardholders. To provide a solution to these shortcomings in the field of automated fraud detection, innovative processing techniques capable of reducing false positives are needed.

BRIEF SUMMARY

The present embodiments may, inter alia, reduce false positive fraud alerts using customer data. For example, fraud may be detected, verified and/or classified using customer locations, customer online activity, customer preferences, and/or other information. Moreover, in some embodiments, the rules used to detect, verify and/or classify fraud may be generated by a machine learning program. For example, supervised learning techniques may be used, with the machine learning program analyzing various types of data (e.g., including any of the data types listed above) associated with financial transactions, financial accounts and/or account holders in confirmed cases of fraud to determine which information is most probative of fraudulent activity or the lack thereof.

In one embodiment, a computer-implemented method of detecting whether electronic fraud alerts are false positives prior to transmission to customer mobile devices based upon customer data includes: (1) receiving, by one or both of (i) one or more processors and (ii) one or more transceivers, data detailing a financial transaction associated with a customer, the data detailing the financial transaction being transmitted from a merchant computer terminal over one or more radio links; (2) inputting, by the one or more processors, the data detailing the financial transaction into a rules-based engine that determines whether to generate an electronic fraud alert for the financial transaction based upon the data detailing the financial transaction; (3) when an electronic fraud alert is generated for the financial transaction, inputting, by the one or more processors, the data detailing the financial transaction into a machine learning program that is trained to identify one or more facts indicated by the data detailing the financial transaction that caused the electronic fraud alert to be generated; (4) determining, by the one or more processors, whether the identified one or more facts that caused the electronic fraud alert to be generated can be verified by customer data; (5) in response to determining that the identified one or more facts that caused the electronic fraud alert to be generated can be verified by customer data, retrieving or receiving, by the one or more processors, first customer data; (6) verifying, by the one or more processors, that the electronic fraud alert is not a false positive based upon analysis of the first customer data; and/or (7) transmitting, by one or both of (i) the one or more processors and (ii) the one or more transceivers, the verified electronic fraud alert to a mobile device of the customer via a wireless communication channel to alert the customer to fraudulent activity. The method may include additional, less, or alternate actions, including those discussed elsewhere herein.

In another embodiment, a computer-implemented method of detecting whether electronic fraud alerts are false positives prior to transmission to customer mobile devices based upon customer data includes: (1) receiving, by one or both of (i) one or more processors and (ii) one or more transceivers, data detailing a financial transaction associated with a customer, the data detailing the financial transaction being transmitted from a merchant computer terminal over one or more radio links; (2) inputting, by the one or more processors, the data detailing the financial transaction into a rules-based engine that determines whether to generate an electronic fraud alert for the financial transaction based upon the data detailing the financial transaction; (3) when an electronic fraud alert is generated for the financial transaction, inputting, by the one or more processors, the data detailing the financial transaction into a machine learning program that is trained to one or both of (i) determine a reason why the electronic fraud alert was generated, and (ii) identify one or more facts indicated by the data detailing the financial transaction that caused the electronic fraud alert to be generated; (4) determining, by the one or more processors, whether one or both of (i) the reason why the electronic fraud alert was generated, and (ii) the identified one or more facts that caused the electronic fraud alert to be generated, can be verified by customer data; (5) in response to determining that one or both of (i) the reason why the electronic fraud alert was generated, and (ii) the identified one or more facts that caused the electronic fraud alert to be generated, can be verified by customer data, retrieving or receiving, by the one or more processors, first customer data; (6) verifying, by the one or more processors, that the electronic fraud alert is not a false positive based upon analysis of the first customer data; and/or (7) transmitting, by one or both of (i) the one or more processors and (ii) the one or more transceivers, the verified electronic fraud alert to a mobile device of the customer via a wireless communication channel to alert the customer to fraudulent activity. The method may include additional, less, or alternate actions, including those discussed elsewhere herein.

In another embodiment, a computer system configured to detect whether electronic fraud alerts are false positives prior to transmission to customer mobile devices based upon customer data includes one or both of (i) one or more processors and (ii) one or more transceivers, and is configured to: (1) receive data detailing a financial transaction associated with a customer, the data detailing the financial transaction being transmitted from a merchant computer terminal over one or more radio links; (2) input the data detailing the financial transaction into a rules-based engine that determines whether to generate an electronic fraud alert for the financial transaction based upon the data detailing the financial transaction; (3) when an electronic fraud alert is generated for the financial transaction, input the data detailing the financial transaction into a machine learning program that is trained to identify one or more facts indicated by the data detailing the financial transaction that caused the electronic fraud alert to be generated; (4) determine whether the identified one or more facts that caused the electronic fraud alert to be generated can be verified by customer data; (5) in response to determining that the identified one or more facts that caused the electronic fraud alert to be generated can be verified by customer data, retrieve or receive first customer data; (6) verify that the electronic fraud alert is not a false positive based upon analysis of the first customer data; and/or (7) transmit the verified electronic fraud alert to a mobile device of the customer via wireless communication channel to alert the customer of fraudulent activity and to facilitate not transmitting false positives to customer mobile devices. The computer system may include additional, less, or alternate functionality, including that discussed elsewhere herein.

BRIEF DESCRIPTION OF THE DRAWINGS

The Figures described below depict various aspects of the systems and methods disclosed herein. It should be understood that each Figure depicts an embodiment of a particular aspect of the disclosed systems and methods, and that each of the Figures is intended to accord with a possible embodiment thereof.

FIGS. 4A-4F depict exemplary factors and algorithms that may be used in connection with various fraud detection, verification and/or classification rule sets, according to different embodiments.

DETAILED DESCRIPTION

I. Exemplary Fraud Detection and/or Classification

Figure 1:
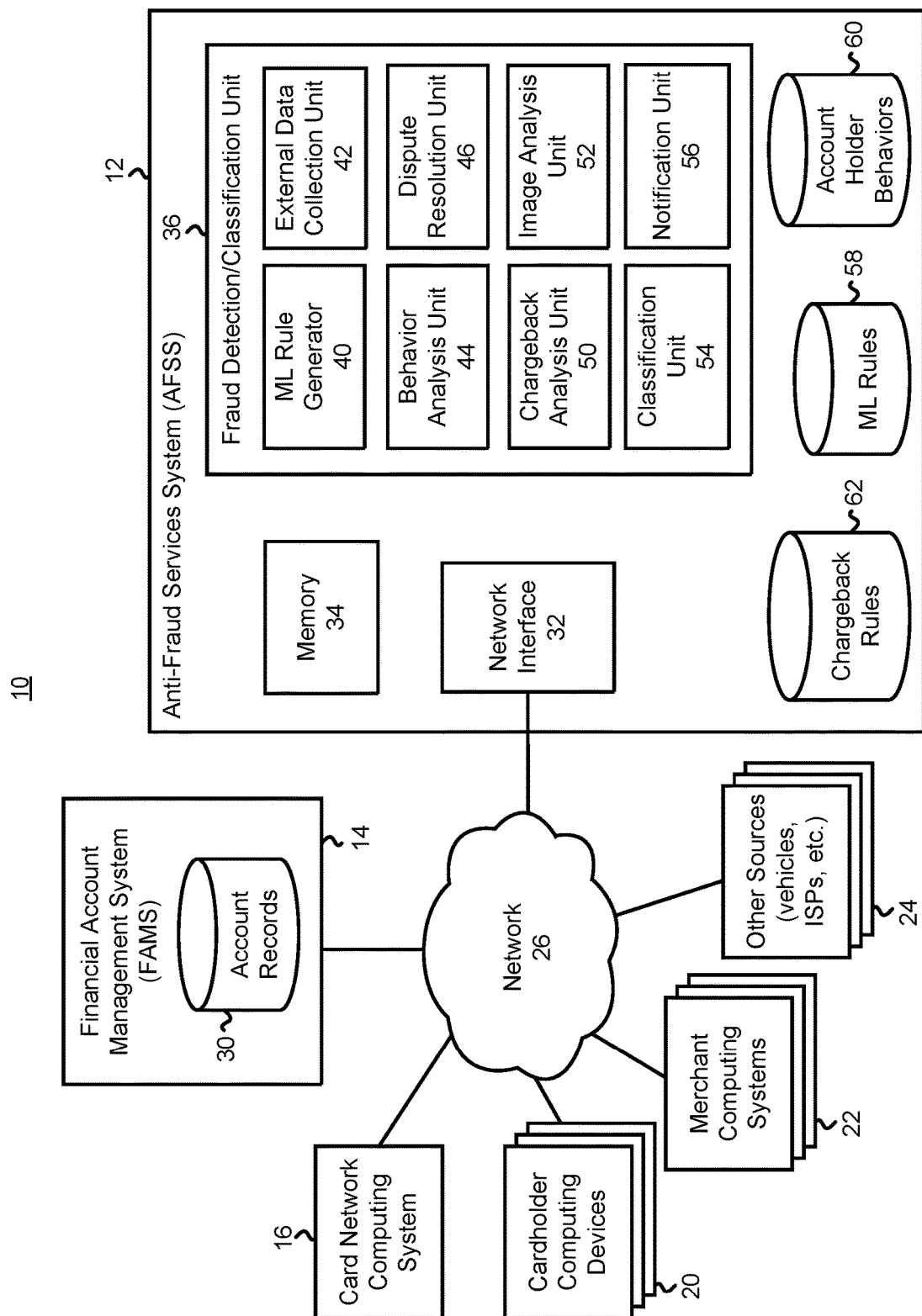
FIG. 1 depicts an exemplary environment in which techniques for fraud detection, verification and/or classification may be implemented, according to one embodiment.

The embodiments described herein relate to, inter alia, wholly or partially automated detection, verification and/or classification of financial fraud. For ease of explanation, and unless otherwise clearly indicated by the context of usage, "detecting" or "determining" fraud may be used herein to refer to initially flagging fraudulent (or potentially fraudulent) activity, to verifying/confirming that suspect/flagged activity was indeed fraudulent, or generally to both. The systems and techniques described herein may be used, for example, to identify, prevent and/or quantify/measure instances of lost or stolen card use, account takeover, counterfeiting, skimming, chargeback ("friendly") fraud, collusive merchant fraud, application (e.g., loan application) fraud, mortgage fraud, and/or one or more other types of fraud relating to existing and/or potential financial transactions and/or accounts. Moreover, those skilled in the art will appreciate that at least some of the technical advancements described below (and/or shown in the accompanying figures) are not necessarily restricted to the financial field.

In some embodiments, a fraud detection and/or classification system may analyze data relating to a number of existing or potential financial accounts. The analysis/processing may be performed in batch processing operations, or substantially in real-time (e.g., as the data is generated and/or as financial transactions occur, etc.), and the data may be obtained from a variety of sources based upon the particular embodiment and/or scenario. In one embodiment, for example, data from financial account records may be analyzed, along with data indicating online activity of an account holder, location data (e.g., global positioning satellite (GPS) data from a smartphone or vehicle of the account holder) and/or other data, to determine whether a particular financial transaction was fraudulent or likely fraudulent. The analysis may be performed automatically after the transaction has been made, or may be performed in response to a person or algorithm flagging the transaction as a potentially fraudulent one, for example.

The analysis may include determining whether the account holder has expressed interest in the object (e.g., product or service) of the transaction or the merchant, and/or determining whether the transaction is consistent with spending patterns associated with the account holder (e.g., spending patterns identified using the account holder's transaction records), for example. In the case of multiple account holders (e.g. multiple credit or debit card holders), accuracy may be improved by identifying spending patterns at the individual level rather than, or in addition to, at the aggregate account level. For example, a maximum amount of money typically spent in a single transaction (e.g., over the course of a one-month window, etc.) may be determined for each of two cardholders listed on a single account, and the maximum amount for the cardholder who purportedly made a particular purchase may be compared to the purchase amount to determine whether fraud is suspected.

In another exemplary embodiment, financial transaction data may be analyzed to determine whether a chargeback payment from the merchant or acquiring bank to a card issuer may be appropriate in connection with a particular fraudulent transaction. For example, the card information entry mode (e.g., collecting card information by inserting the card in a chip reader, swiping the card, manually entering the card information, etc.), the transaction amount, the similarity to other transaction(s), and/or other information may be used to identify which fraudulent transactions are relatively strong chargeback candidates. The analysis may be performed in response to a cardholder reporting the transaction as fraudulent, or after a card issuer has confirmed that the transaction was fraudulent, for example. For the subset of instances where a fraudulent transaction has been identified as a chargeback candidate, a full set of chargeback rules (e.g., devised by a card network entity such as VISA®, Mastercard®, American Express®, Discover®, etc.) may be manually or automatically applied to determine whether a chargeback process should be initiated (or continued).

In another exemplary embodiment, application data (e.g., information entered in fields of an online application) may be analyzed in conjunction with search terms entered by a user at a computing device (e.g., the device from which the user submitted the application information) to determine whether the person proffering the application is not the person that he or she purports to be. For example, if the person submitting an application had previously used an Internet-based search engine to search for results associated with the purported applicant's name (e.g., by using the name as a search term, possibly in addition to other terms such as "address" and/or "employer," etc.), the application may be flagged for suspected fraud, and subjected to additional steps of manual and/or automated review.

In another exemplary embodiment, a fraud dispute resolution process (e.g., after a customer has reported a fraudulent or unrecognized transaction associated with his or her account) may be facilitated using machine learning techniques. For example, a machine learning program may be trained, using past dispute resolution interactions with customers and the associated outcomes (fraud determinations), to identify various types of information that, if elicited from customers, tend to be indicative of fraud or the absence thereof. When fraud is suspected for a particular transaction, one or more queries for the individual purportedly making the transaction may be automatically generated using the types of information identified by the machine learning program, as well as information about the suspect transaction and/or related transactions (e.g., dates, locations, amounts, etc.). In some embodiments and/or scenarios, responses to the queries may be collected and analyzed to automatically generate additional queries, with the end goal of discerning whether the transaction was authorized. For example, queries may include asking whether a cardholder recalls particular other transactions that appear on the cardholder's account and were made around the same time as the suspect transaction (and/or from the same merchant), asking whether the cardholder recalls being in a particular location at a particular time (e.g., a location associated with another transaction appearing on the cardholder's account), whether the cardholder is aware of a particular billing alias used by a merchant, and so on.

In another exemplary embodiment, image data corresponding to a particular physical document (e.g., a personal or cashier's check, a driver's license or other identification card, etc.) may be analyzed, using rules generated by a machine learning program, to determine whether the document is, or may be, fraudulent (e.g., a counterfeit document, and/or a document that includes forged contents). For example, the machine learning program may be trained using images of multiple other documents, and fraud determinations made in connection with those other documents. The machine learning program may learn which ranges and/or tolerances for dimensions, fonts, colors, patterns, etc., tend to be most indicative of counterfeiting, for example. A forgery may be detected based upon factors relating to the contents of various fields in a document, such as whether handwriting, a signature, and/or a date format (e.g., "Jan. 1, 2016," "1/1/16," etc.) matches that used for other personal checks from a particular account holder, for example. The fraud determination may be made substantially in real-time to provide a warning, if needed, to a merchant making a sale, for example, or may be used to flag a relatively small number of documents for physical review at a later time, etc.

In another exemplary embodiment, machine learning techniques may be used to analyze financial transactions for purposes of classifying potentially fraudulent behavior (e.g., "counterfeiting," "skimming," "lost or stolen card," etc.). For example, the machine learning program may be trained using fraud classifications made in connection with multiple other financial accounts. The machine learning program may learn which types of data tend to be indicative of different classifications (e.g., transaction amount, credit card information entry mode, particular types of online activity data, etc.), and/or which data values tend to be indicative of different classifications (e.g., transactions over $10,000, manual card number entry, etc.), for example. Once a class of potential fraud has been identified for a particular transaction, the classification may be used to facilitate or guide a further, more in-depth analysis or investigation. Alternatively, or in addition, the classification may be used to calculate one or more metrics indicating the prevalence of that type of fraud.

By replacing conventional processing techniques with one or more of the processing techniques described herein, problems that have beset the field of fraud detection, classification and/or prevention in the past may be greatly mitigated or eliminated. For example, information that has conventionally been overlooked or ignored may be used to more accurately detect, prevent and/or classify fraud, and/or to reduce false positive fraud alerts. As another example, a significant amount of time may be saved by removing the need for manual investigations, or by reducing the number of instances where manual investigations are required.

II. Exemplary Environment for Implementing Fraud Detection and/or Classification Processing Techniques FIG. 1 depicts an exemplary environment 10 in which techniques for fraud detection and/or classification may be implemented, according to one embodiment. The environment 10 may include an anti-fraud services system (AFSS) 12, a financial account management system (FAMS) 14, a card network computing system 16, a number of cardholder computing devices 20, a number of merchant computing systems 22, a number of other sources 24, and a network 26. It is noted that, in other embodiments and/or scenarios, the environment 10 may include more, fewer and/or different components than those shown in FIG. 1, such as any of those discussed elsewhere herein. For example, the environment 10 may include one or more additional financial account management systems and/or card network computing systems, and/or one or more of the cardholder computing devices 20 may instead be a computing device of a holder of a non-card account (e.g., a checking, savings or loan account) or an applicant for a new account (e.g., a new loan account). As another example, the environment 10 may include a computing system of one or more acquiring/merchant banks, and some or all of the communications with merchant computing systems 22 described below may instead be with the acquiring bank(s).

FAMS 14 may be associated with (e.g., owned and/or maintained by) a bank or other financial entity. For example, FAMS 14 may be a bank that acts as a card issuer associated with a particular type of card network (e.g., VISA®, Mastercard®, etc.), and/or an entity that provides loans (e.g., mortgage, home equity, vehicle, etc.), saving/checking account services, and/or other financial services to customers. FAMS 14 may maintain an account records database 30 that stores various kinds of account information, including account holder information (e.g., names, addresses, etc.) and data indicative of financial transactions made in connection with each account (e.g., dates, amounts and merchants for credit or debit card transactions, dates and amounts for customer deposits and withdrawals, etc.). Account records database 30 may store account information for some or all of the cardholders associated with cardholder computing devices 20, for example. While shown in FIG. 1 as a single entity within FAMS 14, it is understood that account records database 30 may, in some embodiments, be distributed across multiple databases and/or multiple physical/hardware memories, and/or may be wholly or partially external to (e.g., remote from) FAMS 14.

AFSS 12 may generally provide services that help to detect and/or classify fraudulent activity in connection with existing and/or potential (e.g., applied for) financial accounts, such as the accounts managed by FAMS 14. In some embodiments, AFSS 12 is included within FAMS 14. As seen in FIG. 1, AFSS 12 may include a network interface 32, a memory 34, and a fraud detection/classification unit 36.

Network interface 32 may include hardware, firmware and/or software configured to enable AFSS 12 to wirelessly exchange electronic data with one or more other components of environment 10 via network 26. For example, network interface 32 may include an Ethernet port, a modem, a router, and/or one or more other ports and/or transceivers for one or more other wired and/or wireless communication technologies.

Memory 34 may be a computer-readable, non-transitory storage unit or device, or collection of units/devices, and may include persistent (e.g., hard disk) and/or non-persistent memory components. Memory 34 may store instructions that are executable on one or more processors of AFSS 12 (not shown in FIG. 1) to perform various operations, including the instructions of various software applications and data generated and/or used by such applications.

Card network computing system 16 may be a computing system (e.g., one or more servers) of a credit and/or debit card network entity, such as VISA® or Mastercard®, for example. In some embodiments and/or scenarios where the card network entity also acts as the issuer (e.g., American Express® or Discover®), card network computing system 16 may include FAMS 14. Card network computing system 16 may provide various services to FAMS 14 and/or AFSS 12. For example, card network computing system 16 may provide electronic updates to chargeback rules, fraud scores for particular customers and/or transactions, and so on.

Each of cardholder computing devices 20 may be a computing device of a respective holder of a credit or debit card account managed by FAMS 14. For example, one or more of cardholder computing devices 20 may be desktop computers, laptop computers, tablet computers, smartphones, smart watches, and so on. The cardholders (e.g., credit or debit card account holders) may use cardholder computing devices 20 to access (e.g., view, modify, etc.) their account information stored in account records database 30 online via network 26. In some embodiments where AFSS 12 detects and/or classifies activity not related to credit or debit card fraud (e.g., a fraudulent application for a home equity loan, etc.), cardholder computing devices 20 may instead be computing devices of other types of customers or potential customers, such as holders of non-card-based accounts, or individuals who have submitted an online application for a loan, etc., as discussed further below. In some of these embodiments, the environment 10 may omit card network computing system 16.

Each of merchant computing systems 22 may include one or more computing devices associated with a particular provider of products and/or services. For example, some or all of merchant computing systems 22 may include servers associated with online retailers. Alternatively, or additionally, some or all of merchant computing systems 22 may include point-of-sale terminal devices providing credit and/or debit card payment processing features for "card present" transactions. In some embodiments where AFSS 12 detects and/or classifies activity not related to customer purchases (e.g., if AFSS 12 only detects loan application fraud, etc.), the environment 10 may omit merchant computing systems 22.

The other sources 24 may include computing devices and/or systems associated with sources of one or more other types of information. For example, other sources 24 may include vehicle telematics systems (e.g., installed in vehicles of cardholders associated with cardholder computing devices 20), one or more Internet service providers (ISPs) (e.g., ISPs providing Internet access to some or all cardholders), "smart home" system devices (e.g., installed in homes of some or all cardholders), and/or other systems/devices. In some embodiments, the environment 10 does not include the other sources 24.

Network 26 may communicatively couple some or all of the components shown in FIG. 1. For example, FAMS 14 may use network 26 to communicate with AFSS 12, card network computing system 16, cardholder computing devices 20 and/or merchant computing systems 22. As another example, AFSS 12 may use network 26 to communicate with FAMS 14, card network computing system 16, cardholder computing devices 20, merchant computing systems 22 and/or one or more of the other sources 24. While shown as a single entity in FIG. 1, network 26 may include multiple communication networks of one or more types (e.g., one or more wired and/or wireless local area networks (LANs), and/or one or more wired and/or wireless wide area networks (WANs) such as the Internet). Moreover, network 26 may use partially or entirely distinct network components to support communications between different endpoints or computing devices, such as wireless communication or data transmission over one or more radio frequency links and/or wireless communication channels. For example, the portion(s) of network 26 used for communications between FAMS 14 and AFSS 12 may be the same as, or different than, the portion(s) of network 26 used for communications between FAMS 14 and one or more of cardholder computing devices 20 over one or more radio links or wireless communication channels, or between AFSS 12 and one or more of the other sources 24, etc. Those skilled in the art will appreciate different types of networks that are appropriate for network 26, depending upon, for example, how AFSS 12, FAMS 14 and/or other components of environment 10 are localized or distributed across a relatively large geographic area.

Generally, fraud detection/classification unit 36 of AFSS 12 may detect fraudulent activity, confirm whether suspected or reported fraudulent activity is truly fraudulent, and/or classify fraudulent or suspected fraudulent activity. For example, fraud detection/classification unit 36 may analyze each transaction stored in account records database 30 to determine whether that transaction is, or potentially is, fraudulent. Alternatively, fraud detection/classification unit 36 may analyze only those transactions that were flagged as possibly being fraudulent (e.g., by a cardholder calling in to report an unauthorized and/or unrecognized transaction, or by FAMS 14 or AFSS 12 generating a preliminary fraud alert after applying an initial set of rules to a transaction, etc.). Fraud detection/classification unit 36 may also, or instead, support additional functionality, such as that described below in connection with the various components of fraud detection/classification unit 36 shown in FIG. 1.

As seen in FIG. 1, fraud detection/classification unit 36 may include a machine learning (ML) rule generator 40, an external data collection unit 42, a behavior analysis unit 44, a dispute resolution unit 46, a chargeback analysis unit 50, an image analysis unit 52, a classification unit 54, and/or a notification unit 56. In other embodiments, fraud detection/ classification unit 36 may include more, fewer and/or different components/units than those shown in FIG. 1. In some embodiments, each of ML rule generator 40, external data collection unit 42, behavior analysis unit 44, dispute resolution unit 46, chargeback analysis unit 50, image analysis unit 52, classification unit 54, notification unit 56, and/or other units or components of fraud detection/classification unit 36 may be a software component stored in memory 34 and implemented by one or more processors of one or more computing devices (e.g., servers) included in AFSS 12.

ML rule generator 40 may generally analyze various types of data to generate and/or update fraud detection and/or classification rules to be applied by fraud detection/classification unit 36 and stored in an ML rules database 58. As discussed in further detail below, the rules may be used to detect and/or classify a single type or category of fraudulent activity, or may be used broadly in connection with multiple types or categories of fraudulent activity. ML rule generator 40 may implement any suitable type or types of machine learning. For example, ML rule generator 40 may implement supervised learning techniques, such as decision trees, regression-based models, support vector machines (SVMs) and/or neural networks, and/or unsupervised learning techniques such as Dirichlet process mixture models and/or k-means clustering. Other machine learning techniques are also possible, such as techniques utilizing Bayesian networks, "deep learning" techniques, and so on. While shown in FIG. 1 as a single entity within AFSS 12, it is understood that ML rules database 58 may, in some embodiments, be distributed across multiple databases and/or multiple physical/hardware memories, and/or may be wholly or partially external to (e.g., remote from) AFSS 12.

External data collection unit 42 may generally collect, via network interface 32 and/or from sources internal to AFSS 12, information from various sources (e.g., FAMS 14, cardholder computing devices 20, other sources 24, etc.), and provide that data to other portions of AFSS 12 as needed (e.g., to ML rule generator 40 to generate and/or update rules, and/or to behavior analysis unit 44, dispute resolution unit 46, chargeback analysis unit 50, image analysis unit 52 and/or classification unit 54 to detect and/or classify fraudulent activity). Some data may be collected indirectly. For example, FAMS 14 may collect transaction data from merchant computing systems 22 (and/or from acquiring banks associated with one or more of merchant computing systems 22), and external data collection unit 42 may then collect that data from the account records database 30 of FAMS 14.

Once an initial set of rules has been generated and stored in ML rules database 58, those rules may dictate some or all of the types of data gathered by external data collection unit 42. In some embodiments, however, external data collection unit 42 collects a broad set of data types that may or may not be relevant to fraud determination or classification, and ML rule generator 40 continually analyzes that data to determine which data types are most predictive of fraud and/or fraud type/class.

Behavior analysis unit 44 may generally analyze cardholder-related (or other customer-related) information to identify patterns of behavior, which may then be used by fraud detection/classification unit 36 to detect and/or classify fraudulent activity. For example, behavior analysis unit 44 may analyze information obtained from account records database 30 to identify spending patterns associated with different cardholders. The operation of behavior analysis unit 44, including the types of information analyzed and the ways in which that information is used to arrive at a result (e.g., a pattern of behavior), may be dictated by the rules stored in ML rules database 58.

Data indicative of the behavior patterns identified by behavior analysis unit 44 may be stored in an account holder behaviors database 60, for example. While shown in FIG. 1 as a single entity within AFSS 12, it is understood that account holder behaviors database 60 may, in some embodiments, be distributed across multiple databases and/or multiple physical/hardware memories, and/or may be wholly or partially external to (e.g., remote from) AFSS 12. In one embodiment, for example, account holder behaviors database 60 may be included within account records database 30. In still other embodiments, the environment 10 may not include account holder behaviors database 60, and behavior patterns may be only identified by behavior analysis unit 44 "on the fly" as needed by fraud detection/classification unit 36 (e.g., when needed to analyze a transaction in view of past spending patterns of a particular cardholder, etc.).

In some embodiments, behavior analysis unit 44 may separately analyze the transactions associated with each account holder, even if more than one account holder exists for a particular account. For example, behavior analysis unit 44 may independently analyze the transactions of each cardholder for a credit or debit card account in which each spouse has been issued a credit or debit card in his or her name. Fraud detection/classification unit 36 may then utilize the individual spending patterns when detecting and/or classifying fraud. In one embodiment where fraud detection/ classification unit 36 utilizes a dollar amount threshold to detect likely fraudulent transactions, for example, a first threshold may be used for transactions made by a first cardholder listed on an account, and a higher, second threshold may be used for transactions made by a second cardholder listed on the account. Further examples are provided below in connection with FIG. 8, according to various embodiments. In this manner, fraud detection and/or classification may be made more precise than would be the case if spending patterns were only identified at the aggregate level (e.g., using a single dollar amount threshold, regardless of which cardholder made a particular transaction).

Dispute resolution unit 46 may generally analyze financial transaction data and/or other information to automatically generate queries for cardholders or other customers. For example, dispute resolution unit 46 may analyze information obtained from account records database 30. The generated queries may be designed to help fraud detection/classification unit 36 determine whether a particular transaction was fraudulent, or estimate a probability that the transaction was fraudulent, etc. Dispute resolution unit 46 may also process responses from cardholders/customers, and automatically generate additional queries based upon those responses. Examples of the operation of dispute resolution unit 46 are provided below in connection with FIG. 4E, according to various embodiments.

Chargeback analysis unit 50 may generally analyze financial transaction and/or other information to identify transactions that are good candidates for chargeback payments. For example, chargeback analysis unit 50 may analyze information obtained from account records database 30 to determine whether there is a relatively high probability that the merchant (or an acquiring bank) should be responsible for a chargeback payment to a card issuer associated with FAMS 14. The operation of chargeback analysis unit 50, including the types of information analyzed and the ways in which that information is used to arrive at a result (e.g., flagging a transaction as a chargeback candidate), may be dictated by the rules stored in ML rules database 58. ML rule generator 40 may make use of chargeback rules obtained from a card network entity (e.g., from card network computing system 16), and stored in chargeback rules database 62, to generate and/or update the rules applied by chargeback analysis unit 50. Examples of the operation of chargeback analysis unit 50 are provided below in connection with FIG. 4B, according to various embodiments.

In some embodiments, transactions flagged by chargeback analysis unit 50 are subject to further, manual review using the chargeback rules stored in chargeback rules database 62. In other embodiments, chargeback analysis unit 50 (or another component of fraud detection/classification unit not shown in FIG. 1) automatically, with little or no manual input/assistance, applies the chargeback rules from chargeback rules database 62 for each flagged transaction. While shown in FIG. 1 as a single entity within AFSS 12, it is understood that chargeback rules database 62 may, in some embodiments, be distributed across multiple databases and/or multiple physical/hardware memories, and/or may be wholly or partially external to (e.g., remote from) AFSS 12.

Image analysis unit 52 may generally analyze image data corresponding to physical documents to identify fraudulent (e.g., counterfeit and/or forged) documents, and/or to flag potentially fraudulent documents for further (e.g., manual) review. For example, image analysis unit 52 may analyze information obtained from merchant computing systems 22 to determine whether there is a relatively high probability that documents presented to the merchants (e.g., personal checks, identification cards, etc.) are fraudulent. Image analysis unit 52 may be configured to analyze only a single type of document, or multiple types of documents. The operation of image analysis unit 52, including the image characteristics analyzed and the ways in which the characteristics may be used to arrive at a result (e.g., flagging a document as potentially fraudulent), may be dictated by the rules stored in ML rules database 58. Examples of the operation of image analysis unit 52 are provided below in connection with FIG. 4F, according to various embodiments.

Classification unit 54 may generally analyze broad categories of data from various sources (e.g., account records database 30, cardholder computing devices 20, merchant computing systems 22, and/or other sources 24) to categorize/classify types of suspected fraudulent financial activity. Classification unit 54 may classify fraudulent activity only within a particular subset of fraudulent financial activity (e.g., classifying debit and/or credit card transactions as involving a potential case of counterfeiting, skimming, lost/stolen card use, chargeback fraud, etc.), or may classify fraudulent financial activity across a broader spectrum (e.g., including types of identity theft not necessarily tied to a single financial transaction, such as application fraud). In some embodiments, classification unit 54 classifies suspected fraudulent activity in connection with a particular account or transaction in response to being notified of suspect activity (e.g., notified by another component of fraud detection/classification unit 36, or by a manual user input, etc.). In other embodiments, classification unit 54 itself (or another component of fraud detection/classification unit 36) identifies suspect activity before classification unit 54 classifies that activity. Examples of the operation of classification unit 54 are provided below in connection with FIGS. 4C and 9, according to various embodiments.

Notification unit 56 may generally provide alerts, confirmations, and/or other notifications to various individuals (e.g., customers, bank employees associated with FAMS 14, third party employees associated with AFSS 12, etc.). For example, notification unit 56 may generate a notification message stating that a fraud alert associated with a particular transaction is a false positive, and cause network interface 32 to send the message to a computer terminal or to FAMS 14 for display to a system user. As another example, notification unit 56 may cause network interface 32 to send other flagged transactions and/or documents (e.g., chargeback candidates identified by chargeback analysis unit 50, documents that image analysis unit 52 has identified as potentially fraudulent, etc.) to a computer terminal or FAMS 14 for display to a system user. As yet another example, notification unit 56 may cause network interface 32 to send queries generated by dispute resolution unit 46 to various ones of cardholder computing devices 20 for display to cardholders.

The operation of various components of the environment 10 shown in FIG. 1, according to different embodiments and/or scenarios, will be described further below in connection with the remaining figures.

Figure 2:
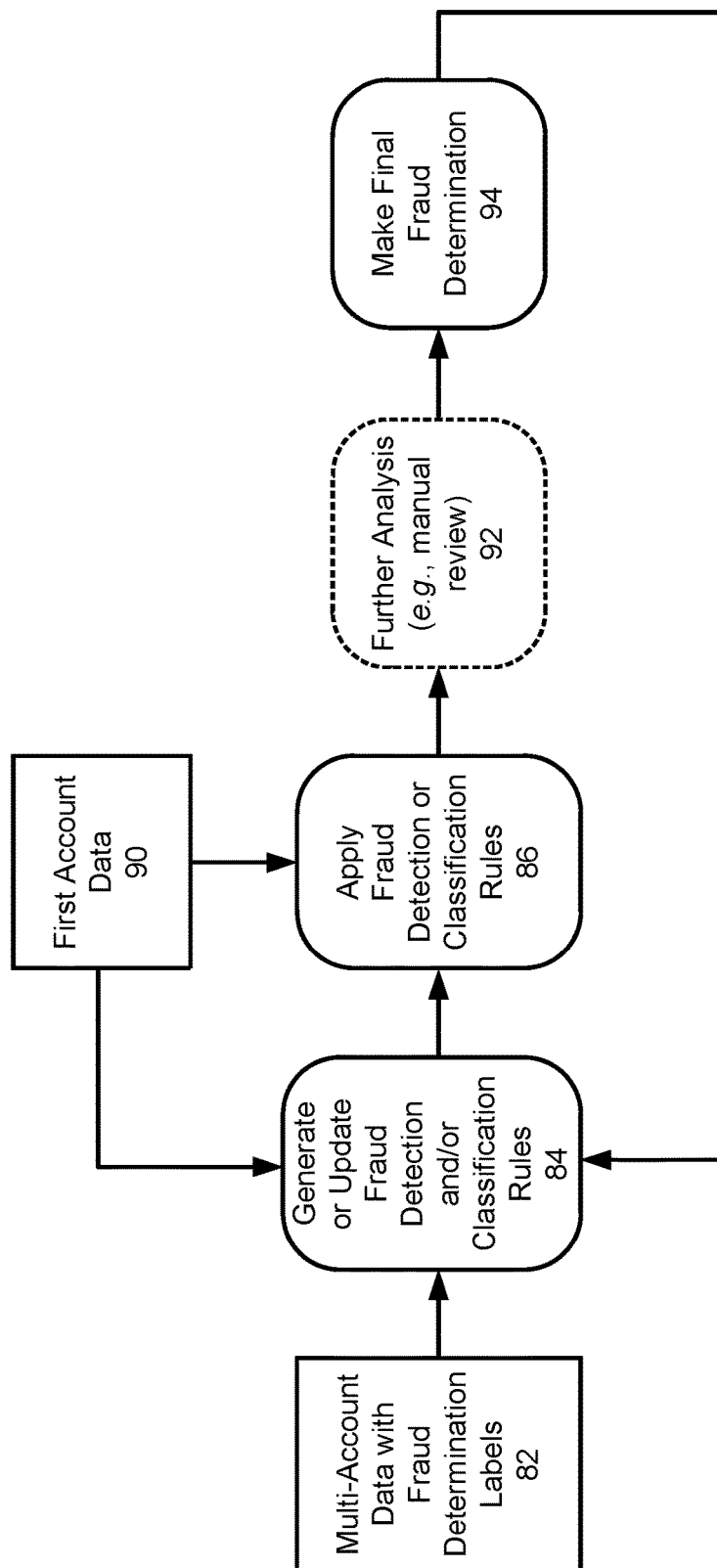
FIG. 2 depicts an exemplary process flow for machine learning of fraud detection, verification and/or classification rules, according to one embodiment.

III. Exemplary Process Flows for Machine Learning of Fraud Detection and/or Classification Rules As discussed above, ML rule generator 40 may generate and/or update rules that are used for one or more of a variety of different purposes relating to fraud detection and/or classification. FIG. 2 depicts one generalized, example process flow 80 for machine learning that may be implemented by ML rule generator 40, and possibly one or more other components of fraud detection/classification unit 36.

In the process flow 80, multi-account data 82 may represent data associated with multiple financial accounts, each with one or more account holders. The financial accounts may be existing or potential accounts, and the account holders may include holders of accounts and/or potential holders of potential accounts. For example, the multi-account data 82 may include existing and/or applied-for credit card accounts, debit card accounts, savings accounts, checking accounts, investment accounts, loan accounts, etc.

Depending upon the embodiment, the multi-account data 82 may include one or more different types of information obtained (e.g., by external data collection unit 42 of FIG. 1) from one or more of FAMS 14, cardholder computing devices 20, merchant computing systems 22, and/or other sources 24. For example, the multi-account data 82 may include transaction data (e.g., transaction dates, amounts, locations, etc.) from account records database 30 of FAMS 14, data indicative of Internet Protocol (IP) addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of cardholder vehicles, home occupancy and/or usage data (e.g., smart appliance data) from smart home systems of cardholders, autonomous or smart vehicle data, vehicle navigation system data, mobile device data, mobile device and/or vehicle GPS data, and/or one or more other types of data. In some embodiments, the multi-account data 82 only includes data that account holders or potential account holders have expressly consented to share with an entity associated with FAMS 14 and/or AFSS 12 (e.g., in exchange for fraud protection services). In certain other embodiments, however, express consent is only needed for certain types of information, such as browsing history information, vehicle telematics data, etc.

The multi-account data 82 may be associated with multiple fraud determination labels. The labels may simply reflect whether or not fraud existed (e.g., "fraud" or "no fraud"), or may also indicate a type or class of fraud (e.g., "counterfeiting," "lost or stolen card use," etc.), for example. In one embodiment, each of a number of data sets in the multi-account data 82 is associated with such a label, and includes data relating to a particular financial transaction, financial account, loan application, etc., for which the fraud determination was made (e.g., after a manual and/or automated fraud investigation). The labels may include final fraud determinations that were made via earlier iterations of the process flow 80, and/or external to the process flow 80.

To provide a more detailed example, a first data set associated with a "card present" credit card transaction may include data describing that transaction (e.g., from account records database 30) and data indicative of the cardholder's online browsing activity (e.g., from one of cardholder computing devices 20) for the 15 days immediately preceding the transaction, and be labeled "confirmed fraud." A second data set, associated with another "card present" transaction (for the same account, or for a different account), may include the same general types of data but be labeled "no fraud," and so on. In some embodiments and/or scenarios, the same data may appear in, or be used by, two or more of the data sets. If the two "card present" transactions described above are both associated with the same account, for example, and if the second transaction occurred less than 15 days after the first transaction, some of the same online activity data may be shared by the first and second data sets.

At a process stage 84, the multi-account data 82 may be analyzed to generate fraud detection and/or classification rules (e.g., to be stored in ML rules database 58). Any suitable type of supervised machine learning program/technique(s) may be used, such as SVMs, neural networks, logistic regression, etc. Generally, process stage 84 may serve to identify which type(s) of data is/are probative of whether fraud has occurred (and/or the type/category of fraud that may have occurred), and to determine the data values and/or combinations that are probative of whether fraud has occurred (and/or the type/category of fraud that may have occurred). By analyzing many (e.g., thousands) of positively and negatively labeled data sets in the multi-account data 82, for example, process stage 84 may learn that certain spending patterns within a threshold time of a transaction tend to indicate that the cardholder made the transaction (e.g., thereby indicating that fraud has not occurred, or that a fraud report is itself fraudulent or mistaken, etc.), that certain types of online searches by a cardholder (e.g., including a descriptor of a product purchased in the transaction, or a name of the merchant, etc.) tend to indicate that the cardholder made the transaction, that the cardholder's distance from the site of a "card present" transaction (e.g., as determined from GPS information provided by the cardholder's smartphone, wearable electronics, or vehicle) relates to the probability of fraudulent activity according to a particular equation, and so on. Other specific examples of such rules, and how those rules may be generated, are discussed below in connection with FIGS. 3A-3F and 4A-4F, according to various embodiments.

At process stage 86, the rules generated or updated at process stage 84 may be applied to first account data 90 associated with a particular account and customer(s) (e.g., a customer associated with a particular one of computing devices 20). The types of data included in first account data 90 may depend upon which types of data were determined, by process stage 84, to be relevant to a fraud determination. For example, if the rules give weight to the amount and date of a financial transaction when determining whether the transaction is fraudulent, and also give weight to whether the account holder visits a particular type of website, then the first account data 90 may include the amount and date of one or more transactions, as well as data indicative of visited web sites (e.g., Uniform Resource Locators (URLs) and/or content of visited websites, etc.). The first account data 90 may include information obtained (e.g., by external data collection unit 42) from one or more of FAMS 14, one of cardholder computing devices 20 associated with the customer holding the first account, one or more of merchant computing systems 22, and/or one or more of other sources 24, for example.

Process stage 86 may output various different types of information, depending upon the embodiment and/or scenario. For example, depending upon the content of first account data 90 and the rules generated or updated at process stage 84, process stage 86 may generate data indicating that a particular financial transaction associated with first account data 90 is, or is not, fraudulent or potentially fraudulent. Alternatively, or additionally, process stage 86 may generate data indicating a particular classification for fraudulent or suspected fraudulent activity (e.g., a fraudulent transaction) associated with first account data 90.

In some embodiments, further analysis (e.g., a manual review, or further automated review using additional data sources, etc.) may be performed at an additional stage, shown in dashed lines in FIG. 2 as process stage 92. The additional analysis may then be used to make a final fraud determination (e.g., a final decision on whether fraud occurred, and/or on the type of fraud that occurred) at process stage 94. In other embodiments, process stage 92 is omitted from process flow 80, and process stage 94 merely represents the output of process stage 86. The final determination made at process stage 94, along with the first account data 90 used to make that determination, may be fed back into process stage 84 to provide additional labeled data for purposes of updating the rules.

In some embodiments, the process flow 80 includes more, fewer and/or different stages, such as any of those discussed elsewhere herein (e.g., in connection with FIGS. 3A-3F). In one alternative embodiment, process stages 84 and 86 may be combined. For example, the multi-account data 82 may be unlabeled rather than labeled (or the labels may be ignored), and the combined process stage 84, 86 may use unsupervised learning techniques (e.g., clustering techniques) to classify anomalous/outlier financial transactions, accounts, applications, etc., as "suspect" and needing further analysis.

More specific, machine learning-based process flows generally corresponding to process flow 80 of FIG. 2 will now be described with reference to FIGS. 3A-3F. It is noted, however, that other process flows are also within the scope of the invention described herein. Moreover, while FIGS. 3A-3F generally correspond to embodiments in which supervised machine learning techniques are used, other embodiments may instead use unsupervised machine learning techniques, as noted above. In various different embodiments, fraud detection/classification unit 36 may be configured to implement only one of the process flows of FIGS. 3A-3F, or may be configured to implement two or more (e.g., all) of the process flows shown in FIGS. 3A-3F.

A. Exemplary Process Flow for Machine Learning of Fraud Detection Rules Using Online Activity Data Referring first to FIG. 3A, an exemplary process flow 100 may generally be used to detect fraud using customer online activity data. In the process flow 100, multi-customer online activity data 102 may represent data associated with the online activities of a number (e.g., thousands) of customers (e.g., credit or debit cardholders, checking or saving account holders, etc.). The multi-customer online activity data 102 may include data indicating actions that the customers took, and/or web sites visited by the customers, while the customers were connected to the Internet via web browsers (e.g., executing on respective ones of cardholder computing devices 20). For example, the multi-customer online activity data 102 may include URLs of, and/or content (e.g., text) within, web sites visited by customers, search terms entered by customers using search engine tools, search results presented to customers by search engine tools, indications of interactive controls (e.g., virtual buttons) selected by customers on various web pages, and so on.

The multi-customer online activity data 102 may include data obtained (e.g., by external data collection unit 42 of FIG. 1) from cardholder computing devices 20, from one or more ISPs of other sources 24, and/or from a third party aggregator of such information, for example. In some embodiments, the multi-customer online activity data 102 may only include data that customers have expressly consented to share with an entity associated with FAMS 14 and/or AFSS 12 (e.g., in exchange for fraud protection services or other benefits, such as discounts).

As described above in connection with multi-account data 82 of process flow 80, the multi-customer online account data 102 may be associated with multiple fraud determination labels. In some embodiments, each label may be associated with a data set that includes not only the corresponding portion of multi-customer online activity data 102, but also one or more other types of data, such as transaction data (e.g., transaction dates, amounts, locations, etc.) for each customer from account records database 30 of FAMS 14, data indicative of IP addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of other sources 24, home occupancy and/or usage data (e.g., smart appliance data) from smart home systems of other sources 24, and so on. The labels may include final fraud determinations that were made via earlier iterations of the process flow 100, and/or external to the process flow 100. Multi-customer online account data 102 may include many (e.g., thousands) of positively and negatively labeled data sets.

At a process stage 104, the multi-customer online activity data 102 may be analyzed to generate fraud detection rules (e.g., to be stored in ML rules database 58). As described above in connection with process stage 84 of process flow 80, any suitable type of supervised machine learning program/technique(s) may be used. Generally, process stage 104 may serve to identify which type(s) of online activity data is/are probative of whether fraud has occurred, and to determine the data values and/or combinations that are probative of whether fraud has occurred. While not shown in FIG. 3A, the fraud detection rules may not only detect fraud, but also classify fraud (e.g., as described below in connection with FIG. 3C), in some embodiments.

At process stage 106, the rules generated or updated at process stage 104 may be applied to first customer online activity data 110. The first customer online activity data 110 may be associated with a particular customer, such as a customer associated with a particular one of computing devices 20, for example. The types of data included in first customer online activity data 110 may depend upon which types of online activity data were determined, by process stage 104, to be relevant to a fraud determination. For example, the first customer online activity data 110 may include information obtained (e.g., by external data collection unit 42) from one of cardholder computing devices 20 (i.e., the device associated with the first customer), and/or from an ISP of other sources 24. Some specific examples of rules that may be generated by process stage 104, and applied at process stage 106, are described below in connection with FIG. 4A.

Process stage 106 may output various different types of information, depending upon the embodiment and/or scenario. For example, depending upon the content of first customer online activity data 110 and the rules, process stage 106 may generate data indicating that a particular financial transaction associated with the first customer is, or is not, fraudulent or potentially fraudulent. Alternatively, or additionally, process stage 106 may generate data indicating a particular classification of fraudulent or potentially fraudulent activity associated with first customer online activity data 110.

Figure 3A:
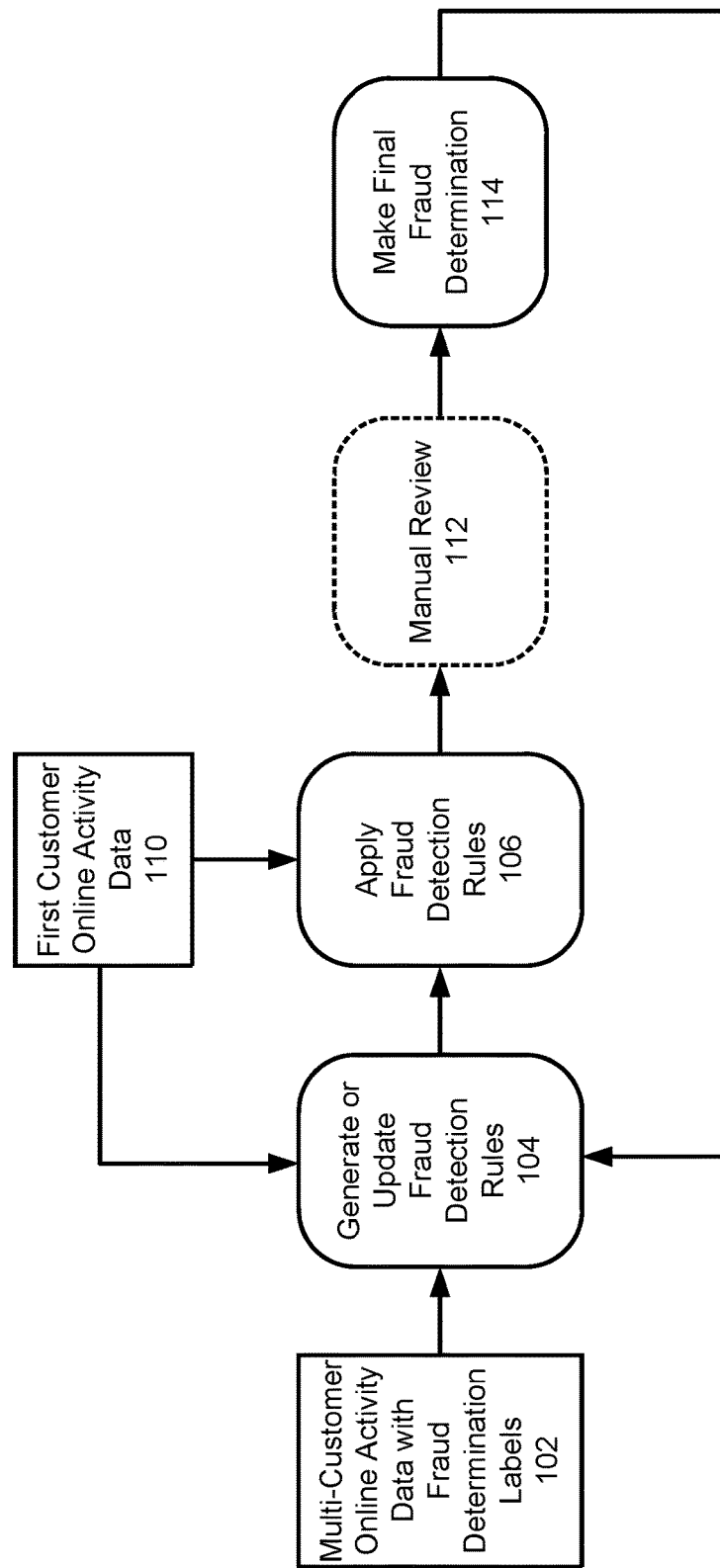
FIGS. 3A-3F depict exemplary process flows for machine learning of particular types of fraud detection, verification and/or classification rules, according to different embodiments.
Figure 3B:
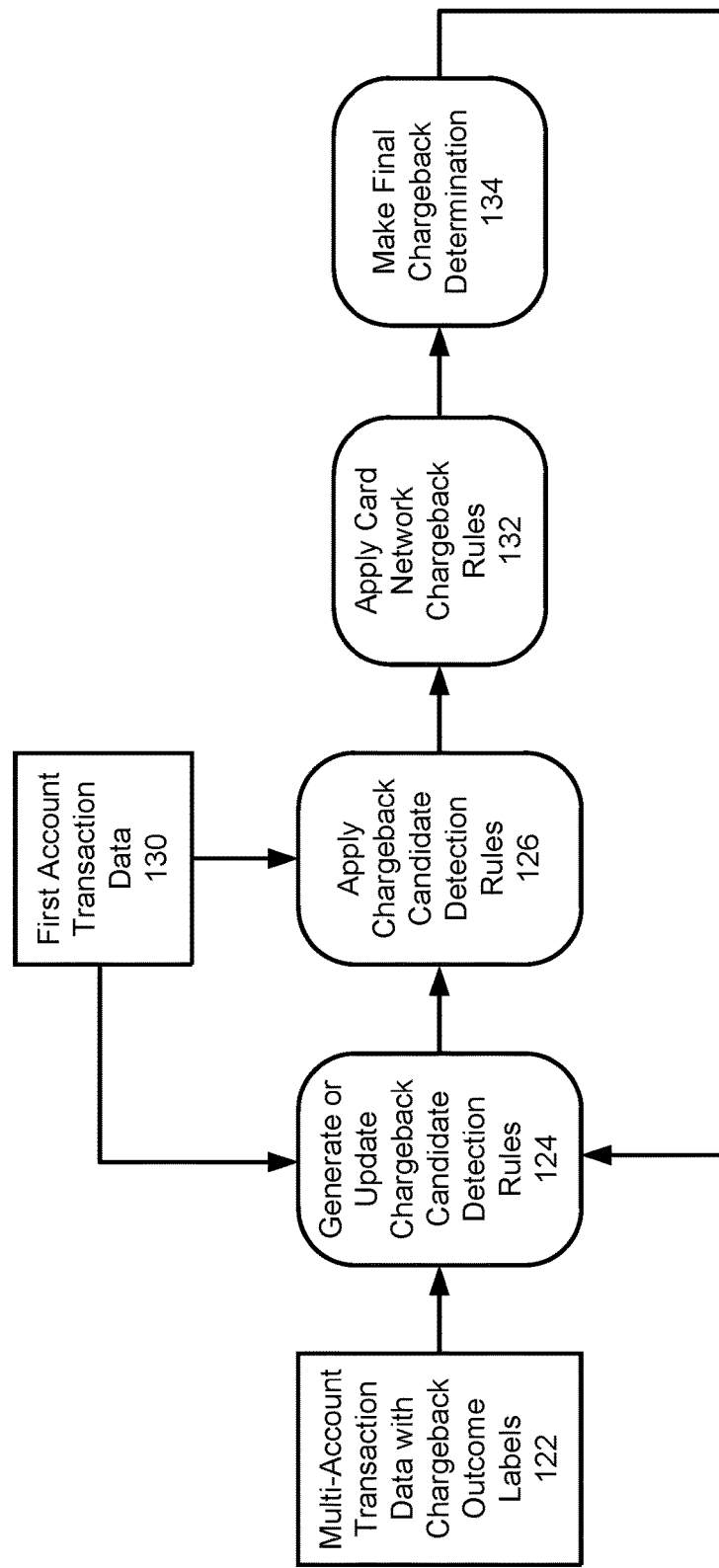

In some embodiments, further analysis (e.g., a manual review, or further automated review using additional data sources, etc.) is performed at an additional stage, shown in dashed lines in FIG. 3A as process stage 112. The additional analysis may then be used to make a final fraud determination (e.g., a final decision on whether fraud occurred, and/or on the type of fraud that occurred) at process stage 114. In other embodiments, process stage 112 is omitted from process flow 100, and process stage 114 merely represents the output of process stage 106.

The final determination made at process stage 114, along with the first customer online activity data 110 (and any other data) used to make that determination, may be fed back into process stage 104 to provide additional labeled data for purposes of updating the rules. In some embodiments, a preliminary fraud determination made at process stage 106 is also fed back into process stage 104, to allow the machine learning program to determine and improve upon past performance/accuracy.

B. Exemplary Process Flow for Machine Learning of Chargeback Candidate Detection Rules Referring next to FIG. 3B, an exemplary process flow 120 may generally be used to identify the financial transactions for which chargebacks (e.g., post-transaction payments from merchants, or acquiring/merchant banks, back to the issuer to return proceeds from transactions) are appropriate. In the process flow 120, multi-account transaction data 122 may represent data associated with the financial transactions involving the accounts of a number (e.g., thousands) of credit or debit cardholders. The multi-account transaction data 122 may include information such as transaction dates, transaction amounts, merchant names (and/or aliases) associated with the transaction, information relating to how the card information was collected by the merchant (e.g., by swiping, an EMV chip reader, manual entry of the card number, etc.), geographic locations of "card present" transactions, and so on. The multi-account transaction data 122 may include data obtained (e.g., by external data collection unit 42 of FIG. 1) from merchant computing systems 22 and/or from acquiring/merchant banks associated with those merchants, for example.

Similar to the labels described above in connection with multi-account data 82 of process flow 80, the multi-account transaction data 122 may be associated with multiple chargeback outcome labels. For example, each label may be associated with a data set that includes the corresponding portion of multi-account transaction data 122. The outcome labels may include final chargeback determinations that were made (in connection with the transactions represented in multi-account transaction data 122) via earlier iterations of the process flow 120, and/or external to the process flow 120. Multi-account transaction data 122 may include many (e.g., thousands) of positively and negatively labeled data sets.

At a process stage 124, the multi-account transaction data 122 may be analyzed to generate chargeback candidate detection rules (e.g., to be stored in ML rules database 58). As described above in connection with process stage 84 of process flow 80, any suitable type of supervised machine learning program/technique(s) may be used. Generally, process stage 124 may serve to identify which type(s) of transaction data is/are probative of whether, under the full chargeback rules of the card network entity, a chargeback is appropriate for a given transaction. Process stage 124 may also determine the transaction data values and/or combinations that are probative of whether a chargeback is appropriate for the transaction.

At a process stage 126, the rules generated or updated at process stage 124 may be applied to first account transaction data 130 to determine whether a transaction associated with the first account is a "good" chargeback candidate. Put differently, process stage 126 may, instead of applying the full chargeback rules of the card network entity (which may be quite lengthy and complex) to the facts surrounding the transaction, use various factors and algorithms developed at process stage 124 to determine whether there exists a relatively high probability that a chargeback would be appropriate for the transaction if the full chargeback rules were applied. The process stage 126 may calculate a percentage probability that the transaction is one in which a chargeback is appropriate, for example.

The first account transaction data 130 may be associated with the account of a particular cardholder or cardholders, such as a cardholder associated with a particular one of cardholder computing devices 20, for example. The types of data included in first account transaction data 130 may depend upon which types of transaction-related data were determined, by process stage 124, to be relevant to a chargeback candidate determination. For example, the first account transaction data 130 may include information obtained (e.g., by external data collection unit 42) from one of merchant computing systems 22 (e.g., the computing system of the merchant involved in the transaction being analyzed) and/or from an acquiring/merchant bank associated with that merchant. The first account transaction data 130 may also include information about one or more other transactions associated with the first account (e.g., data pertaining to other transactions occurring shortly before and/or after the transaction at issue). Some specific examples of rules that may be generated by process stage 124, and applied at process stage 126, are described below in connection with FIG. 4B.

Process stage 126 may output information indicating whether the particular transaction represented by first account transaction data 130 is a "good" candidate for chargeback detection. For example, process stage 126 may output a percentage probability, calculated according to the rules generated or updated at process stage 124, that the transaction is one in which a chargeback is appropriate. As another example, process stage 126 may output a binary indicator of whether the transaction is, or is not, a strong/ likely chargeback candidate (e.g., by comparing the percentage probability to a threshold probability).

If the transaction is identified as a chargeback candidate at process stage 126, the full chargeback rules of the card network entity may be applied at a process stage 132. Process stage 132 may include manual application of the full chargeback rules, and/or automated application of the full chargeback rules, in various different embodiments. Based upon the analysis at process stage 132, a final chargeback determination may be made at a process stage 134. The final determination made at process stage 134, along with the first account transaction data 130 (and any other data) used to make that determination, may be fed back into process stage 124 to provide additional labeled data for purposes of updating the rules. In some embodiments, the indication of whether the transaction is a good chargeback candidate generated at process stage 126 may also be fed back into process stage 124, to allow the machine learning program to determine and improve upon past performance/accuracy.

C. Exemplary Process Flow for Machine Learning of Fraud Classification Rules

Figure 3C:
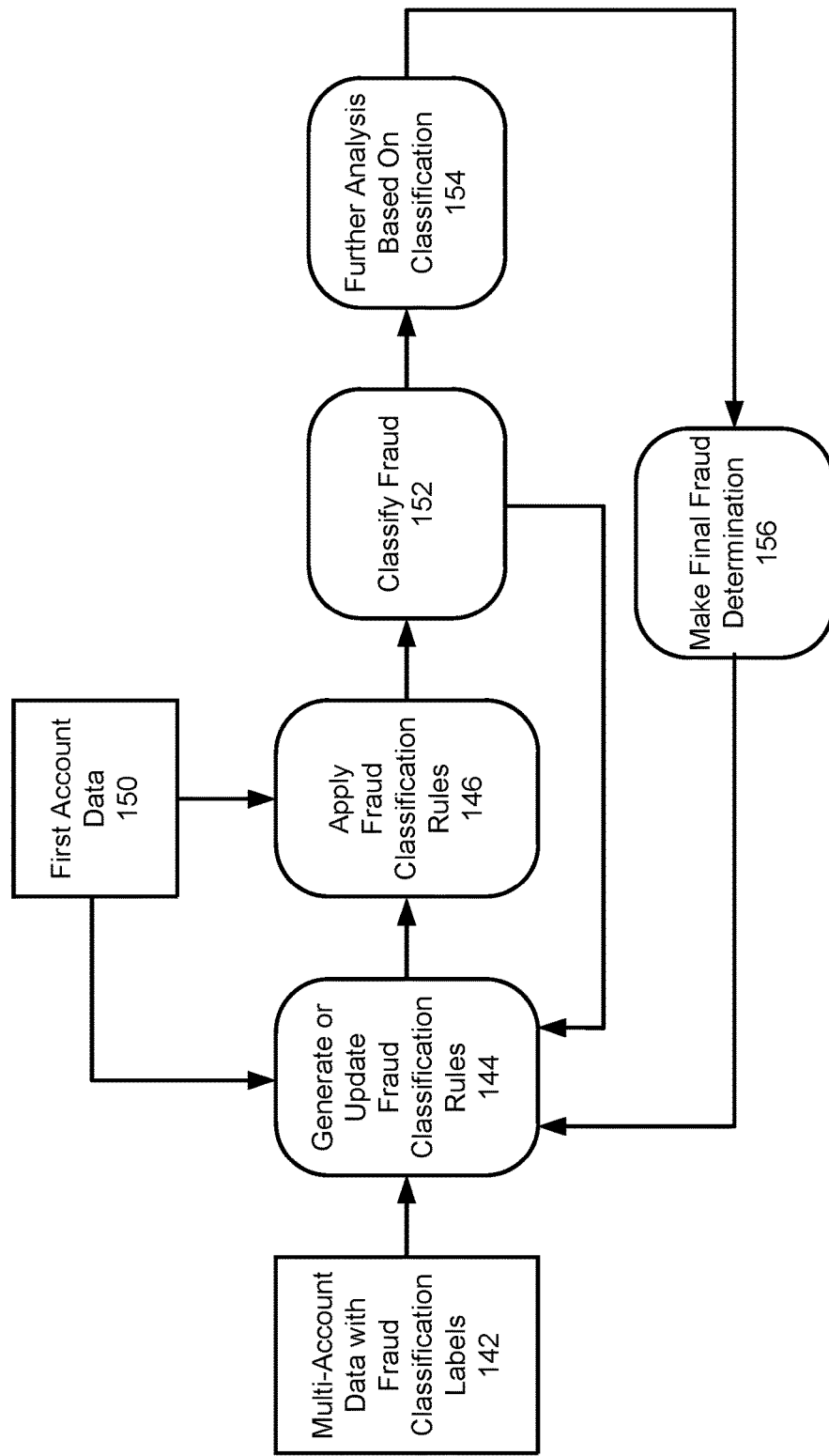

Referring now to FIG. 3C, an exemplary process flow 140 may generally be used to classify instances of suspected or potential fraud. For example, the process flow 140 may represent ongoing, real-time or batch processing of a large amount of data associated with a large number of potential and/or existing financial accounts (e.g., all accounts associated with a particular bank, or all accounts opting in to a fraud protection program, etc.). In this manner, the process flow 140 may be used to initially flag situations for closer investigation, and provide one or more classifications of the type(s) of fraud potentially at issue in order to narrow or otherwise facilitate the investigation. In other embodiments, the process flow 140 may be used to provide a narrower classification (e.g., "skimming") when a broader class of fraud (e.g., credit card fraud) is already suspected.

In the process flow 140, multi-account data 142 may represent data associated with financial accounts of a number (e.g., thousands) of account holders. The financial accounts may be existing or potential accounts, and the account holders may include holders of accounts and/or potential holders of potential accounts. For example, the multi-account data 142 may include existing and/or applied-for credit card accounts, debit card accounts, savings accounts, checking accounts, investment accounts, loan accounts, etc.

Depending upon the embodiment, the multi-account data 142 may include one or more different types of information obtained (e.g., by external data collection unit 42 of FIG. 1) from one or more of FAMS 14, cardholder computing devices 20, merchant computing systems 22, and/or other sources 24. For example, the multi-account data 142 may include transaction data (e.g., transaction dates, amounts, locations, etc.) from account records database 30 of FAMS 14, data indicative of IP addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of cardholder vehicles, home occupancy and/or usage data (e.g., smart appliance data) from smart home systems of cardholders, and/or one or more other types of data. Some or all data within multi-account data 142 may be information that account holders or potential account holders have expressly consented to share with an entity associated with FAMS 14 and/or AFSS 12 (e.g., in exchange for fraud protection services).

The multi-account data 142 may be associated with multiple fraud determination labels, each indicating a type or class of fraud (e.g., "counterfeiting," "lost or stolen card use," "skimming," "chargeback fraud," "application fraud," etc.), or indicating a lack of fraud, for example. In one embodiment, each of a number of data sets in the multi-account data 142 is associated with at least one such classification/label, and includes data relating to a particular financial transaction, financial account, loan application, etc., for which the fraud classification or classifications was/were made (e.g., after a previous iteration of process flow 140, or after another manual and/or automated fraud investigation). Multi-account data 142 may include many (e.g., thousands) of data sets labeled with various known fraud classifications.

At a process stage 144, the multi-account data 142 may be analyzed to generate fraud classification rules (e.g., to be stored in ML rules database 58). As described above in connection with process stage 84 of process flow 80, any suitable type of supervised machine learning program/technique(s) may be used. Generally, process stage 144 may serve to identify which type(s) of transaction data is/are probative of the particular type of fraud (if any) that has occurred. Process stage 144 may also determine the data values and/or combinations that are probative of the particular type of fraud (if any) that has occurred.

At a process stage 146, the rules generated or updated at process stage 144 may be applied to first account data 150. The first account data 150 may be associated with a particular account and a particular customer (e.g., a cardholder associated with a particular one of computing devices 20). The types of data included in first account data 150 may depend upon which types of data were determined, by process stage 144, to be relevant to fraud classification. For example, the first account data 150 may include information obtained (e.g., by external data collection unit 42) from one or more of FAMS 14, one of cardholder computing devices 20 (i.e., the device associated with the customer holding or applying for the first account), one or more of merchant computing systems 22, and/or one or more of other sources 24. Some specific examples of rules that may be generated by process stage 144, and applied at process stage 146, are described below in connection with FIG. 4C.

Process stage 146 may output data (e.g., a message or code) that is used to classify suspected fraudulent activity (in connection with the account associated with first account data 150) at a process stage 152. For example, process stage 152 may assign a classification of "counterfeiting" if process stage 146 determined that the first account data 150 indicated a number of circumstances that, according to the rules generated at process stage 144, are known to be correlated with counterfeiting activity (e.g., two "card present" transactions occurring in different states within the same one-hour time period, etc.). In some embodiments and/or scenarios, two or more classifications may concurrently be assigned to first account data 150. For example, process stage 146 may determine a set of probabilities for a set of two or more potential types of fraud, and process stage 152 may assign each classification, with each respective probability, to first account data 150. Moreover, in some embodiments and scenarios, process stage 152 may assign a classification that corresponds to an absence of any suspected fraud (e.g., "no fraud").

At a process stage 154, if process stage 152 assigned a classification other than one indicating the absence of suspected fraud, the first account data 150, and/or other information associated with the account and the suspected class of fraud, may be analyzed in depth to make a final fraud determination at a process stage 156. Generally, the fraud classification may be used to facilitate the analysis at process stage 154, with process stage 154 including manual and/or automated fraud detection techniques. For example, personnel associated with AFSS 12 may use the fraud classification(s) to inform their strategy and/or focus with respect to conducting an in-depth fraud investigation.

The additional analysis at process stage 154 may then result in a final fraud determination at process stage 156. The final determination may indicate both whether fraud occurred and, if so, the class(es)/type(s) of fraud that occurred. The final determination made at process stage 156, and information used to make that determination (e.g., the first account data 150 and potentially other data), may be fed back into process stage 144 to provide additional labeled data for purposes of updating the rules. In some embodiments, the (preliminary) fraud classification made at process stage 152 may also be fed back into process stage 144 to help the machine learning program identify instances in which the preliminary classifications at process stage 152 were incorrect. Process stage 144 may then update the fraud classification rules in ways that seek to prevent or reduce such instances in the future.

D. Exemplary Process Flow for Machine Learning of Application Fraud Detection Rules Referring now to FIG. 3D, an exemplary process flow 160 may generally be used to detect application fraud. "Application fraud" may generally refer to fraud in connection with the application for any type of financial account, loan and/or line of credit (e.g., mortgage loan, vehicle loan, small business loan, payday loan, home equity line of credit, credit card account, debit card account, checking account, savings account, investment account, etc.). In some embodiments and/or scenarios, however, the application may be for non-financial purposes, such as an application for membership in a particular group or institution, for example.

In the process flow 160, multi-applicant search history data 162 may represent data associated with the Internet search history of a number (e.g., thousands) of applicants. The multi-applicant search history data 162 may include search terms entered by the applicants using online search engine tools, for example, and/or the results of such searches (e.g., URLs, titles and/or contents of search results), for example.

The multi-applicant search history data 162 may include data obtained (e.g., by external data collection unit 42 of FIG. 1) from cardholder computing devices 20, from one or more ISPs of other sources 24, and/or from a third party aggregator of such information, for example. In some embodiments, the multi-applicant search history data 162 only includes data that the applicants have expressly consented to share with an entity associated with FAMS 14 and/or AFSS 12 (e.g., in exchange for consideration of their applications).

As described above in connection with multi-account data 82 of process flow 80, the multi-applicant search history data 162 may be associated with multiple fraud determination labels. In some embodiments, each label may be associated with a data set that corresponds to an application submitted by a particular applicant, where the data set includes the corresponding portion of multi-applicant search history data 162 (e.g., the search terms and/or results associated with the particular application). The labels may include final fraud determinations that were made via earlier iterations of the process flow 160, and/or external to the process flow 160. Multi-applicant search history data 162 may include many (e.g., thousands) of positively and negatively labeled data sets.

At a process stage 164, the multi-applicant search history data 162 may be analyzed to generate application fraud detection rules (e.g., to be stored in ML rules database 58). As described above in connection with process stage 84 of process flow 80, any suitable type of supervised machine learning program/technique(s) may be used. Generally, process stage 164 may serve to identify which type(s) of Internet search-related data is/are probative of whether application fraud has occurred, and to determine the data values and/or combinations that are probative of whether application fraud has occurred.

At process stage 166, the rules generated or updated at process stage 164 may be applied to first applicant search history data 170. The first applicant search history data 170 may be associated with a particular application and a particular applicant (e.g., a person associated with a particular one of computing devices 20), for example. The types of data included in first applicant search history data 170 may depend upon which types of Internet search-related data were determined, by process stage 164, to be relevant to a fraud determination. The first applicant search history data 170 may include information obtained (e.g., by external data collection unit 42) from one of computing devices 20 (i.e., the device associated with the first applicant), and/or from an ISP of other sources 24, for example. Some specific examples of rules that may be generated by process stage 164, and applied at process stage 166, are described below in connection with FIG. 4D.

Process stage 166 may output information indicating whether fraud is suspected in connection with the application corresponding to first applicant search history data 170. For example, process stage 166 may output a percentage probability, calculated according to the rules generated or updated at process stage 164, that the application was fraudulently made (e.g., by someone other than the purported applicant or an authorized representative thereof). As another example, process stage 166 may output a binary indicator of whether the application likely was, or likely was not, fraudulently made (e.g., by comparing a percentage probability to a threshold probability).

Figure 3D:
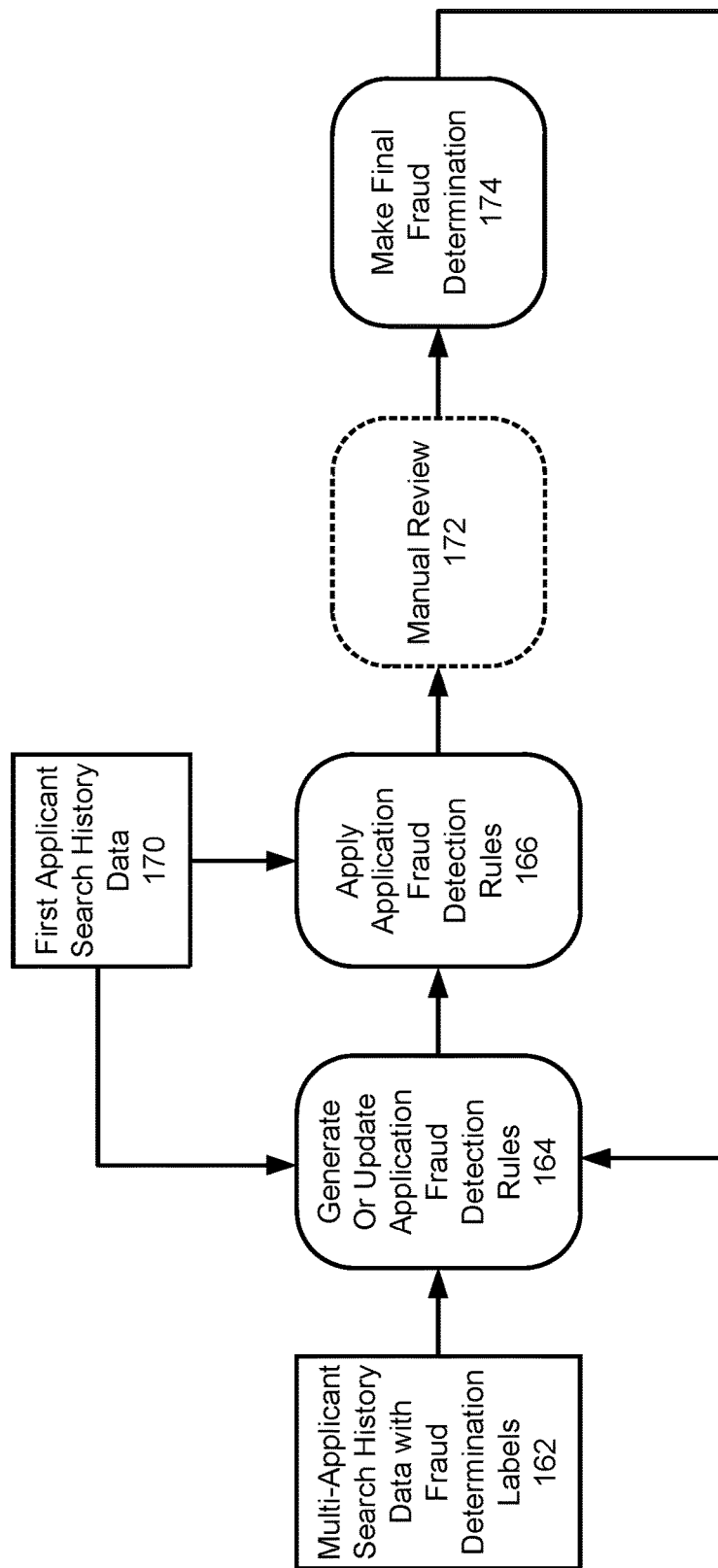

In some embodiments, further analysis (e.g., a manual review, or further automated review using additional data sources, etc.) is performed at an additional stage, shown in dashed lines in FIG. 3D as process stage 172. The additional analysis may then be used to make a final fraud determination (e.g., a final decision on whether application fraud occurred) at process stage 174. In other embodiments, process stage 172 is omitted from process flow 160, and process stage 174 merely represents the output of process stage 166. The final determination made at process stage 174, along with the first applicant search history data 170 (and any other data) used to make that determination, may be fed back into process stage 164 to provide additional labeled data for purposes of updating the rules. In some embodiments, a preliminary fraud determination made at process stage 166 is also fed back into process stage 164, to allow the machine learning program to determine and improve upon past performance/accuracy.

E. Exemplary Process Flow for Machine Learning of Fraud Dispute Resolution Rules Referring now to FIG. 3E, an exemplary process flow 180 may generally be used to facilitate the resolution of fraud disputes (or potential disputes) with customers/account holders. For example, the process flow 180 may be used to determine whether a reportedly unauthorized or fraudulent transaction (e.g., one that the account holder reported as such when looking at his or her account statement) was indeed unauthorized or fraudulent. In some embodiments, the process flow 180 may also, or instead, be used to determine whether an "unrecognized" transaction (i.e., one that the account holder does not recall, but does not necessarily report as fraudulent) was unauthorized or fraudulent.

In the process flow 180, multi-account data 182 may represent data associated with financial accounts of a number (e.g., thousands) of account holders. For example, the multi-account data 182 may include data associated with financial transactions relating to credit card accounts, debit card accounts, savings accounts, checking accounts, etc. For ease of explanation, FIG. 3E will be described with reference to an embodiment in which the accounts are credit card accounts.

In one embodiment, the multi-account data 182 may include transaction data (e.g., transaction dates, amounts, locations, etc.) obtained from FAMS 14 (e.g., by external data collection unit 42 of FIG. 1). In some embodiments, however, the multi-account data 182 also includes information obtained from cardholder computing devices 20, merchant computing systems 22, and/or other sources 24. For example, the multi-account data 182 may include, in addition to transaction data from account records database 30 of FAMS 14, data indicative of IP addresses of cardholder computing devices 20 and/or devices in merchant computing systems 22, Internet browsing and/or search history data from cardholder computing devices 20 (or from an ISP computer system included in other sources 24, etc.), vehicle telematics data from telematics systems of cardholder vehicles, home occupancy and/or usage data (e.g., smart appliance data) from smart home systems of cardholders, autonomous vehicle data, smart vehicle data, mobile device data, vehicle or mobile device GPS data, and/or one or more other types of data. Some or all data within multi-account data 182 may be information that account holders or potential account holders have expressly consented to share with an entity associated with FAMS 14 and/or AFSS 12 (e.g., in exchange for fraud protection services).

As described above in connection with multi-account data 82 of process flow 80, the multi-account data 182 may be associated with multiple fraud determination labels (e.g., "fraud" and "no fraud," and/or more complex labels that indicate type/class, such as "lost/stolen card use," etc.). In some embodiments, each label may be associated with a data set that includes the corresponding portion of multi-account data 182. The labels may include final fraud determinations that were made via earlier iterations of the process flow 180, and/or external to the process flow 180. Multi-account data 182 may include many (e.g., thousands) of positively and negatively labeled data sets.

At a process stage 184, the multi-account data 182 may be analyzed to generate query generation rules (e.g., to be stored in ML rules database 58). As described above in connection with process stage 84 of process flow 80, any suitable type of supervised machine learning program/technique(s) may be used. Generally, process stage 184 may serve to identify which types of information are probative of whether fraud has occurred, and to craft rules that formulate queries to ascertain such information based upon account data.

For example, process stage 184 may determine that, for a suspect "card present" transaction, a verified, non-fraudulent "card present" transaction within 10 miles and 3 hours of the suspect transaction is probative of whether the suspect transaction was fraudulent. Based upon this finding, process stage 184 may also generate a rule specifying that a cardholder should be queried as to whether he/she can confirm making each "card present" transaction within 10 miles and 3 hours of the suspect transaction. As another example, process stage 184 may determine that a merchant using a billing alias different from its legal and/or commonly-known name (e.g., by at least some threshold level of similarity, as measured by number of similar characters, order of characters, etc.) is probative of whether the cardholder authorized a transaction associated with that billing alias. Based upon this finding, process stage 184 may generate a rule specifying that a cardholder should be queried as to whether he/she is aware of a billing alias used for a suspect transaction if that billing alias is sufficiently different from the legal/common name of the merchant.

At process stage 186, the rules generated or updated at process stage 184 may be applied to first account data 190. The first account data 190 may be associated with a particular cardholder, such as a cardholder associated with a particular one of cardholder computing devices 20, for example. The types of data included in first account data 190 may depend upon which types of data were determined, by process stage 184, to be relevant to developing dispute resolution queries. Process stage 186 may generate a set of one or more queries in accordance with the rules and the contents of first account data. Some specific examples of rules that may be generated by process stage 184 and applied at process stage 186, and the queries that may be generated as a result, are described below in connection with FIG. 4E.

At a process stage 192, the generated queries may be sent to the cardholder in one or more of various ways, such as sending the queries via SMS text message and/or email, and/or via a web browser or dedicated application executing on the one of cardholder computing devices 20 that is associated with the cardholder, for example. At a process stage 194, responses to the queries are received from the cardholder (e.g., via inputs made by the cardholder via the web browser or application, or a responsive SMS text message or email, etc.). In some embodiments, the rules generated or updated at process stage 184 specify the manner in which follow-up queries should be generated based upon the responses received at process stage 194, and process stages 192 and 194 may be repeated multiple times.

Figure 3E:
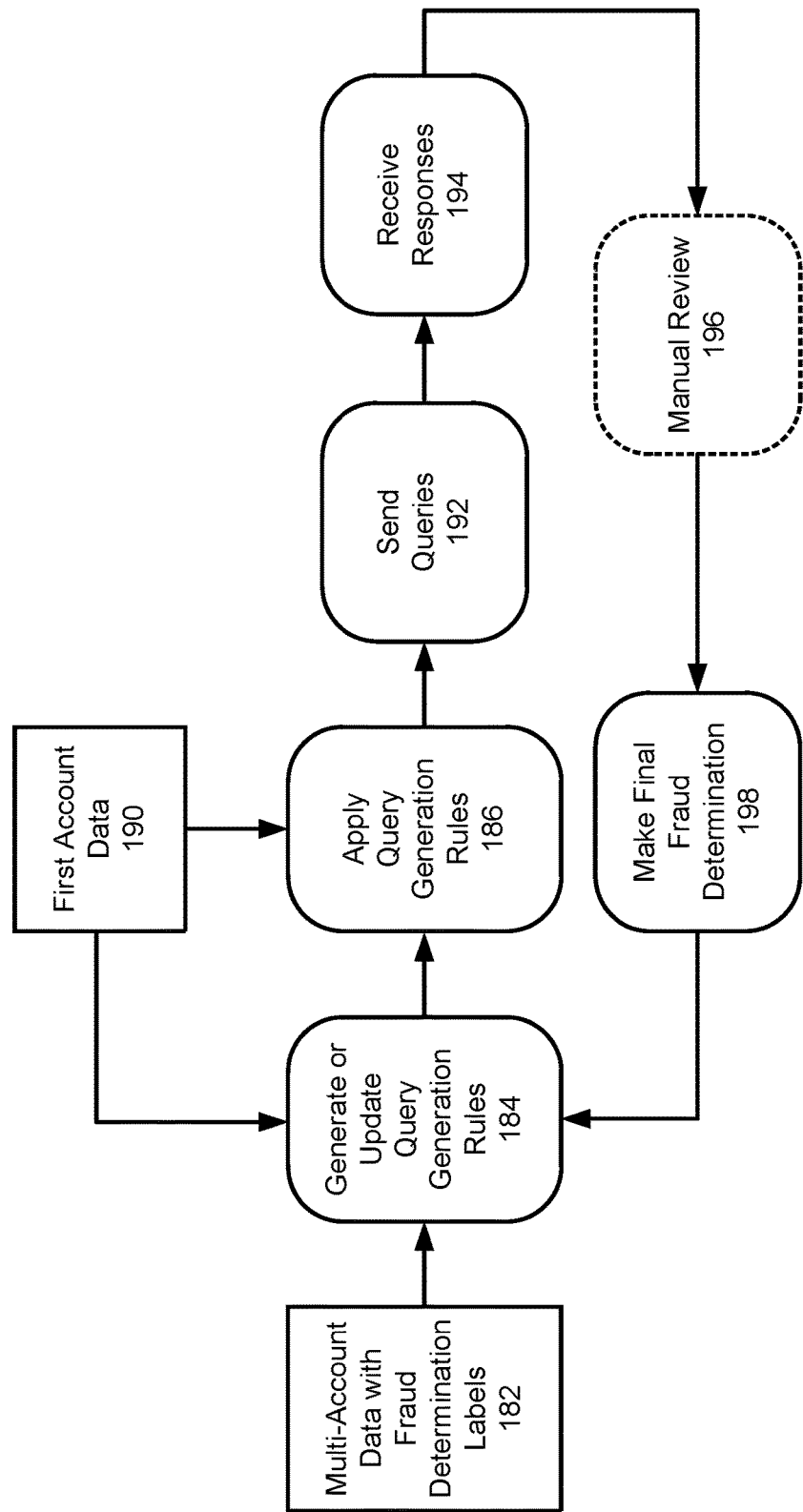
Figure 3F:
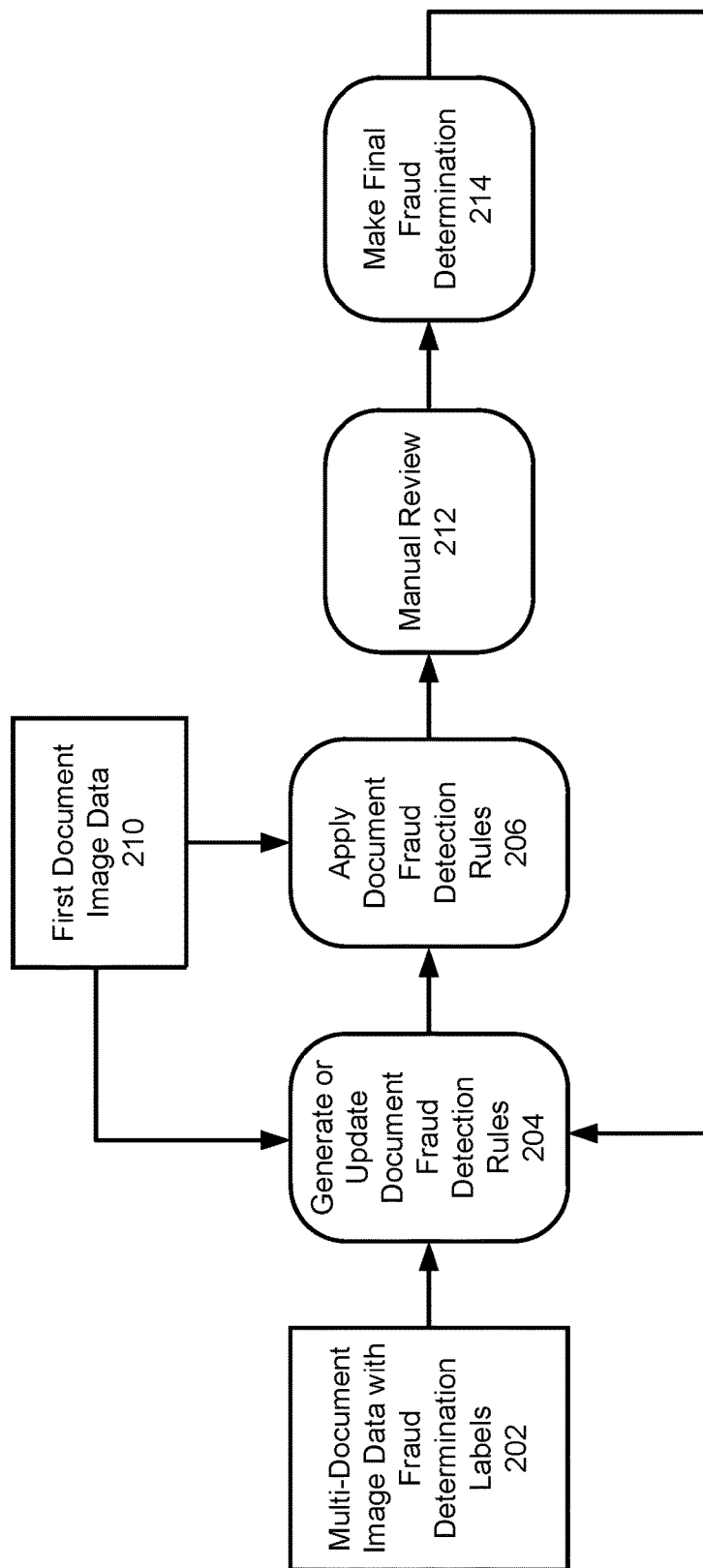

In some embodiments, further analysis (e.g., a manual review, or further automated review using additional data sources, etc.) that makes use of the received responses is performed at an additional stage, shown in dashed lines in FIG. 3E as process stage 196. The additional analysis may then be used to make a final fraud determination (e.g., a final decision on whether fraud occurred, and/or on the type of fraud that occurred) at process stage 198. In other embodiments, process stage 196 is omitted from process flow 180, and process stage 198 is based upon information from the cardholder. For example, the questions generated at process stage 192 may "jog" the cardholder's memory, and cause him or her to indicate that the transaction at issue was authorized. The final determination made at process stage 198, along with the first account data 110 (and any other data used at process stage 196), the queries generated at process stage 186 and/or the responses received at process stage 194, may be fed back into process stage 184 to provide additional labeled data for purposes of updating the rules.

F. Exemplary Process Flow for Machine Learning of Document Fraud Detection Rules Referring now to FIG. 3F, an exemplary process flow 200 may generally be used to detect fraud relating to documents, such as counterfeit and/or forged documents. The process flow 200 may be used in connection with various kinds of documents, such as checks (e.g., personal checks, cashier's checks, etc.), money orders, treasury bills, identification documents (e.g., social security cards, driver's licenses, passports, birth certificates, etc.), certification documents, and so on.

In the process flow 200, multi-document image data 202 may represent digital images of a number (e.g., thousands) of physical documents of one or more types. The multi-document image data 202 may include images in one or more formats, such as raster formats (e.g., JPEG, TIFF, GIF, BMP, PNG, etc.) and/or vector formats (e.g., CGM, SVG, etc.), for example. The multi-document image data 202 may include data obtained (e.g., by external data collection unit 42 of FIG. 1) from merchant computing systems 22 (e.g., point-of-sale devices with cameras for document identification) and/or from FAMS 14 (e.g., images of personal checks), for example. In some embodiments, the multi-document image data 202 may only include data representing images that customers (or other individuals associated with the documents) have expressly consented to share (e.g., as a prerequisite to making a purchase, or in exchange for fraud protection services, etc.).

As described above in connection with multi-account data 82 of process flow 80, the multi-document image data 202 may be associated with multiple fraud determination labels. In some embodiments, each label may be associated with data representing a digital image of a particular document. The labels may include final fraud determinations (e.g., "fraud" or "no fraud," or more complex labels such as "forgery," "counterfeit," "forgery—signature," "counterfeit—angular line offset(s) outside tolerance," etc.) that were made via earlier iterations of the process flow 200, and/or external to the process flow 200. Multi-document image data 202 may include many (e.g., thousands) of positively and negatively labeled data sets.

At a process stage 204, the multi-document image data 202 may be analyzed to generate document fraud detection rules (e.g., to be stored in ML rules database 58). As described above in connection with process stage 84 of process flow 80, any suitable type of supervised machine learning program/technique(s) may be used. Generally, process stage 204 may serve to identify which characteristics of a document are probative of whether the document is counterfeit, and to determine the ranges, tolerances, etc., that are probative of whether the document is counterfeit. In some embodiments, process stage 204 also, or instead, identifies which characteristics of information entered in document fields are probative of whether the document was forged (e.g., drafted or populated by someone other than the person purported to have drafted or populated the document).

At process stage 206, the rules generated or updated at process stage 204 may be applied to first document image data 210. The first document image data 210 may be digital image data corresponding to a particular, physical document. The first document image data 210 may include information obtained (e.g., by external data collection unit 42) from one of merchant computing systems 22 (e.g., for real-time verification of an identification or other document presented during or prior to a sale), or from FAMS 14 (e.g., for real-time or batch-processing verification of a personal check prior to clearing the check), for example. Some specific examples of rules that may be generated by process stage 204, and applied at process stage 206, are described below in connection with FIG. 4F.

Process stage 206 may output information indicating whether fraud is suspected in connection with the document corresponding to first document image data 210. For example, process stage 206 may output two percentage probabilities calculated according to the rules generated or updated at process stage 204, with the first indicating the likelihood that the document is counterfeit and the second indicating the likelihood that the document includes forged content. As another example, process stage 206 may output binary indicators of whether the document likely is, or likely is not, counterfeit and/or includes forged content (e.g., by comparing percentage probabilities to threshold probabilities).

In some embodiments, further analysis (e.g., a manual review, or further automated review using additional data sources, etc.) may be performed at a process stage 212. The additional analysis may then be used to make a final fraud determination (e.g., a final decision on whether the document is fraudulent) at process stage 214. For example, the process stage 206 may act as a filter, and flag only those documents having a relatively high probability of being fraudulent. In this manner, a considerably smaller amount of human and/or processing resources may be consumed at process stage 212.

The final determination made at process stage 214, along with the first document image data 210 used to make that determination, may be fed back into process stage 204 to provide additional labeled data for purposes of updating the rules. In some embodiments, a preliminary fraud determination made at process stage 206 may also be fed back into process stage 204, to allow the machine learning program to determine and improve upon past performance/accuracy.

IV. Exemplary Rules for Fraud Detection and/or Classification

FIGS. 4A-4F depict exemplary factors and algorithms that may be used in connection with various fraud detection and/or classification rules, according to different embodiments. It is noted that the rule sets corresponding to FIGS. 4A-4F are purely for purposes of illustration and are not limiting. Particularly in embodiments where machine learning is utilized, for example, the algorithms and/or factors may be far more complex, and/or less intuitive, than some or all of the examples shown in FIGS. 4A-4F.

A. Exemplary Fraud Detection Rule Set Using Online Activity

Referring first to FIG. 4A, an exemplary rule set 220 (e.g., generated at process stage 104 of FIG. 3A) may use various factors relating to online activity of a cardholder to detect fraud in connection with a particular credit or debit card transaction. The rule set 220 may correspond to a particular embodiment and scenario in which the transaction at issue is a "card present" transaction, and in which the rule set 220 seeks to determine whether the cardholder made or otherwise authorized the transaction. The rule set 220 may be incorporated into a review process that is generally applied to all transactions, a review process applied only to those transactions that were flagged by a preliminary fraud alert, or a review process applied only after a cardholder reports the transaction as unauthorized, for example.

The factors considered under the rule set 220 may include a number of interest-based factors 222 and a number of location-based factors 224. The interest-based factors 222 may relate to the cardholder's interest (or non-interest) in a product or service purchased via the transaction, and/or the merchant providing the product or service, while the location-based factors 224 may relate to the cardholder's location or probable location.

As seen in FIG. 4A, the interest-based factors 222 may include: (1) whether the cardholder searched online for the specific product or service purchased via the transaction at issue (e.g., by determining whether search terms entered by the cardholder included the name of the product or service involved in the transaction, or included a description of the product or service, etc.); (2) whether the cardholder visited a website associated with the merchant (e.g., by comparing URLs of web sites visited by the cardholder to a known URL of the merchant's website, or by searching the contents of websites visited by the cardholder for the merchant's name, etc.); (3) whether the cardholder endorsed the merchant, or the product or service provided by the merchant, via a social media account of the cardholder (e.g., by determining whether the cardholder "liked" the merchant, product or service via his or her Facebook® account, etc.); (4) whether the cardholder visited a website associated with a competitor of the merchant (e.g., by comparing URLs of web sites visited by the cardholder to known URLs of known competitors' websites, or by searching the contents of websites visited by the cardholder for the competitors' names, etc.); (5) whether the cardholder searched online for a different product or service in the same price range as the transaction amount (e.g., by analyzing search terms and/or results, and/or by analyzing URLs or contents of websites visited by the cardholder and comparing prices of products/services, etc.); and/or (6) whether the cardholder entered search terms indicative of the cardholder's need for the product or service (e.g., by determining that the cardholder entered search terms including "pipe leak" prior to the purchase of new plumbing hardware, or "computer repair" prior to the purchase of a new hard drive, etc.). In other embodiments, the interest-based factors 222 may include more, fewer and/or different factors than those shown in FIG. 4A.

As is also seen in FIG. 4A, the location-based factors 224 may include: (1) whether the cardholder "checked in" to a flight having a destination near the location where the transaction was initiated (e.g., by determining whether the cardholder checked in to a flight having a destination at the city in which the transaction occurred, or within a threshold number of miles of the city in which the transaction occurred, etc.); (2) whether the cardholder visited a website associated with a place near (or in) which the transaction was initiated (e.g., by comparing URLs of web sites visited by the cardholder to URLs of websites known to be associated with particular areas, and/or by searching the contents of websites visited by the cardholder for location or area names, etc.); and/or (3) whether the cardholder endorsed a place near (or in) which the transaction was initiated via a social media account of the cardholder (e.g., by determining whether the cardholder "liked" the geographic area, attraction or other place via his or her Facebook® account, etc.). In other embodiments, the location-based factors 224 may include more, fewer and/or different factors than those shown in FIG. 4A.

Generally, the data indicative of whether the circumstance corresponding to each of interest-based factors 222 and/or location-based factors 224 is present/true for a particular cardholder may be included in the first customer online activity data 110 described above in connection with FIG. 3A. For example, external data collection unit 42 of FIG. 1 may obtain the search terms, URLs, user online selections, etc., needed to determine whether the various factors exist, from the cardholder's computing device (e.g., one of cardholder computing devices 20) and/or from an ISP of other sources 24.

As is also seen in FIG. 4A, each of the interest-based factors 222 and location-based factors 224 may be associated with a particular score or weighting value. In the rule set 220 shown in FIG. 4A, a total score may be calculated based upon which factors are, or are not, present (e.g., add 94 points if it is determined that the cardholder searched for the particular lawnmower model that was purchased, add another 80 points if the transaction was a "card present" transaction in the Chicago suburb of Joliet and the cardholder checked in to a flight to Chicago just prior to the transaction, etc.).

In some embodiments, certain factors may instead be associated with negative scores (e.g., minus 80 if the cardholder checked in to a flight with a destination at least 200 miles from the site of the transaction and within one day of the transaction, etc.). Moreover, certain factors may be associated with metrics or algorithms that determine how heavily those factors are weighed. As indicated in FIG. 4A, for example, search terms entered by the cardholder may be used to calculate a "need score" X (e.g., where X is based upon frequency of certain search terms being used, the amount of time spent clicking through search results, the magnitude and/or urgency of a problem indicated by the search terms, etc.), with X then being used to calculate a score equal to 0.2X.

The rule set 220 may then output the total score (e.g., 94+80=+174), a normalized total score, an indication of whether the total score exceeded a threshold (e.g., a threshold of +100), a probability calculated based upon the total score, and/or some other indicator or measure of the existence or likelihood of fraud. In the example shown in FIG. 4A, it can be seen that larger scores generally correspond to a greater probability that the transaction was made or authorized by the cardholder. If the transaction is being automatically reviewed (e.g., to determine whether a fraud alert is appropriate, without any initial input from the cardholder), this may mean that a lower score corresponds to a higher probability of fraud. Conversely, if the cardholder had reported the transaction as being fraudulent, a higher score may correspond to a higher probability of fraud (i.e., fraud on the part of the cardholder).

In some embodiments, the rule set 220 may also include one or more other types of factors not necessarily based upon online activities of the cardholder (e.g., whether GPS of the cardholder's smartphone or vehicle indicates that he or she was in that area shortly before or after the transaction, etc.), and/or may omit either interest-based factors 222 or location-based factors 224.

B. Exemplary Chargeback Candidate Detection Rule Set

Figure 4B:
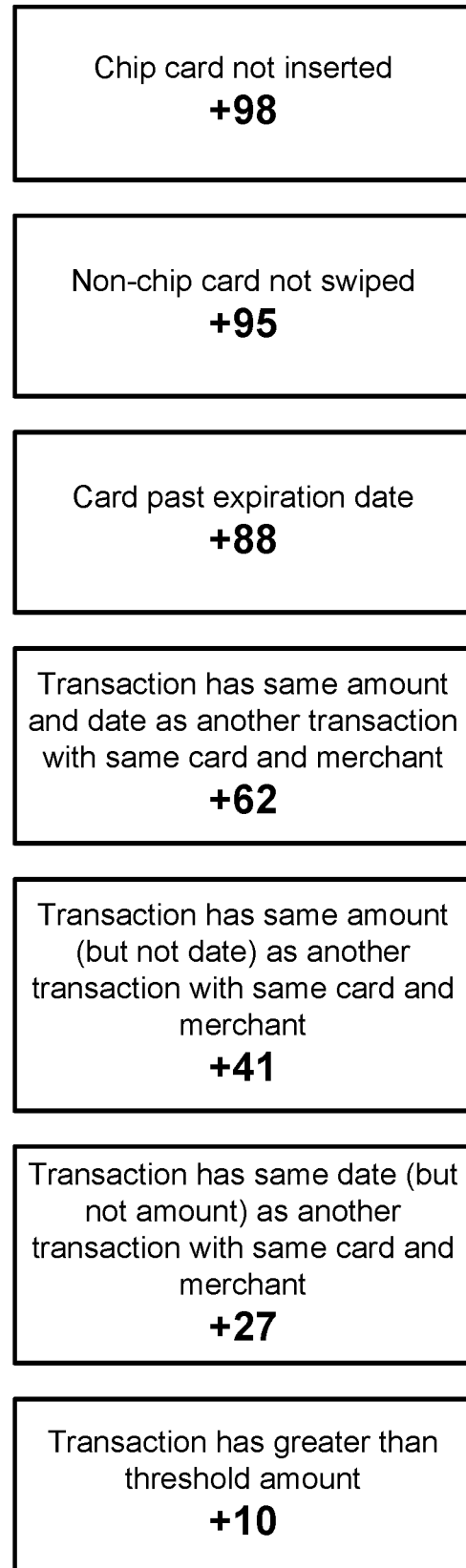

Referring next to FIG. 4B, an exemplary rule set 230 (e.g., generated at process stage 124 of FIG. 3B) may use various factors relating to a transaction between a cardholder and a merchant to determine whether the transaction should be flagged as a candidate for a chargeback (e.g., to determine whether the transaction should be reviewed under a full set of chargeback rules associated with the appropriate card network entity). The rule set 230 may correspond to a particular embodiment and scenario in which the transaction at issue is a "card present" transaction.

As seen in FIG. 4B, the factors considered under the rule set 230 may include: (1) whether an EMV chip card was not inserted in a point-of-sale EMV chip reader device of the merchant; (2) whether a non-EMV card was not swiped in a point-of-sale device of the merchant; (3) whether the card is past its expiration date; (4) whether the transaction is for the same amount and/or date as another transaction involving the same card and merchant (e.g., by analyzing other transactions involving the same account and merchant within a particular time span); and/or (2) whether the transaction is for greater than a threshold amount. For example, one of merchant computing systems 22 of FIG. 1 (or an acquiring/merchant bank) may provide transaction details that include the amounts, dates, etc., to FAMS 14 for storage in account records database 30, and external data collection unit 42 may then retrieve that information from account records database 30. Generally, the data indicative of whether the circumstance corresponding to each of the factors is present/true for a particular transaction may be included in the first account transaction data 130 described above in connection with FIG. 3B. In other embodiments, the factors considered under rule set 230 may include more, fewer and/or different factors than those shown in FIG. 4B. It is noted that, in some embodiments, one or more factors may simply relate to the desirability (e.g., from a card issuer perspective) of further reviewing whether a chargeback is appropriate, without necessarily relating to the likelihood that a chargeback is appropriate.

As is also seen in FIG. 4B, each of the factors may be associated with a particular score or weighting value. A total score may be calculated based upon which factors are, or are not, present (e.g., add 62 points if it is determined that the transaction has the same amount and date as another transaction occurring close in time and involving the same card and merchant). In some embodiments, certain factors may instead be associated with negative scores, and/or certain factors may be associated with metrics or algorithms that determine how heavily those factors are weighed.

The rule set 230 may then output the total score, a normalized total score, an indication of whether the total score exceeded a threshold, a probability calculated based upon the total score, and/or some other indicator or measure of the likelihood that a chargeback is appropriate for the transaction. In the example shown in FIG. 4B, it can be seen that larger scores generally correspond to a greater probability that a chargeback is appropriate.

C. Exemplary Fraud Classification Rule Set

Figure 4C:
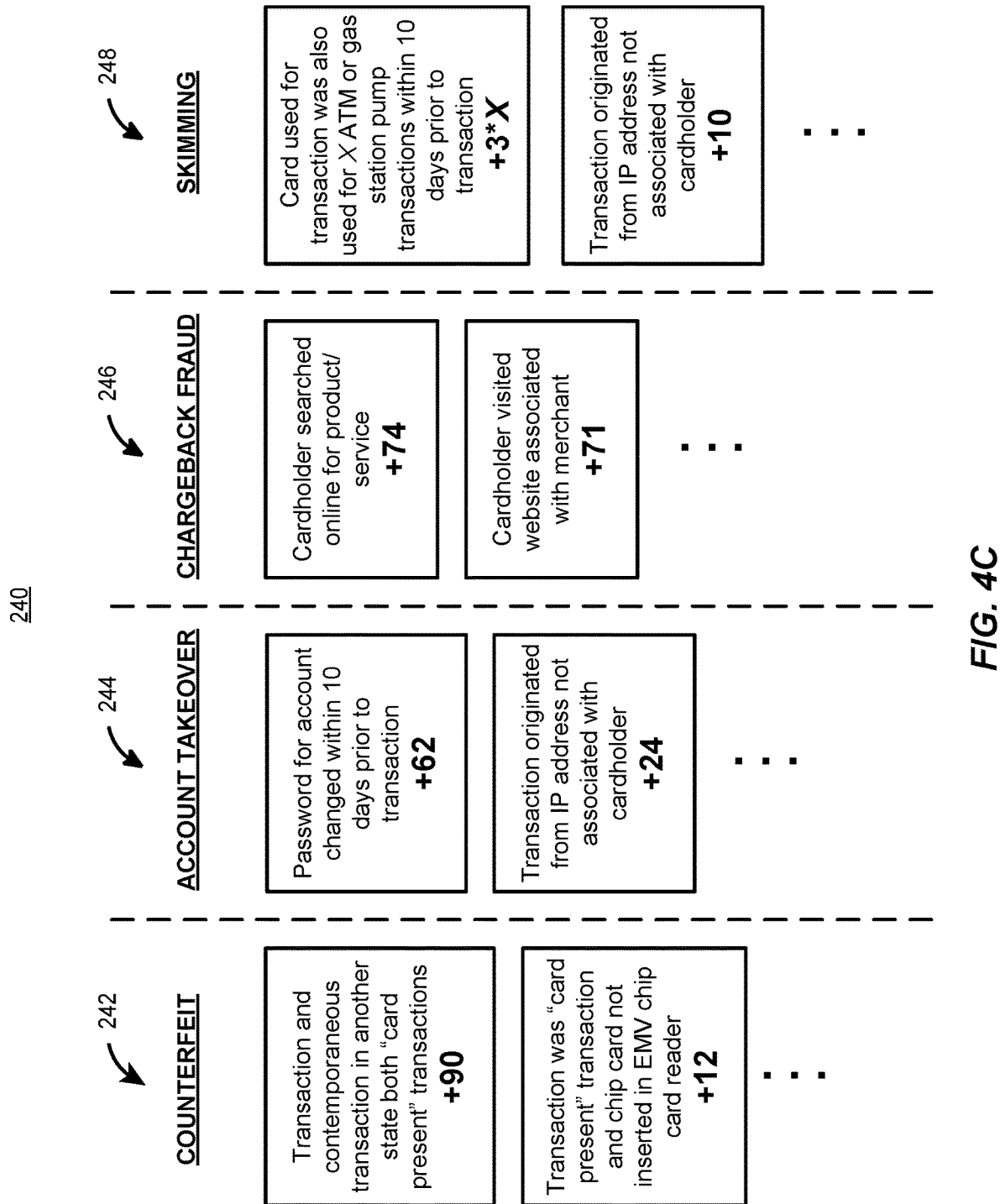

Referring now to FIG. 4C, an exemplary rule set 240 (e.g., generated at process stage 144 of FIG. 3C) may use a diverse array of factors to classify the type(s) of fraudulent activity, if any, that is/are suspected to be associated with an event or series of events. The rule set 240 may correspond to a particular embodiment and scenario in which the event at issue is a financial transaction involving a debit or credit card. In other embodiments and/or scenarios, however, the rule set 240 may classify fraudulent activity with respect to specific other types of events (e.g., loan applications), or may detect a variety of different event types (e.g., various types of financial transactions, loan or credit applications, etc.) and broadly classify fraudulent activity in connection with the detected event types (e.g., lost/stolen card use, application fraud, etc.).

In one embodiment, each potential classification (with the possible exception of "no fraud") may be associated with a number of factors probative of whether that type/class of fraud has occurred. As seen in FIG. 4C, for example, the rule set 240 may include counterfeit factors 242 (e.g., factors indicating that a counterfeit card was used for the transaction), account takeover factors 244 (e.g., factors indicating that the transaction resulted from an unauthorized person gaining online access to the credit or debit card account itself, via phishing, malware or other means), chargeback fraud factors 246 (e.g., factors indicating that the cardholder made or otherwise authorized a purchase that the cardholder later contested) and skimming factors 248 (e.g., factors indicating that the card information used for the transaction was obtained via a skimming card reader device illegally installed in an ATM, gas station pump or other location). In other embodiments, the rule set 240 may also, or instead, include factors corresponding to one or more other fraud classifications (e.g., forgery, lost/stolen card use, etc.).

As seen in FIG. 4C, the counterfeit factors 242 may include: (1) whether the suspect transaction and another, contemporaneous transaction (e.g., occurring within one hour, etc.) in another state are both "card present" transactions; and/or (2) if the suspect transaction is a "card present" transaction, whether the card (if an EMV chip card) was not inserted in an EMV chip card reader. For example, one or more of merchant computing systems 22 of FIG. 1 (or one or more acquiring/merchant banks) may provide transaction details that include whether the transaction was "card present," whether the card was inserted in an EMV chip card reader, etc., to FAMS 14 for storage in account records database 30, and external data collection unit 42 may then retrieve that information from account records database 30. In other embodiments, the counterfeit factors 242 may include more, fewer and/or different factors than those shown in FIG. 4C.

The account takeover factors 244 may include: (1) whether the debit or credit card account password was changed within the 10 days prior to the transaction; and/or (2) whether the transaction was originated from an IP address not associated with the cardholder. For example, external data collection unit 42 may retrieve password change information from account records database 30 of FIG. 1, which may log all password update activity, and/or may retrieve IP address information from one of merchant computing systems 22 (e.g., the computing system of the merchant involved in the transaction). In other embodiments, the account takeover factors 244 may include more, fewer and/or different factors than those shown in FIG. 4C.

The chargeback fraud factors 246 may include: (1) whether the cardholder had searched online for the product or service purchased via the transaction; and/or (2) whether the cardholder had visited a website associated with the merchant involved in the transaction. For example, external data collection unit 42 of FIG. 1 may retrieve online search information (e.g., search terms and/or results) and/or URLs from the one of cardholder computing devices 20 that is associated with the cardholder, and/or from an ISP (of other sources 24) used by the cardholder. In other embodiments, the chargeback fraud factors 246 may include more, fewer and/or different factors than those shown in FIG. 4C.

The skimming factors 248 may include: (1) the number (X) of earlier transactions in which the card used for the transaction at issue was used at an ATM machine or a gas station pump within the 10 days prior to the transaction at issue; and/or (2) whether the transaction at issue originated from an IP address not associated with the cardholder. For example, external data collection unit 42 of FIG. 1 may retrieve transaction data indicating that certain past purchases were made using gas station pump card readers, and/or indicating that the card was used for one or more ATM withdrawals, from account records database 30, and/or may retrieve the originating IP address from the one of merchant computing systems 22 associated with the merchant involved in the transaction at issue. In other embodiments, the skimming factors 248 may include more, fewer and/or different factors than those shown in FIG. 4C.

Generally, the data indicative of whether the circumstance corresponding to each of counterfeit factors 242, account takeover factors 244, chargeback fraud factors 246 and/or skimming factors 248 is present/true for a particular transaction may be included in the first account data 150 described above in connection with FIG. 3C, for example.

As is also seen in FIG. 4C, each of the counterfeit factors 242, account takeover factors 244, chargeback fraud factors 246 and skimming factors 248 may be associated with a particular score or weighting value. The factors for each classification (counterfeit, account takeover, chargeback fraud, skimming) may be used to calculate a total score specific to that classification. In the rule set 240 shown in FIG. 4C, for example, a counterfeit score may be calculated based upon which of factors 242 are, or are not, present, an account takeover score may be calculated based upon which of factors 244 are, or are not, present, and so on. In some embodiments, certain factors may instead be associated with negative scores, and/or certain factors (e.g., the first of skimming factors 248 shown in FIG. 4C) may be associated with metrics or algorithms that determine how heavily those factors are weighed.

For each classification/category, the rule set 240 may output the total score, a normalized total score, an indication of whether the total score exceeded a threshold, a probability calculated based upon the total score, and/or some other indicator or measure of the likelihood that fraud of that particular type/class occurred in connection with the transaction. In the example shown in FIG. 4C, it can be seen that larger scores generally correspond to a greater probability that the respective classification is accurate. Referring back to FIG. 3C, the classification at process stage 152 may be the classification having the highest score and/or probability under rule set 240, or may include the score and/or probability for each classification, the top three classifications, etc.

D. Exemplary Application Fraud Detection Rule Set

Referring now to FIG. 4D, an exemplary rule set 260 may use online search information (e.g., search terms, search results, clicked/selected search results, etc.) to detect whether an application was fraudulent (e.g., not populated and/or submitted by the purported applicant). The rule set 260 may have been generated at process stage 164 of FIG. 3D, for example. The rule set 260 may be incorporated into a review process that is generally applied to all applications received by a particular entity or anti-fraud service, or a review process applied only to those applications that were flagged by a preliminary fraud alert, for example.

The factors considered under the rule set 260 may generally be probative of whether the person that submitted the application (e.g., via a web browser, a dedicated application, as an email attachment, by snail mail, etc.) had performed one or more online searches indicating that he or she was trying to learn more about the purported applicant in order to populate particular fields of the application (e.g., a "home address" field, "employment history" fields, etc.). The "purported applicant" may be a person whose name appears in a name and/or signature field of the application, for example.

As seen in FIG. 4D, the factors of exemplary rule set 260 may include: (1) whether the applicant used search terms that included the name of the purported applicant; (2) whether the search terms also included the words "address" or "residence" (and possibly other synonyms or near-synonyms); and/or (3) whether the search terms also included the words "employer," "job" and/or "career" (and possibly other synonyms or near-synonyms). In other embodiments, the rule set 260 may include more, fewer and/or different factors than those shown in FIG. 4D. For example, the rule set 260 may include one or more factors relating to which search results appeared and/or were selected (e.g., "clicked" on after appearing on a user interface) by the applicant.

Generally, the data indicative of whether the circumstances corresponding to the factors of rule set 260 are present/true for a particular applicant may be included in the first applicant search history data 170 described above in connection with FIG. 3D. For example, external data collection unit 42 of FIG. 1 may obtain the search terms, search results, search result user selections, etc., needed to determine whether the various factors exist, from the applicant's computing device (e.g., similar to one of cardholder computing devices 20) and/or from an ISP of other sources 24. Access to such information may be made a condition of having the application be considered, for example.

As is also seen in FIG. 4D, each of the factors of rule set 260 may be associated with a particular score or weighting value. A total score may then be calculated based upon which factors are, or are not, present. In some embodiments, certain factors may instead be associated with negative scores, and/or certain factors may be associated with metrics or algorithms that determine how heavily those factors are weighed.

The rule set 260 may then output the total score, a normalized total score, an indication of whether the total score exceeded a threshold, a probability calculated based upon the total score, and/or some other indicator or measure of the existence or likelihood of application fraud. In the example shown in FIG. 4D, it can be seen that larger scores may generally correspond to a greater probability that the application was not populated and/or submitted by the purported applicant.

E. Exemplary Fraud Dispute Resolution Rule Set

Figure 4E:
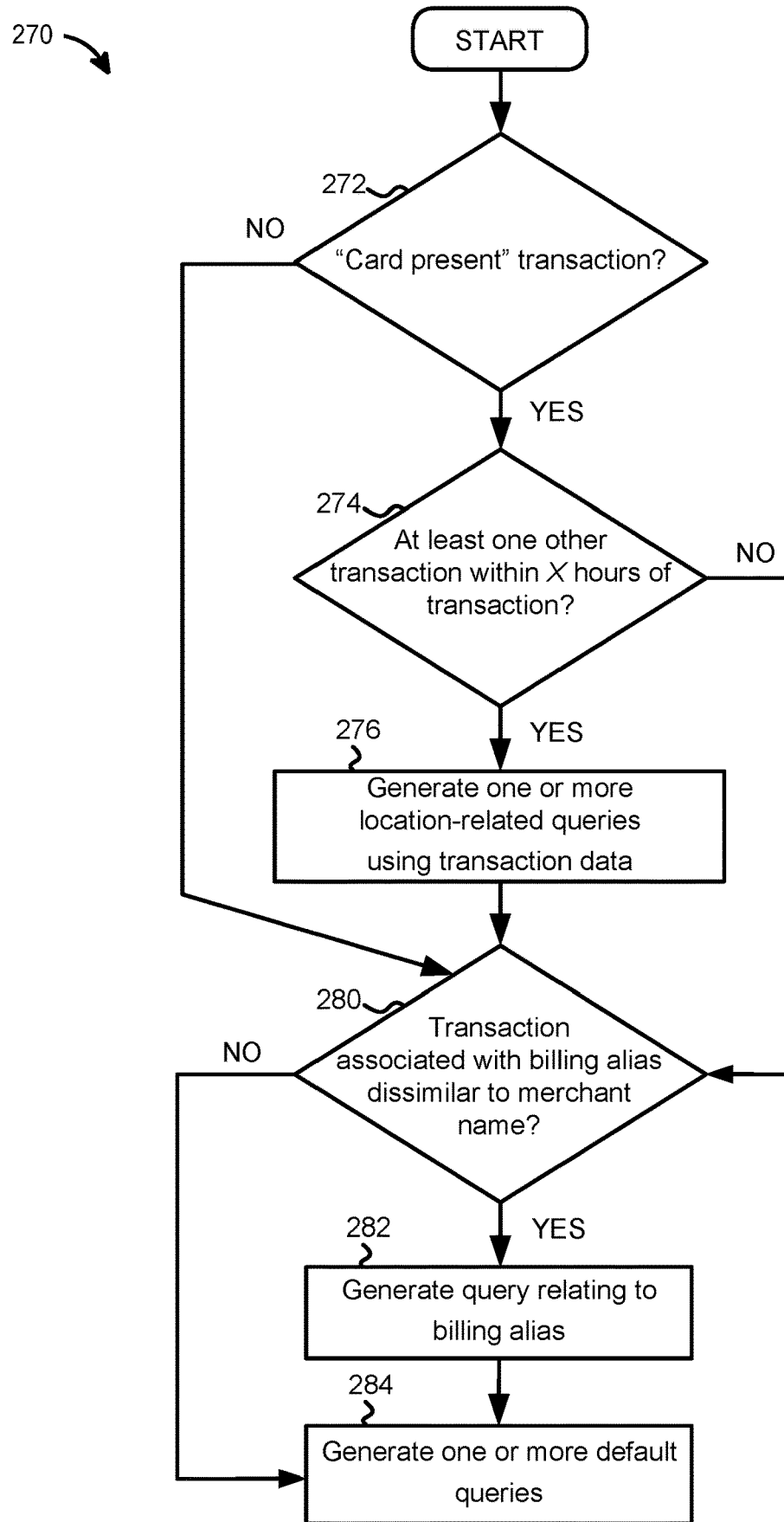

Referring now to FIG. 4E, a flow diagram illustrates at least a portion of a process flow 270 implementing an exemplary rule set for fraud dispute, or potential fraud dispute, resolution (e.g., a rule set generated at process stage 184 of FIG. 3E). The process flow 270 may be used to help resolve a dispute over a contested transaction, or to help a customer recall an unrecognized transaction, for example. FIG. 4E illustrates a process flow, rather than just a set of factors, in order to better illustrate an example process for generating queries based upon the generated rules, according to one embodiment. The process flow 270 may correspond to a particular embodiment and scenario in which the transaction subject to dispute or potential dispute is a credit or debit card transaction.

In the exemplary process flow 270, the rule set may specify that a process stage 272 determines whether the transaction was a "card present" transaction. If not, the rule set may specify that the flow proceed directly to a process stage 280. If so, however, the rule set may specify that the flow instead proceeds to a process stage 274.

The rule set may also specify that process stage 274 determines whether at least one other transaction associated with the cardholder's account occurred within some threshold number of hours (X) of the transaction at issue. If not, the rule set may specify that the flow proceeds directly to process stage 280. If so, however, the rule set may specify that the flow instead proceeds to a process stage 276.

Process stage 276 may generate one or more location-related queries using transaction data associated with the cardholder's account. The queries may ask, for example, whether the cardholder was in (or near) one or more particular geographic areas or locations at various times. If the transaction at issue occurred in San Francisco, for example, with a first other "card present" transaction occurring in Santa Rosa four hours earlier and a second other "card present" transaction occurring in San Jose two hours later, process stage 276 may generate one or more queries asking whether the cardholder made or authorized the earlier and/or later transactions, and/or whether the cardholder traveled on a route from Santa Rosa to San Jose that passed through San Francisco, etc.

In some embodiments, the location-related queries are generated based upon data associated with events or circumstances other than transactions. For example, if the transaction at issue occurred in Sarasota, Fla., and the data considered under the rule set indicates that the cardholder checked in to a flight to Tampa, process stage 276 may generate one or more queries asking whether the cardholder completed the flight, where the cardholder went after landing in Tampa, etc.

The rule set may also specify that process stage 280 determines whether the transaction at issue is associated with a billing alias that is dissimilar to the name of the merchant involved in the transaction. For example, the computing system of the merchant (e.g., one of merchant computing systems 22 of FIG. 1) may have sent to FAMS 14 a transaction record that identified the merchant by the alias, and was presented to the cardholder as an online or paper account statement. The determination at process stage 280 may use the billing alias to identify a legal and/or common name of the merchant (e.g., using a relational database stored in AFSS 12 or FAMS 14), and determine that there is at least some threshold level of dissimilarity (e.g., based upon difference of characters, character ordering, etc.) between the billing alias and the merchant name.

If the billing alias and merchant name are not sufficiently dissimilar, the rule set may specify that the flow proceeds directly to a process stage 284. If sufficiently dissimilar, however, the rule set may specify that the flow instead proceeds to a process stage 282. Process stage 282 may generate a query relating to the billing alias that was presented to the cardholder. For example, the query may ask whether the cardholder is aware that the billing alias is used by that particular merchant. In some embodiments, process stage 282 may instead generate a message that simply informs the cardholder that the billing alias corresponds to the merchant, without posing a question.

The rule set may specify that process stage 284 generates one or more default queries. For example, one default query may ask whether the cardholder lent his or her card to a friend or family member around the time of the transaction. In some embodiments and/or scenarios, process stage 284 may be omitted from process flow 270. Generally, the queries (and possibly non-query messages) generated in process flow 270 may serve to help the cardholder recall whether the transaction was made or authorized, and/or process flow 270 may prompt the cardholder for responses that are considered by others (e.g., personnel of an entity associated with FAMS 14 of FIG. 1) to determine whether the transaction was likely fraudulent.

Although not shown in FIG. 4E, in some embodiments process flow 270 may include a number of iterative stages in which responses are received from the cardholder (e.g., from the respective one of cardholder computing devices 20 in FIG. 1) and used to generate additional, more detailed questions for the cardholder. For example, if a first query asks whether the cardholder recalls personally making another "card present" transaction that occurred at a nearby time and place, and the cardholder responds "no," a new query may be generated asking whether the cardholder recalls personally making the next closest transaction (in terms of time and/or location).

F. Exemplary Document Fraud Detection Rule Set

Referring next to FIG. 4F, an exemplary rule set 290 (e.g., generated at process stage 204 of FIG. 3F) may use various factors relating to an imaged (e.g., photographed or scanned) physical document to determine whether the document should be flagged as a candidate for a more in-depth (e.g., manual) analysis/review for fraud purposes. The rule set 290 may correspond to a particular embodiment and scenario in which the document is one that includes at least a signature field (e.g., a personal check, a driver's license, etc.).

The factors considered under the rule set 290 may include a number of counterfeit factors 292 and a number of forgery factors 294, each of which may be evaluated by image analysis unit 52 of FIG. 1 using one or more image processing techniques. The counterfeit factors 292 may relate to the look, presentation, format and/or structure of the document, while the forgery factors 294 may relate to the substance, style or format of information entered in one or more fields of the document.

As seen in FIG. 4F, the counterfeit factors 292 may include: (1) whether one or more absolute or relative dimensions and/or angles of the document, or of lines, illustrations, patterns, etc. shown on the document (excluding user-entered contents in fields such as the signature line), are outside one or more predetermined tolerances; (2) whether one or more colors on the document are outside a predetermined tolerance (e.g., color/frequency range); (3) whether one or more line thicknesses of the document (excluding user-entered field contents) are outside one or more predetermined tolerances; and/or (4) whether one or more fonts on the document (excluding user-entered field contents) are outside one or more predetermined tolerances. For example, image analysis unit 52 may determine whether the ratio of the document length to the document width is within 0.1% of an expected value. As another example, image analysis unit 52 may determine whether horizontal and vertical lines on the document are within 0.3 degrees of the horizontal and vertical edges of the document, respectively. As yet another example, image analysis unit 52 may determine whether a font used for a field descriptor or other text on the document matches an expected font (e.g., by meeting a similarity threshold measured in any suitable manner). In other embodiments, the counterfeit factors 292 may include more, fewer and/or different factors than those shown in FIG. 4F.

The forgery factors 294 may include: (1) whether a signature entered in a signature field of the document match is outside a predetermined tolerance (e.g., using any suitable signature recognition technique); (2) whether handwriting entered in one or more fields of the document is outside a predetermined tolerance (e.g., by applying a suitable handwriting recognition technique); and/or (3) whether the format of information entered by a user in one or more fields does not match an expected format (e.g., using "9.12.16" rather than the expected "9/12/2016," as established based upon other documents known to have been populated and/or submitted by the purported applicant). In other embodiments, the forgery factors 294 may include more, fewer and/or different factors than those shown in FIG. 4F.

Generally, the data indicative of whether the circumstances corresponding to counterfeit factors 292 and/or forgery factors 294 are present/true for a particular document may be included in the first document image data 210 described above in connection with FIG. 3F.

As is also seen in FIG. 4F, each of the counterfeit factors 292 and forgery factors 294 may be associated with a particular score or weighting value. In the rule set 290 shown in FIG. 4F, a total score may be calculated based upon which factors are, or are not, present. In some embodiments, certain factors may instead be associated with negative scores, and/or certain factors may be associated with metrics or algorithms that determine how heavily those factors are weighed.

The rule set 290 may then output the total score, a normalized total score, an indication of whether the total score exceeded a threshold, a probability calculated based upon the total score, and/or some other indicator or measure of the likelihood that the document is fraudulent. Alternatively, the rule set 290 may output a separate total score, normalized score, probability, or other metric, for each of counterfeit factors 292 and forgery factors 294, with the counterfeit metric indicating the likelihood that the document is a counterfeit and the forgery metric indicating the likelihood that the document was fraudulently populated by someone other than the purported person (e.g., by someone other than the person corresponding to the name, signature, address, etc. on the document). In the example shown in FIG. 4F, it can be seen that larger scores generally correspond to a greater probability that the document is fraudulent. In some embodiments, the rule set 290 also includes one or more other types of factors not shown in FIG. 4F, and/or omits either counterfeit factors 292 or forgery factors 294.

V. Exemplary Methods for Fraud Detection & Classification

FIGS. 5-9 depict flow diagrams of various exemplary computer-implemented methods that may be implemented by one or more components of AFSS 12 of FIG. 1. In one embodiment, AFSS 12 implements all of the methods corresponding to FIGS. 5-9. In other embodiments, AFSS 12 implements only a subset (e.g., one, two, etc.) of the methods corresponding to FIGS. 5-9. Each of the methods described below may be implemented by fraud detection/classification unit 36 of FIG. 1, for example.

A. Exemplary Fraud Detection Method Using Online Activity Data

Figure 5:
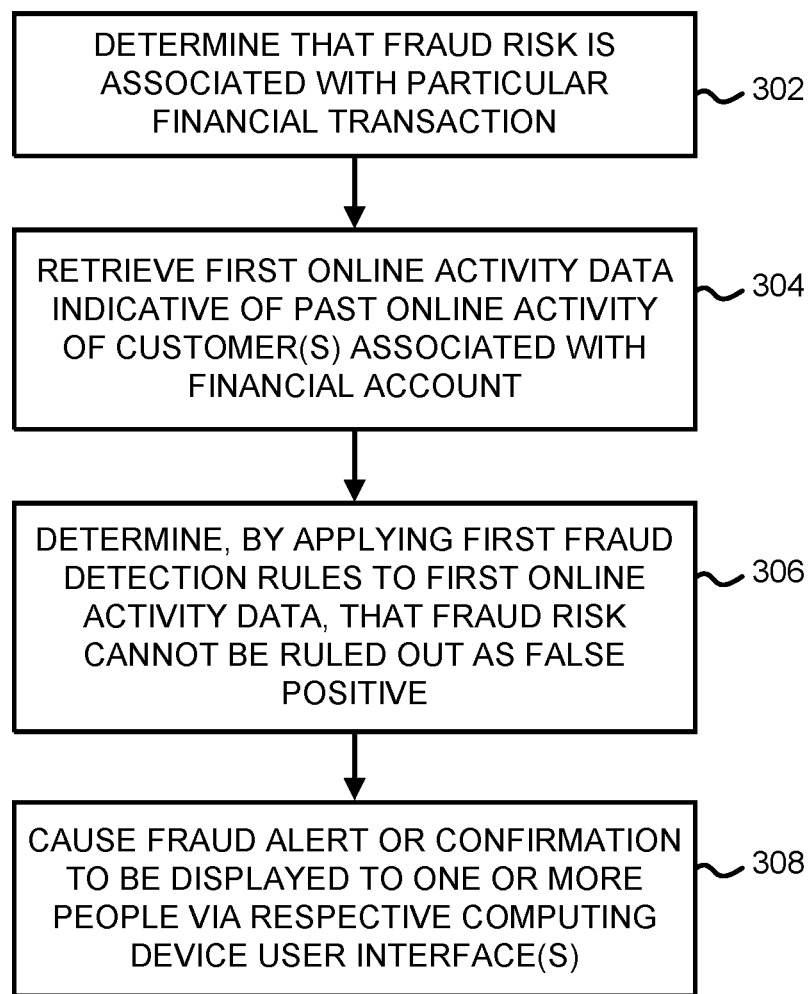
FIG. 5 depicts a flow diagram of an exemplary method for detecting financial fraud using customer online activity, according to one embodiment.

Referring first to FIG. 5, an exemplary computer-implemented method 300 may be used to detect financial fraud using customer online activity. In the method 300, it may be determined that a fraud risk is associated with a particular financial transaction (block 302). The financial transaction may, in turn, be associated with a financial account. For example, the transaction may be one that was made using a credit or debit card account, a checking account, or a different account type.

In one exemplary embodiment, the determination at block 302 may be made in response to processing a preliminary fraud alert that issued in connection with the transaction. The generation of the preliminary fraud alert may itself be a part of the method 300. For example, a set of preliminary fraud detection rules may be applied to a data record associated with the financial account at block 302. The preliminary fraud detection rules may include any new or known techniques for flagging a suspect transaction, such as analyzing a dollar amount of the financial transaction (e.g., to see whether a threshold dollar amount is exceeded), analyzing a geographic location at which the particular financial transaction was initiated (e.g., to see whether the location differs greatly from a residence or recent location of the customer), and/or analyzing a fraud score provided by the relevant card network entity (e.g., VISA®, Mastercard®, etc.), for example.

First online activity data, indicative of past online activity of one or more customers associated with (e.g., owners/holders of) the financial account, may be retrieved (block 304). If the account is a credit card account, for example, each customer may be a cardholder under the account. The data may be retrieved from a database storing historical online activity data for a number of customers associated with a number of different accounts, and/or from one or more other sources. The database may be maintained by an ISP of the customer(s), or may be assembled by a server implementing the method 300 (e.g., using information obtained directly from computing devices of the customer(s)), for example.

It may be determined, by applying first fraud detection rules to the first online activity data retrieved at block 304, that the fraud risk cannot be ruled out as a false positive (block 306). In other scenarios, not represented by FIG. 5, the fraud risk may instead be ruled out as a false positive. Block 306 may include determining whether the past online activity of the customer(s) associated with the financial account indicates interest, by any of those customers, in a product or service associated with (e.g., purchased during) the transaction, and/or in a merchant associated with the transaction (e.g., the merchant providing the purchased product or service).

In one embodiment, for example, block 306 may include determining whether one or more websites visited by at least one of the customers indicates interest in the product or service associated with the transaction and/or the merchant associated with the transaction. Alternatively, or in addition, block 306 may include determining whether one or more selections made by at least one of the customers (via one or more websites) are indicative of interest in the product or service associated with the transaction, and/or the merchant associated with the transaction. Alternatively, or in addition, block 306 may include determining whether at least one of the customers endorsed the product or service associated with the transaction, and/or the merchant associated with the transaction, via a social media account (e.g., by "liking" the service/product/merchant on Facebook®, or "following" the merchant on Twitter®, etc.).

In an embodiment where the fraud risk (discussed above in connection with block 302) was triggered by determining that a geographic location at which the transaction was initiated (e.g., for a "card present" or other face-to-face transaction) is different than a geographic location associated with a residence of a customer, block 306 may include determining that the customer checked in to a flight to an airport proximate to the geographic location at which the transaction was initiated. Alternatively, or in addition, block 306 may include determining that one or more websites visited by the customer is/are associated with the geographic location at which the transaction was initiated.

In response to the determination at block 306, a fraud alert or confirmation may be caused to be displayed to one or more people via one or more respective computing device user interfaces (block 308). The fraud alert or confirmation may specify the transaction, and possibly other information such as an identifier of the account, and/or the transaction date, amount, merchant name, etc. The fraud alert or confirmation may be sent to computing devices of one or more of the customers, to computing devices of one or more employees of a card issuer or other entity, and/or to one or more other computing devices and/or systems, for example. Block 308 may be implemented by notification unit 56 of FIG. 1, for example.

In some embodiments, the method 300 may include one or more additional blocks not shown in FIG. 5. For example, the method 300 may include an additional block in which the first fraud detection rules are generated or updated. The rules may be generated or updated, in whole or in part, by training a machine learning program, such as any of the types of machine learning programs discussed above in connection with ML rule generator 40 of FIG. 1 or process stage 84 of FIG. 2, for example. The machine learning program may be trained using online activity data associated with a plurality of other financial accounts, and fraud determinations (e.g., "fraud" or "no fraud") each corresponding to a respective one of those other accounts, for example.

As another example, the method 300 may include one or more additional blocks if other types of data, in addition to online activity data, are used to make the determination at block 306. For instance, the method 300 may include an additional block in which account data, relating to one or more other transactions made by the customer(s), may be retrieved from an account records database, in which case the first fraud detection rules may be applied to both the account data and the first online activity data at block 306.

B. Identifying False Positives Prior to Transmission Using Customer Data

Figure 6:
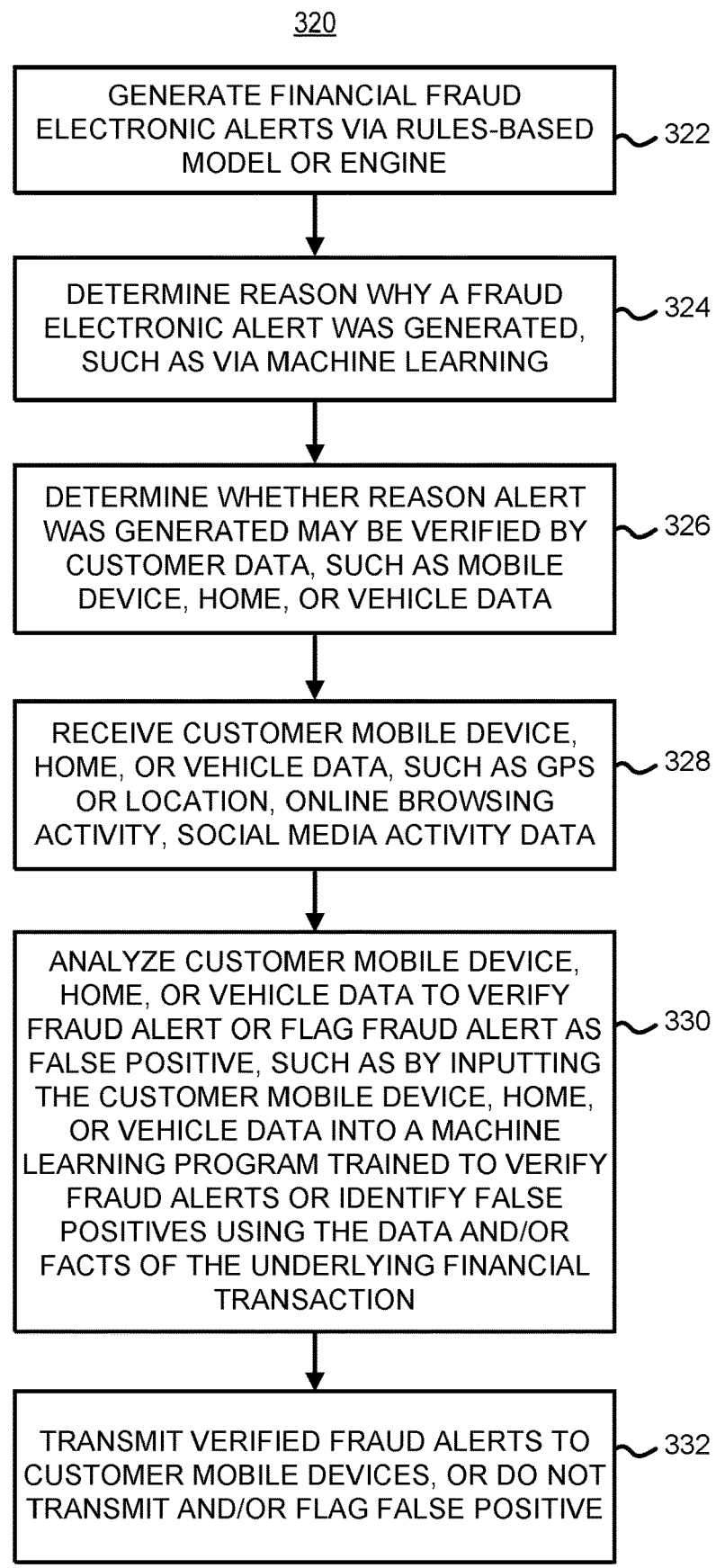
FIG. 6 illustrates an exemplary computer-implemented method of detecting false positives prior to transmission using customer data.

FIG. 6 illustrates a computer-implemented method 320 of reducing false positive fraud alerts, and/or identifying false positives prior to transmission using customer data, such as mobile device, vehicle, home, or other customer data. For instance, the customer data may be generated by mobile device-mounted, smart or autonomous vehicle-mounted, or smart or interconnected home-mounted processors, transceivers, and/or sensors. The method 320 may include, via one or more processors and/or transceivers (such as via wireless communication or data transmission over one or more radio frequency links or wireless communication channels), (1) using a rules-based model to determine or generate electronic fraud alerts associated with financial transactions (block 322); (2) inputting the electronic fraud alert (and/or associated facts related to the underlying financial transaction) into a machine learning program that is trained to identify a reason or cause why the electronic fraud alert was generated (exemplary reasons may include lost or stolen cards, account takeover, fake or counterfeit cards, or application fraud), or otherwise determining, via the one or more processors, a reason that the false positive was generated by the rules-based model (such as identify one or more facts associated with the financial transaction that caused the fraud alert to be generated) (block 324); (3) determining if the reason that the electronic fraud alert was generated may be verified (or confirmed) by analysis of customer mobile device, home, or vehicle data or activity, or, on the other hand, if the suspicious activity may be explained or the fraud alert may be identified as a false positive by analysis of customer mobile device, home, or vehicle data or activity (block 326); (4) if so, accessing or receiving customer data, such as mobile device or vehicle GPS data, or home occupancy or vacancy data (for example, if the customer is home, then they are not travelling, versus if the home has been vacant for a given period of time, the customer may indeed by traveling), or mobile device, home computer, or vehicle computer data indicating online browsing activity, social media activity, virtual "likes," purchasing history, purchasing preferences or tendencies, and/or travel activity (block 328); (5) inputting the customer mobile device, home, or vehicle data into the same or a second machine learning program trained to verify fraudulent activity or, on the other hand, identify that the fraud alert was a positive false (or otherwise analyzing, via the one or more processors, the customer mobile device, home, or vehicle data to verify fraudulent activity or, on the other hand, identify that the fraud alert was a positive false) (block 330); (6) transmitting verified or confirmed electronic fraud alerts to mobile devices of respective customers for their review and/or (7) flagging the electronic fraud alerts identified as false positives using the customer mobile device, home, or vehicle data for further processor or manual review prior to transmission to mobile devices of respective customers for their review to facilitate enhancing the customer experience and reducing customer annoyance associated with receiving false positives (block 332).

In one embodiment, a computer-implemented method of detecting or identifying electronic fraud alerts that are false positives prior to transmission to customer mobile devices based upon customer data may be provided. The method may include (1) receiving, via one or more processors and/or transceivers, data detailing a financial transaction associated with a customer, the data detailing the financial transaction being transmitted from a merchant (or financial institution) computer terminal over one or more radio links; (2) inputting, via the one or more processors, the data detailing a financial transaction into a rules-based engine that determines whether to generate an electronic fraud alert for the financial transaction based upon the data detailing the financial transaction; (3) if an electronic fraud alert is generated for the financial transaction, then inputting, via the one or more processors, the data detailing the financial transaction into a machine learning program that is trained to identify one or more facts indicated by the data detailing the financial transaction that triggered or caused the electronic fraud alert to be generated; (4) determining, via the one or more processors, if the one or more facts identified that triggered or caused the electronic fraud alert to be generated can be verified by customer data; (5) if so, retrieving or receiving, via the one or more processors and/or transceivers, customer data; (6) verifying, via the one or more processors, the fraud alert is not a false positive based upon analysis of the customer data; and/or (7) transmitting, via the one or more processors and/or transceivers, the verified electronic fraud alert to a mobile device of the customer via a wireless communication channel to alert the customer of fraudulent activity.

The customer data may be associated with a date and/or time of the financial transaction; associated with, or generated and transmitted by, a customer vehicle or customer mobile device; associated with a customer location at a day and/or time of the financial transaction; associated with customer preferences; associated with customer social media activity; associated with customer shopping history or preferences; associated with whether or not the customer's home is presently occupied or vacant; and/or associated with customer online activity, customer online shopping, or online customer online browsing activity.

Verifying, via the one or more processors, that the fraud alert is not a false positive based upon analysis of the customer data may include inputting, via the one or more processors, the customer data into a machine learning program that is trained to verify that the fraud alert is not a false positive using the customer data. The machine learning program may use the customer data to determine whether or not a customer location at a date and/or time of the financial transaction corresponds to a transaction or merchant location. The machine learning program may use the customer data to determine whether or not (i) customer browsing activity is related to a type of product or service purchased by the financial transaction; (ii) a product or service corresponds to a type of product or service that the customer prefers or typically purchases; and/or (iii) a merchant associated with the transaction is one that the customer prefers or typically uses.

The one or more facts identified that triggered or caused the electronic fraud alert to be generated may include one or more of: an amount of a transaction; a type of the transaction; a location of the transaction or merchant; an identity of a merchant; an identity of an online merchant; a type of merchant; customer location; customer historical transactions; an indication of an account takeover; an indication of a fake card; an indication of a fraudulent application; an indication of a stolen card; an indication of a stolen card number or a comprised card number/account; and/or a number or frequency of transactions associated with a merchant or individual. The one or more facts identified that triggered or caused the electronic fraud alert to be generated may include one or more of: type of credit card, type of other card, card issuer, credit card number, card holder name, merchant, merchant location, transaction location, amount of transaction, type of product or service, and/or type of transaction. Additionally or alternatively, the one or more facts identified that triggered or caused the electronic fraud alert to be generated may include one or more of: a credit or debit card number, other type of card number, a card holder name, a merchant name, a transaction location, merchant location, customer location, type of transaction, or an amount.

Verifying that the fraud alert is not a false positive based upon analysis of the customer data may involve comparison of a transaction or merchant location data associated with the data detailing a financial transaction with a customer location associated with the customer data to determine a mismatch, including a customer mobile device or vehicle GPS location, or smart home occupancy or vacancy information. Verifying the fraud alert is not a false positive based upon analysis of the customer data may involve comparison of an item (product or service) purchased identified by the data detailing a financial transaction with previous items (products or services) purchased by the customer, or items reviewed by the customer online (such as identified by recent online browsing activity or social media activity) to identify an unusual or unexpected item purchased. Additionally or alternatively, verifying the fraud alert is not a false positive based upon analysis of the customer data may involve comparison of a transaction amount or merchant identified by the data detailing a financial transaction with a purchasing history of the customer to identify an unusual or unexpected transaction amount, type of transaction, or merchant.

In another embodiment, a computer-implemented method of detecting or identifying electronic fraud alerts that are false positives prior to transmission to customer mobile devices based upon customer data may be provided. The method may include (1) receiving, via one or more processors and/or transceivers, data detailing a financial transaction associated with a customer, the data detailing the financial transaction being transmitted from a merchant computer terminal over one or more radio links; (2) inputting, via the one or more processors, the data detailing a financial transaction into a rules-based engine that determines whether to generate an electronic fraud alert for the financial transaction based upon the data detailing the financial transaction; (3) if an electronic fraud alert is generated for the financial transaction, then inputting, via the one or more processors, the data detailing the financial transaction into a machine learning program that is trained to (i) determine a reason why the electronic fraud alert was generated (such as stolen card, compromised account or card, identity theft, account takeover, counterfeit cards, fraudulent application, etc.) and/or (ii) identify one or more facts indicated by the data detailing the financial transaction that triggered or caused the electronic fraud alert to be generated (transaction amount or location, online merchant, merchant identification, type of product or service, etc.); (4) determining, via the one or more processors, if (i) the reason why the electronic fraud alert was generated, and/or (ii) the one or more facts identified that triggered or caused the electronic fraud alert to be generated can be verified by customer data; (5) if so, retrieving or receiving, via the one or more processors and/or transceivers, customer data; (6) verifying, via the one or more processors, the fraud alert is not a false positive based upon analysis of the customer data; and/or (7) transmitting, via the one or more processors and/or transceivers, the verified electronic fraud alert to a mobile device of the customer via a wireless communication channel to alert the customer of fraudulent activity.

In another embodiment, a computer system configured to detect or identify electronic fraud alerts that are false positives prior to transmission to customer mobile devices based upon customer data may be provided. The computer system may include one or more processors and/or transceivers configured to: (1) receive data detailing a financial transaction associated with a customer, the data detailing the financial transaction being transmitted from a merchant (or financial institution) computer terminal via wireless communication or data transmission over one or more radio links or wireless communication channels; (2) input the data detailing a financial transaction into a rules-based engine that determines whether to generate an electronic fraud alert for the financial transaction based upon the data detailing the financial transaction; (3) if an electronic fraud alert is generated for the financial transaction, then input the data detailing the financial transaction into a machine learning program that is trained to identify one or more facts indicated by the data detailing the financial transaction that triggered or caused the electronic fraud alert to be generated; (4) determine if the one or more facts identified that triggered or caused the electronic fraud alert to be generated can be verified by customer data; (5) if so, retrieve or receive customer data via wireless communication or data transmission over one or more radio links or wireless communication channels; (6) verify the fraud alert is not a false positive based upon analysis of the customer data; and/or (7) transmit the verified electronic fraud alert to a mobile device of the customer via wireless communication or data transmission over one or more radio links or wireless communication channels to alert the customer of fraudulent activity. The computer system may be configured to include additional, less, or alternate functionality, including the functionality discussed elsewhere herein and/or with the computer-implemented methods discussed above.

C. Reducing False Positives Based Upon Customer Feedback

Figure 7:
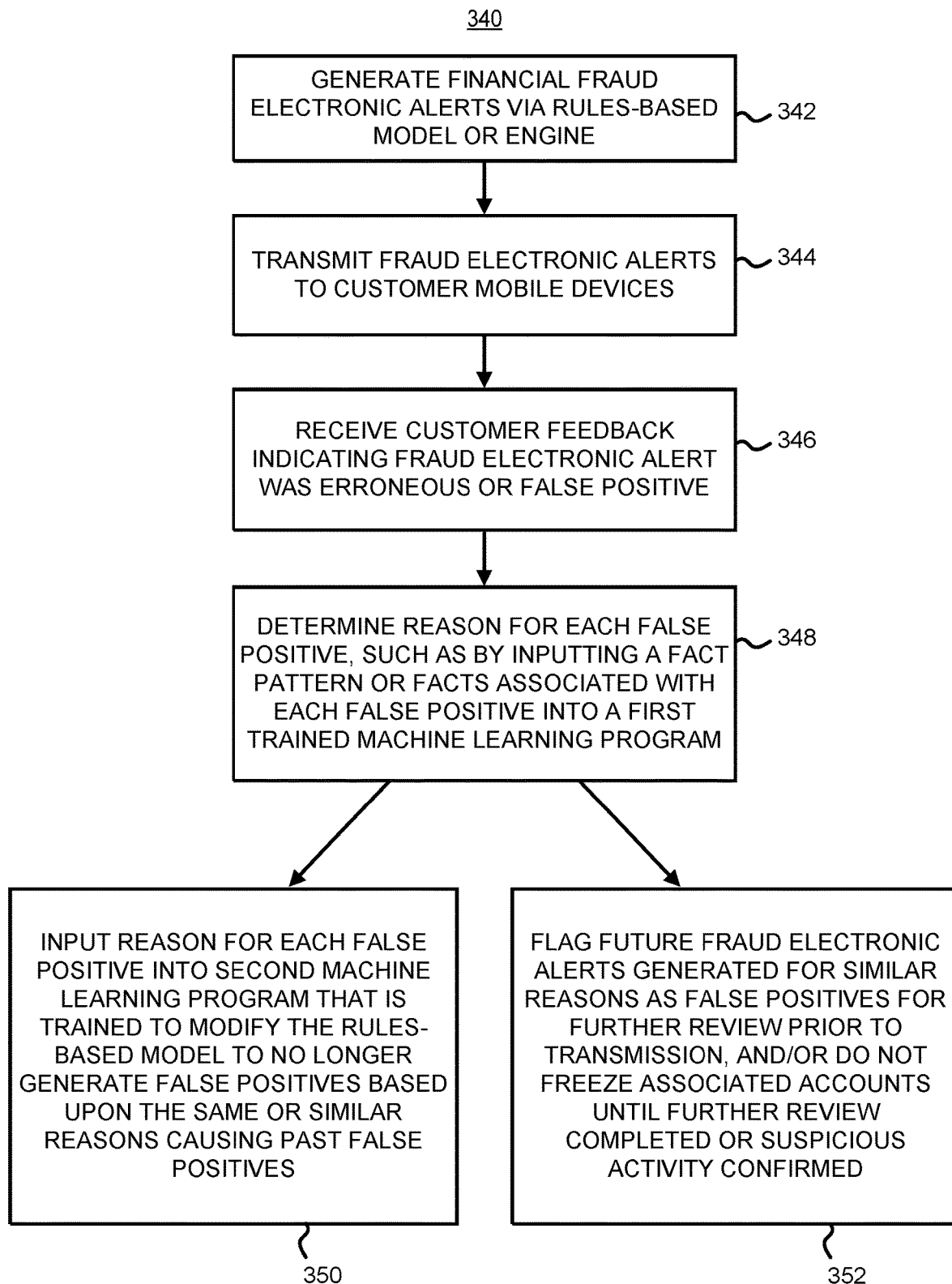
FIG. 7 illustrates an exemplary computer-implemented method of reducing future false positives based upon customer feedback.

FIG. 7 illustrates a computer-implemented method 340 of reducing false positive fraud alerts based upon customer feedback. The method 340 may include, via one or more processors and/or transceivers (such as via wireless communication or data transmission over one or more radio frequency links or wireless communication channels), (1) using a rules-based model or engine to determine or generate electronic fraud alerts associated with financial transactions (block 342); (2) transmitting the electronic fraud alerts to mobile devices of respective customers for their review (block 344); (3) receiving customer feedback that an electronic fraud alert is a false positive from a customer mobile device (block 346), and receiving customer information verifying that the customer mobile device has not been stolen; (4) inputting the electronic fraud alert that is a false positive (and/or associated facts related to the underlying financial transaction) into a machine learning program that is trained to identify a reason or cause why the electronic fraud alert is a false positive, or otherwise determining a reason that each false positive was generated from processor analysis of the facts or fact pattern surrounding the financial transaction (block 348); and/or (5) modifying the rules-based model or engine to account for the reason why the electronic fraud alert is a false positive (or one or more facts associated with the financial transaction that caused the false positive to be generated). The reason for each false positive may be input into the same or a second machine learning program that is trained to modify the rules-based model to no longer generate false positives based upon the same or similar reasons causing the past false positives (block 350). For instance, a transaction location, amount, merchant, type of merchant, product or services purchased, and/or type of financial transaction (e.g., online versus in-person purchase, type of financial card or instrument used, etc.) may be unexpected given a customer's purchasing history, online purchasing or shopping history, and/or home address.

The method 340 may also include flagging future electronic fraud alerts generated for the same or similar reasons as the false positives for further human or processor review prior to transmission to customers, and/or not freezing associated accounts until further review of the financial transaction has been completed and/or any suspicious activity has been confirmed by the customer (block 352), such as via their mobile device. As a result, a number of false positive fraud alerts generated in the future by the rules-based model or engine may be reduced, and the customer experience may be enhanced.

In one embodiment, a computer-implemented method of reducing a future amount of electronic fraud alerts generated that are false positives using customer feedback may be provided. The method may include (1) receiving, via one or more processors and/or transceivers, data detailing a financial transaction associated with a customer, the data detailing the financial transaction being transmitted from a merchant computer terminal over one or more radio links; (2) inputting, via the one or more processors, the data detailing a financial transaction into a rules-based engine that generates an electronic fraud alert based upon the data detailing the financial transaction; (3) transmitting, via the one or more processors and/or transceivers, the electronic fraud alert to a mobile device of the customer via a wireless communication channel to alert the customer; (4) receiving, via the one or more processors and/or transceivers, customer feedback from the mobile device of the customer via the wireless communication channel, the customer feedback indicating that the electronic fraud alert was a false positive or otherwise erroneous; and/or (5) inputting, via the one or more processors, the data detailing the financial transaction into a machine learning program that is trained to (i) determine a reason why the false positive was generated (or determine why the electronic fraud alert was a false positive), and (ii) then modify the rules-based engine to account for the reason why the false positive was generated, and to no longer generate electronic fraud alerts based upon (a) similar fact patterns of the financial transaction, or (b) data similar to the data detailing the financial transaction to facilitate reducing an amount of false positive fraud alerts generated in the future.

The data detailing the financial transaction may include a credit card number, a card holder name, a merchant name, a transaction or merchant location, a product or service, and/or an amount. The machine learning program determining a reason why the false positive was generated may include the machine learning program identifying a piece of the data detailing the financial transaction that caused the false positive. The piece of the data detailing the financial transaction that was determined to have caused the false positive may be a credit card number, a card holder name, a merchant name, a transaction or merchant location, a customer location, a product or service, and/or an amount.

The machine learning program may modify the rules-based engine to no longer generate fraud alerts when financial transaction data includes a same or similar fact pattern as the data detailing the financial transaction, the same or similar fact pattern being determined from a same or similar type of credit card, type of other card, card issuer, credit card number, card holder name, merchant, merchant location, transaction location, customer location, product or service, amount of transaction, and/or type of transaction.

The machine learning program determining a reason why the false positive was generated may include the machine learning program identifying a characteristic of the data detailing the financial transaction that caused the false positive. The characteristic of the data detailing the financial transaction that was determined by the machine learning program to have caused the false positive may be a credit or debit card number, other type of card number, a card holder name, a merchant name, a transaction location, merchant location, type of card used, customer location, product or service being purchased or associated with the financial transaction, type of transaction, an indication of a lost or stolen card, an indication of account takeover, an indication application fraud, an indication of a counterfeit card, or an amount of the transaction.

The characteristic of the data detailing the financial transaction that was determined by the machine learning program to have caused the false positive may be one or more of: an amount of a transaction; a type of the transaction; a location of the transaction or merchant; an identity of a merchant; an identity of an online merchant; a type of merchant; customer location, customer home address, product or service being purchased, and/or a number or frequency of transactions associated with a merchant or individual/customer. The characteristic of the data detailing the financial transaction that was determined by the machine learning program to have caused the false positive may be one or more of: one or more inconsistencies between (i) the fact pattern of the financial transaction, and (ii) a customer's historical or preferred credit card usage, customer location, customer tendencies or preferences, and/or historical financial transactions. The characteristic of the data detailing the financial transaction that was determined by the machine learning program to have caused the false positive may be one or more of: an indication of a lost or stolen card, an indication of account takeover, an indication application fraud, an indication of a counterfeit card, and/or an amount of the transaction.

The characteristic of the data detailing the financial transaction that was determined by the machine learning program to have caused the false positive may be (i) that a merchant being used was previously associated with a data breach or presumed to have been compromised; (ii) an inconsistency between a customer's mobile device or vehicle GPS location at a day and/or time of a transaction, and a transaction location; (iii) an inconsistency between a customer's home address or city, and a transaction location; (iv) an inconsistency between a customer's location at a day and/or time of the financial transaction as gleaned from social media or other customer data, and a transaction location; and/or (v) that the customer is traveling to a city or state that is not their home address.

In another embodiment, a computer system configured to reduce a future amount of electronic fraud alerts generated that are false positives using customer feedback may be provided. The computer system may include one or more processors configured to: (1) receive data detailing a financial transaction associated with a customer, the data detailing the financial transaction being transmitted from a merchant (or financial institution) computer terminal via wireless communication or data transmission over one or more radio links or wireless communication channels; (2) input the data detailing a financial transaction into a rules-based engine that generates an electronic fraud alert based upon the data detailing the financial transaction; (3) transmit the electronic fraud alert to a mobile device of the customer via a wireless communication or data transmission over one or more radio links or wireless communication channels to alert the customer; (4) receive customer feedback from the mobile device of the customer via a wireless communication or data transmission over one or more radio links or wireless communication channels, the customer feedback indicating that the electronic fraud alert was a false positive or otherwise erroneous; and/or (5) input the data detailing the financial transaction into a machine learning program that is trained to (i) determine a reason why the false positive was generated (or determine why the electronic fraud alert was a false positive, such as identify one or more facts or pieces of data associated with the financial transaction that triggered the electronic fraud alert), and (ii) then modify the rules-based engine to account for the reason why the false positive was generated, and to no longer generate electronic fraud alerts based upon (a) similar fact patterns, or one or more facts, of the financial transaction, or (b) data, or one or more facts or pieces of data, similar to the data detailing the financial transaction to facilitate reducing an amount of false positive fraud alerts generated in the future.

The computer system may be configured to include additional, less, or alternate functionality, including the functionality discussed elsewhere herein and/or with the computer-implemented method discussed above. The machine learning program may modify the rules-based engine by adding a rule or subtracting a rule, or modifying a rule. The machine learning program may modify the rules-based engine by adding a rule that checks for data detailing the financial transaction that is similar to one or more facts associated with why the false positive was generated, and when found, direct the rules-based engine to not generate an electronic fraud alert based solely on those one or more facts.

D. Exemplary Fraud Detection Method Using Cardholder-Specific Spending Patterns

Figure 8:
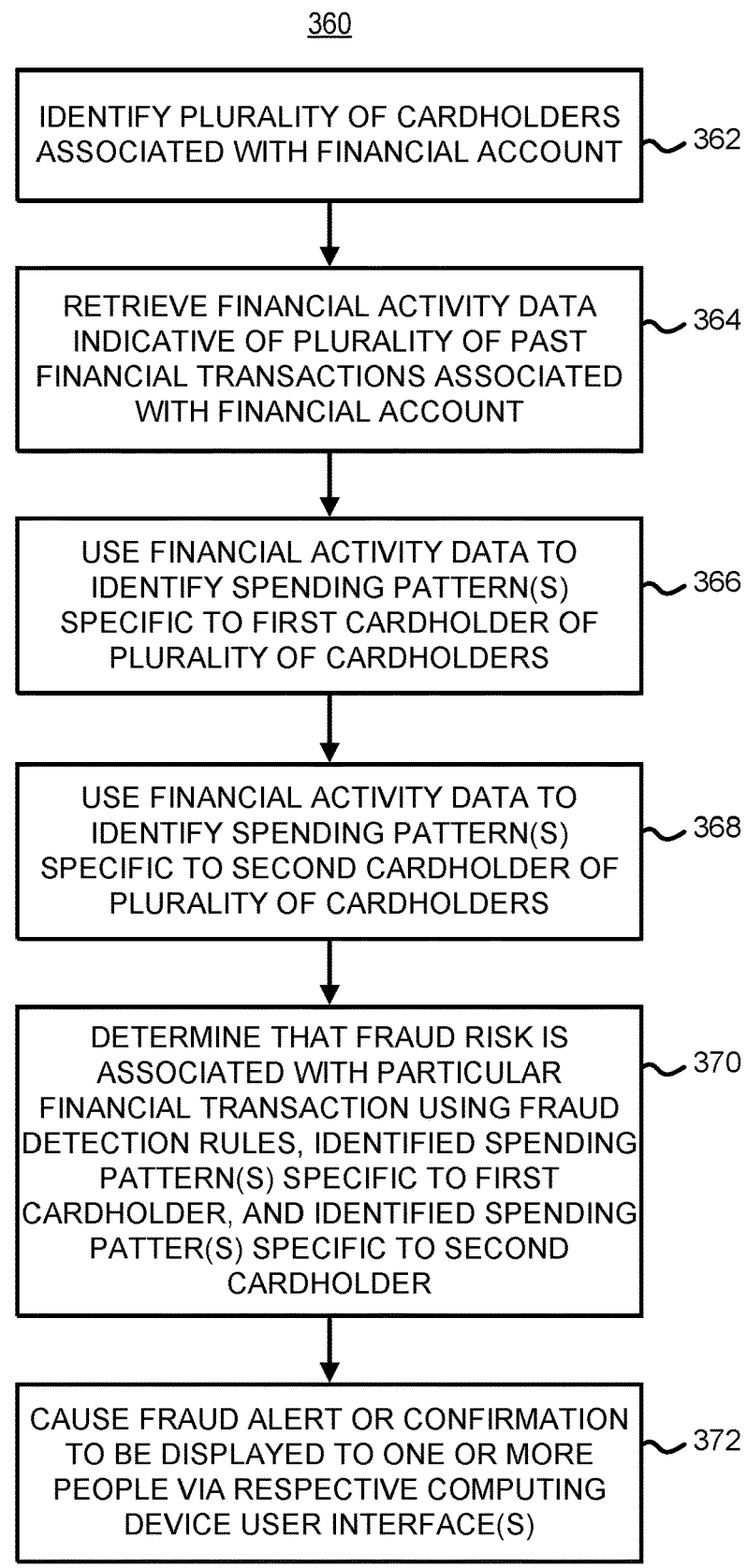
FIG. 8 depicts a flow diagram of an exemplary method for detecting financial fraud relating to a financial account associated with multiple cardholders using individual cardholder spending patterns, according to one embodiment.

Referring next to FIG. 8, an exemplary computer-implemented method 360 may be used to detect financial fraud relating to a financial account associated with multiple cardholders, using individual cardholder spending patterns. In other embodiments, the method 360 may be used in connection with non-card account transactions, such as transactions involving personal checks.

In the method 360, a plurality of cardholders associated with the financial account may be identified (block 362). For example, a database containing account records (e.g., account records database 30 of FIG. 1) may contain a record of cardholders associated with multiple accounts, and the cardholders associated with the account of interest may be identified at block 362 by accessing the information stored in the database.

Financial activity data, indicative of a plurality of past financial transactions associated with the financial account, may be retrieved (block 364). For example, a database containing account records (e.g., account records database 30) may contain a list of transactions associated with each of multiple accounts, and the transactions associated with the account of interest may be retrieved at block 364 by accessing the information stored in the database.

The financial activity data retrieved at block 364 may be used to identify one or more spending patterns specific to a first cardholder of the plurality of cardholders identified at block 362 (block 366). Various types of spending patterns may be identified, in accordance with the embodiment and/or scenario (e.g., depending upon the amounts, dates and/or other details of the transactions represented by the financial activity data). For example, the identified spending pattern(s) may include a maximum dollar amount likely to be spent by the first cardholder in a single financial transaction (e.g., as calculated based upon dollar amounts associated with those past financial transactions that were made by the first cardholder), a maximum dollar amount likely to be spent by the first cardholder in a particular time span (e.g., as calculated based upon dollar amounts and dates associated with the past transactions made by the first cardholder), a likelihood that the first cardholder would make a financial transaction via a particular card information entry mode (e.g., "card present" or "card not present," etc., as determined based upon information entry modes associated with the past transactions made by the first cardholder), a likelihood that the first cardholder would purchase a product or service corresponding to a particular transaction or merchant category (e.g., as determined based upon information indicating transaction or merchant categories, such as "tools" or "online retailers," associated with the past transactions made by the first cardholder), etc.

The financial activity data retrieved at block 364 may also be used to identify one or more spending patterns specific to a second cardholder of the plurality of cardholders identified at block 362 (block 368). The spending pattern(s) identified for the second cardholder may include some or all of the same types of patterns identified for the first cardholder, and/or may include one or more different types of spending patterns.

The spending patterns specific to the first and second cardholders and identified at blocks 366 and 368 may be used, in conjunction with fraud detection rules, to determine that a fraud risk is associated with a particular financial transaction (block 370). For example, it may be determined that a dollar amount associated with the particular transaction is greater than both a maximum dollar amount per transaction identified at block 366 and a maximum dollar amount per transaction identified at block 368 (e.g., indicating there is a significant likelihood that neither cardholder made the purchase). In other scenarios, not represented by FIG. 8, it may instead be determined that no significant fraud risk is associated with the transaction.

A fraud alert or confirmation may be caused to be displayed to one or more people via one or more respective computing device user interfaces (block 372). Block 372 may occur in response to the determination at block 370, for example. The fraud alert or confirmation may specify the transaction at issue, and possibly other information such as an identifier of the account and/or the transaction date, dollar amount, merchant name, etc. The fraud alert or confirmation may be sent to computing devices of the first and/or second cardholders, to computing devices of one or more employees of a card issuer or other entity, and/or to one or more other computing devices and/or systems, for example. Block 372 may be implemented by notification unit 56 of FIG. 1, for example.

In some embodiments, the method 360 may include one or more additional blocks not shown in FIG. 8. For example, the method 360 may include an additional block in which it is determined that no significant fraud risk exists for another particular financial transaction associated with the financial account (e.g., by using the identified spending patterns specific to the first and/or second cardholders and the fraud detection rules). As another example, the method 360 may include an additional block in which the fraud detection rules are generated or updated by training a machine learning program, such as any of the types of machine learning programs discussed above in connection with ML rule generator 40 of FIG. 1 or process stage 84 of FIG. 2. The machine learning program may be trained using financial activity data associated with a plurality of other cardholders and other accounts, and fraud determinations/labels each corresponding to a respective one of those other accounts, for example.

E. Exemplary Fraud Classification Method

Figure 9:
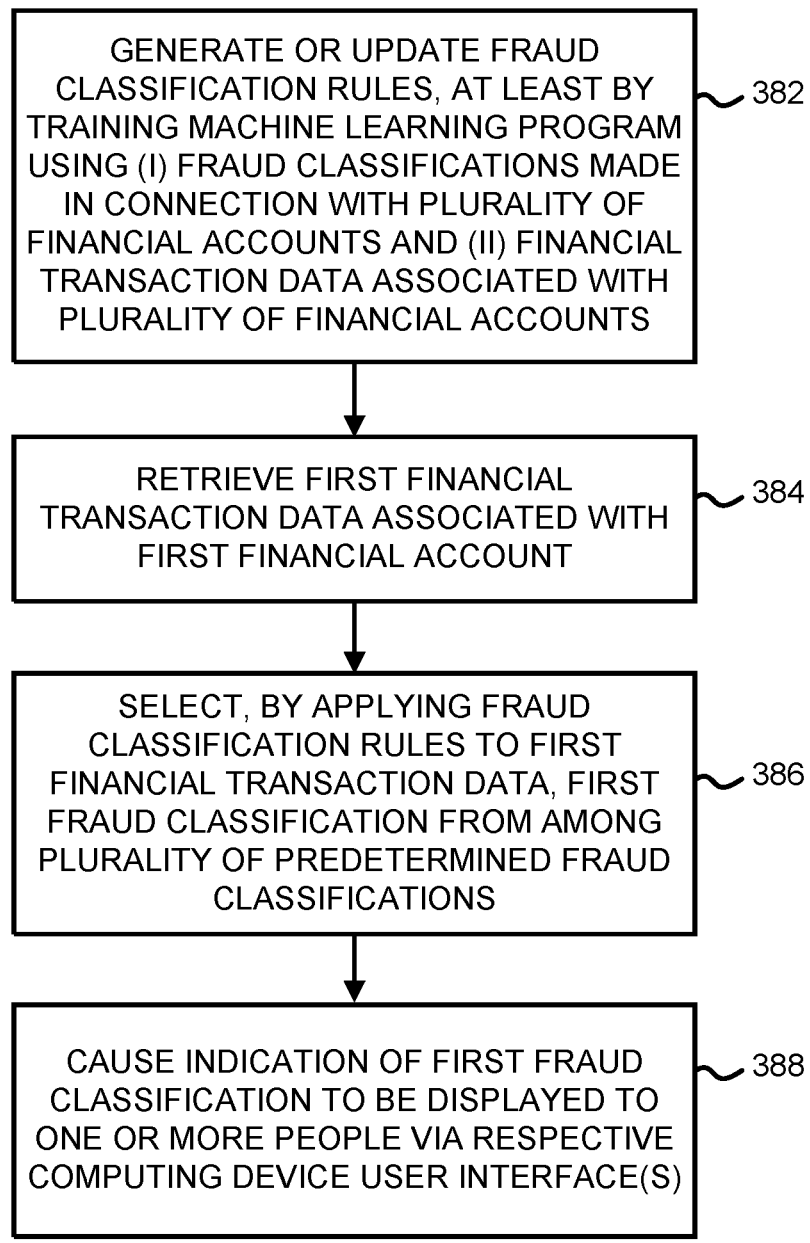
FIG. 9 depicts a flow diagram of an exemplary method for automating a fraud classification process, according to one embodiment.

Referring now to FIG. 9, an exemplary computer-implemented method 380 may be used to automate a fraud classification process, e.g., to provide preliminary information that may direct/facilitate a more in-depth fraud investigation and/or allow more accurate and/or precise fraud analytics. In the method 380, fraud classification rules may be generated or updated by training a machine learning program (block 382), such as any of the types of machine learning programs discussed above in connection with ML rule generator 40 of FIG. 1 or process stage 84 of FIG. 2, for example. The machine learning program may be trained using fraud classifications made in connection with a plurality of financial accounts and financial transaction data associated with those accounts. The fraud classifications may include at least two different classifications corresponding to different types of fraud (e.g., "counterfeiting," "forgery," "account takeover," "chargeback fraud," "skimming," "application fraud," etc.). In addition, in some embodiments, one classification may correspond to a lack of fraud.

In some embodiments, other types of data (in addition to the financial transaction data) may also be used to train the machine learning program, such as online activity data associated with holders of the financial accounts, and/or location data indicating geographic locations of holders of the financial accounts (e.g., at or near the times of various transactions). For example, each fraud classification may be associated with the transaction data, online activity data, and location data that corresponds to one particular account and/or customer.

First financial transaction data associated with a first financial account may be retrieved (block 384). For example, a database containing account records (e.g., account records database 30 of FIG. 1) may contain a record of transactions associated with multiple accounts, and the first financial transaction data may be retrieved at block 384 by accessing the information stored in the database. In some embodiments, other data may also be retrieved in the method 380, such as online activity data and/or location data associated with the holder of the first financial account.

A first fraud classification, indicating a type of fraud potentially associated with the first financial account, may be selected from among a plurality of predetermined fraud classifications (block 386). In some embodiments and scenarios, more than one fraud classification is selected. The selection may be made by applying the fraud classification rules generated or updated at block 382 to the first financial transaction data retrieved at block 384 (and possibly also to any other retrieved data, such as online activity data and/or location data associated with the holder of the first financial account), with the set of predetermined fraud classifications including at least the two different classifications discussed above in connection with block 382. In one embodiment, for example, the predetermined fraud classifications include all of the classifications used to train the machine learning program at block 382.

An indication of the first fraud classification may be caused to be displayed to one or more people via one or more respective computing device user interfaces (block 388). The indication may also specify the first financial account, and/or other relevant information (e.g., one or more particular suspect transactions). The indication may be sent to a computing device of a card issuer or other entity, for example, to facilitate a more in-depth investigation of the first financial account (e.g., by enabling a more targeted manual investigation), and/or for analytics-based purposes (e.g., to get a reading of current trends in fraudulent activity). Block 388 may be implemented by notification unit 56 of FIG. 1, for example.

In some embodiments, the method 380 may include one or more additional blocks not shown in FIG. 9. In one embodiment, for example, the method 380 may include an additional block in which one or more statistics indicative of a distribution of different fraud types are calculated. The statistic(s) may be calculated using the first fraud classification and a plurality of other fraud classifications associated with a plurality of other financial accounts (e.g., some or all of the accounts used for training the machine learning program at block 382, and/or other accounts). As another example, the method 380 may include an additional block (e.g., prior to block 384) in which an indication that one or more financial transactions, associated with the first financial account, have been flagged as potentially involving fraud is received. Block 384 may then occur in response to receiving that indication.

VI. Exemplary System for Fraud Detection & Classification

Figure 10:
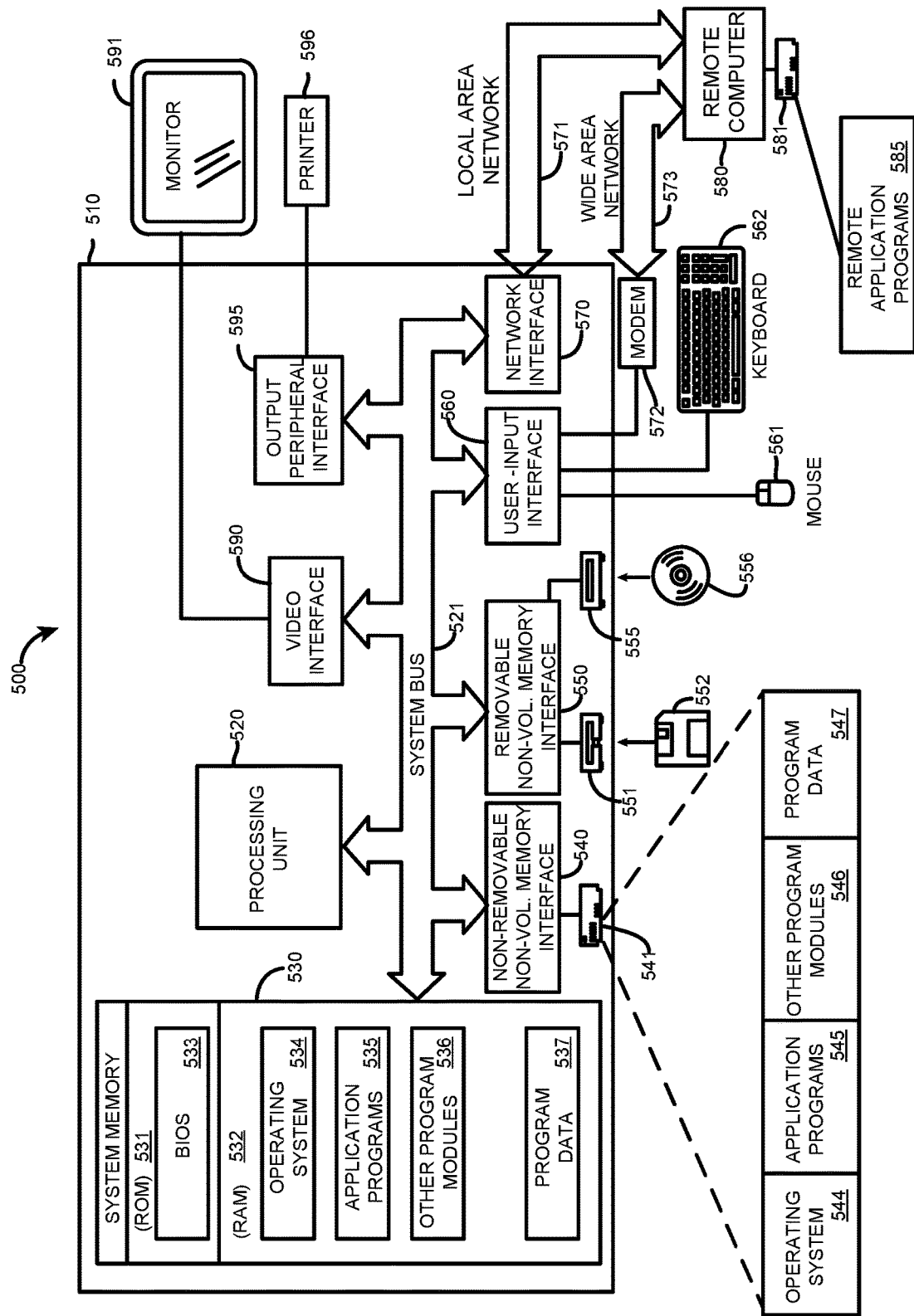
FIG. 10 depicts an exemplary computer system in which the techniques described herein may be implemented, according to one embodiment.

FIG. 10 depicts an exemplary computer system 500 in which the techniques described herein may be implemented, according to one embodiment. The computer system 500 of FIG. 10 may include a computing device in the form of a computer 510. Components of the computer 510 may include, but are not limited to, a processing unit 520, a system memory 530, and a system bus 521 that couples various system components including the system memory 530 to the processing unit 520. The system bus 521 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 may include a variety of computer-readable media. Computer-readable media may be any available media that can be accessed by computer 510 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 530 may include computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to, and/or presently being operated on, by processing unit 520. By way of example, and not limitation, FIG. 10 illustrates operating system 534, application programs 535, other program modules 536, and program data 537.

The computer 510 may also include other removable/non-removable, volatile/nonvolatile computer storage media. By way of example only, FIG. 10 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 may be connected to the system bus 521 through a non-removable memory interface such as interface 540, and magnetic disk drive 551 and optical disk drive 555 may be connected to the system bus 521 by a removable memory interface, such as interface 550.

The drives and their associated computer storage media discussed above and illustrated in FIG. 10 provide storage of computer-readable instructions, data structures, program modules and other data for the computer 510. In FIG. 10, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as cursor control device 561 (e.g., a mouse, trackball, touch pad, etc.) and keyboard 562. A monitor 591 or other type of display device is also connected to the system bus 521 via an interface, such as a video interface 590. In addition to the monitor, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and may include many or all of the elements described above relative to the computer 510, although only a memory storage device 581 has been illustrated in FIG. 10. The logical connections depicted in FIG. 10 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 may include a modem 572 or other means for establishing communications over the WAN 573, such as the Internet. The modem 572, which may be internal or external, may be connected to the system bus 521 via the input interface 560, or other appropriate mechanism. The communications connections 570, 572, which allow the device to communicate with other devices, are an example of communication media, as discussed above. In a networked environment, program modules depicted relative to the computer 510, or portions thereof, may be stored in the remote memory storage device 581. By way of example, and not limitation, FIG. 10 illustrates remote application programs 585 as residing on memory device 581.

The techniques for detecting and/or classifying fraud described above may be implemented in part or in their entirety within a computer system such as the computer system 500 illustrated in FIG. 10. The computer 510 may be included in AFSS 12 of FIG. 1, for example, and/or the remote application programs 585 may include one or more applications of either FAMS 14, one of cardholder computing device 20, one of merchant computing systems 22, or a computing device of other sources 24. Moreover, the functionality of fraud detection/classification unit 36 of FIG. 1 may be implemented by one or more of application programs 535 and/or other program modules 536. As another example, ML rules database 58, account holder behaviors database 60 and/or chargeback rules database 62 of FIG. 1 may be stored in hard disk drive 541 (e.g., as program data 547), magnetic disk 552 and/or optical disk drive 555, and/or the data retrieved by fraud detection/classification unit 36 of FIG. 1 may be stored in hard disk drive 541 (e.g., as program data 547) and/or RAM 532 (e.g., as program data 537).

VII. Exemplary Method Embodiments

In one aspect, a computer-implemented method, implemented in one or more servers or computing devices, of using customer online activity to detect financial fraud may include (1) determining, by one or more processors of the one or more servers, that a fraud risk is associated with a particular financial transaction, wherein the particular financial transaction may be associated with a financial account; (2) retrieving, by the one or more processors and from a database storing historical online activity data, first online activity data indicative of past online activity of one or more customers associated with the financial account; (3) determining, by the one or more processors applying first fraud detection rules to the first online activity data, that the fraud risk cannot be ruled out as a false positive, wherein determining that the fraud risk cannot be ruled out as a false positive may include determining whether the past online activity indicates interest, by any of the one or more customers, in one or both of (i) a product or service associated with the particular financial transaction and (ii) a merchant associated with the particular financial transaction; and/or (4) in response to determining that the fraud risk cannot be ruled out as a false positive, causing, by the one or more processors, a fraud alert or confirmation to be displayed to one or more people via one or more respective computing device user interfaces, wherein the fraud alert or confirmation may specify at least the particular financial transaction. The method may include additional, fewer or alternative actions, such as any of those discussed elsewhere herein.

For instance, determining that the fraud risk is associated with the particular financial transaction may include applying second fraud detection rules to a data record associated with the financial account. Applying the second fraud detection rules to the data record may include one or both of (i) analyzing a dollar amount of the particular financial transaction and (ii) analyzing a geographic location at which the particular financial transaction was initiated.

Additionally or alternatively, the financial account may be a credit or debit card account associated with a particular card network entity. Additionally or alternatively, applying the second fraud detection rules may further include analyzing a fraud score provided by the particular card network entity.

Additionally or alternatively, determining that the fraud risk is associated with the particular financial transaction may include (i) determining whether the dollar amount is above a threshold value and (ii) comparing the geographic location at which the particular financial transaction was initiated to a geographic location associated with a residence of at least one of the one or more customers.

Additionally or alternatively, determining that the fraud risk cannot be ruled out as a false positive may include: (i) determining whether one or more websites visited by at least one of the one or more customers indicate interest in one or both of (a) the product or service associated with the particular financial transaction and (b) the merchant associated with the particular financial transaction; (ii) determining whether one or more selections made by at least one of the one or more customers via one or more websites are indicative of interest in one or both of (a) the product or service associated with the particular financial transaction and (b) the merchant associated with the particular financial transaction; and/or (iii) determining whether at least one of the one or more customers endorsed one or both of (a) the product or service associated with the particular financial transaction, and (b) the merchant associated with the particular financial transaction, via a social media account.

Additionally or alternatively, determining that a fraud risk is associated with the particular financial transaction may include determining that a geographic location at which the particular financial transaction was initiated is different than a geographic location associated with a residence of at least one of the one or more customers, and determining that the fraud risk cannot be ruled out as a false positive may include: (i) determining that at least one of the one or more customers checked in to a flight to an airport proximate to the geographic location at which the particular financial transaction was initiated; and/or (ii) determining that one or more websites visited by at least one of the one or more customers are associated with the geographic location at which the particular financial transaction was initiated.

Additionally or alternatively, the method may further comprise generating or updating the first fraud detection rules at least by training a machine learning program using at least (i) online activity data associated with a plurality of other financial accounts, and (ii) fraud determinations each corresponding to a respective one of the plurality of other financial accounts.

Additionally or alternatively, causing a fraud alert or confirmation to be displayed to one or more people via one or more respective computing device user interfaces may include transmitting data indicative of the fraud alert or confirmation from the one or more servers to a remote computing device of at least one of the one or more customers for display to the customer via a user interface of the remote computing device.

In another aspect, a computer-implemented method, implemented in one or more servers or other computing devices, of using individual cardholder spending patterns to detect financial fraud relating to a financial account associated with multiple cardholders may include (1) identifying, by one or more processors of the one or more servers, a plurality of cardholders associated with the financial account; (2) retrieving, by the one or more processors and from a database, financial activity data indicative of a plurality of past financial transactions associated with the financial account; (3) using, by the one or more processors, the financial activity data to identify one or more spending patterns specific to a first cardholder of the plurality of cardholders; (4) using, by the one or more processors, the financial activity data to identify one or more spending patterns specific to a second cardholder of the plurality of cardholders; (5) determining, by the one or more processors, that a fraud risk is associated with a particular financial transaction associated with the financial account, at least by using (i) fraud detection rules, (ii) the identified one or more spending patterns specific to the first cardholder, and (iii) the identified one or more spending patterns specific to the second cardholder; and/or (6) causing, by the one or more processors, a fraud alert or confirmation to be displayed to one or more people via one or more respective computing device user interfaces, wherein the fraud alert or confirmation may specify at least the particular financial transaction. The method may include additional, fewer or alternative actions, such as any of those discussed elsewhere herein.

For instance, using the financial activity data to identify one or more spending patterns specific to the first cardholder may include identifying, based upon dollar amounts associated with a first subset of the plurality of past financial transactions, a maximum dollar amount likely to be spent by the first cardholder in a single financial transaction, and/or using the financial activity data to identify one or more spending patterns specific to the second cardholder may include identifying, based upon dollar amounts associated with a second subset of the plurality of past financial transactions, a maximum dollar amount likely to be spent by the second cardholder in a single financial transaction.

Additionally or alternatively, determining that a fraud risk is associated with the particular financial transaction may include determining that a dollar amount associated with the particular financial transaction is greater than both (i) the maximum dollar amount likely to be spent by the first cardholder in a single financial transaction, and (ii) the maximum dollar amount likely to be spent by the second cardholder in a single financial transaction.

Additionally or alternatively, using the financial activity data to identify one or more spending patterns specific to the first cardholder may include identifying, based upon dollar amounts and dates associated with a first subset of the plurality of past financial transactions, a maximum dollar amount likely to be spent by the first cardholder in a particular time span, and using the financial activity data to identify one or more spending patterns specific to the second cardholder may include identifying, based upon dollar amounts and dates associated with a second subset of the plurality of past financial transactions, a maximum dollar amount likely to be spent by the second cardholder in the particular time span.

Additionally or alternatively, determining that a fraud risk is associated with the particular financial transaction may include determining either (i) that the particular financial transaction causes a dollar amount spent by the first cardholder in the particular time span to be greater than the maximum dollar amount likely to be spent by the first cardholder in the particular time span, or (ii) that the particular financial transaction causes a dollar amount spent by the second cardholder in the particular time span to be greater than the maximum dollar amount likely to be spent by the second cardholder in the particular time span.

Additionally or alternatively, (1) using the financial activity data to identify one or more spending patterns specific to the first cardholder may include identifying, based upon information indicating card information entry modes associated with a first subset of the plurality of past financial transactions, a likelihood that the first cardholder would make a financial transaction via a first card information entry mode; and/or (2) using the financial activity data to identify one or more spending patterns specific to the second cardholder may include identifying, based upon information indicating card information entry modes associated with a second subset of the plurality of past financial transactions, a likelihood that the second cardholder would make a financial transaction via a second card information entry mode.

Additionally or alternatively, (1) using the financial activity data to identify one or more spending patterns specific to the first cardholder may include identifying, based upon information indicating transaction or merchant categories associated with a first subset of the plurality of past financial transactions, a likelihood that the first cardholder would purchase a product or service corresponding to a first transaction or merchant category; and (2) using the financial activity data to identify one or more spending patterns specific to the second cardholder may include identifying, based upon information indicating transaction or merchant categories associated with a second subset of the plurality of past financial transactions, a likelihood that the second cardholder would purchase a product or service corresponding to a second transaction or merchant category.

Additionally or alternatively, the method may further include determining, by the one or more processors, that no significant fraud risk is associated with another particular financial transaction associated with the financial account, at least by using the fraud detection rules and (i) the identified one or more spending patterns specific to the first cardholder and/or (ii) the identified one or more spending patterns specific to the second cardholder.

Additionally or alternatively, the method may further include generating or updating the fraud detection rules at least by training a machine learning program using at least (i) financial activity data associated with a plurality of other cardholders not associated with the financial account, and (ii) fraud determinations each corresponding to a respective one of a plurality of other financial accounts associated with the plurality of other cardholders.

Additionally or alternatively, causing a fraud alert or confirmation to be displayed to one or more people via one or more respective computing device user interfaces may include transmitting data indicative of the fraud alert or confirmation from the one or more servers to a remote computing device of the first cardholder for display to the first cardholder via a user interface of the remote computing device.

In another aspect, a computer-implemented method, implemented in one or more servers or other computing devices, of automating a fraud classification process may include (1) generating or updating, by one or more processors of the one or more servers, fraud classification rules, at least by training a machine learning program using at least (i) fraud classifications made in connection with a plurality of financial accounts, wherein the fraud classifications may include at least two different classifications corresponding to different types of fraud, and (ii) financial transaction data associated with the plurality of financial accounts; (2) retrieving, by the one or more processors, first financial transaction data associated with a first financial account; (3) selecting, by the one or more processors applying the fraud classification rules to the first financial transaction data, a first fraud classification indicating a type of fraud potentially associated with the first financial account, wherein the first fraud classification may be selected from among a plurality of predetermined fraud classifications, and wherein the plurality of predetermined fraud classifications may include at least the two different classifications corresponding to different types of fraud; and/or (4) causing, by the one or more processors, an indication of the first fraud classification to be displayed to one or more people via one or more respective computing device user interfaces, wherein the indication may further specify at least the first financial account. The method may include additional, fewer or alternative actions, such as any of those discussed elsewhere herein.

For instance, selecting a first fraud classification may include selecting (i) a classification indicating counterfeit activity, (ii) a classification indicating forgery, (iii) a classification indicating account takeover activity, (iv) a classification indicating fraudulent chargeback activity, (v) a classification indicating skimming activity, or (vi) a classification indicating a fraudulent application.

Additionally or alternatively, the method may further include calculating, by the one or more processors, one or more statistics indicative of a distribution of different fraud types using the first fraud classification and a plurality of other fraud classifications associated with a plurality of other financial accounts. Additionally or alternatively, the method may further include receiving an indication that one or more financial transactions associated with the first financial account have been flagged as potentially involving fraud, and/or retrieving the first financial transaction data may be in response to receiving the indication that the one or more financial transactions associated with the first financial account have been flagged.

Additionally or alternatively, generating or updating the fraud classification rules may include training the machine learning program using at least (i) the fraud classifications made in connection with the plurality of financial accounts, (ii) the financial transaction data associated with the plurality of financial accounts, and (iii) online activity data associated with holders of the plurality of financial accounts.

Additionally or alternatively, the method may further include retrieving, by the one or more processors, first online activity data associated with a holder of the first financial account, and/or selecting the first fraud classification may be performed by the one or more processors applying the fraud classification rules to (i) the first financial transaction data and (ii) the first online activity data.

Additionally or alternatively, (1) generating or updating the fraud classification rules may include training the machine learning program using at least (i) the fraud classifications made in connection with the plurality of financial accounts, (ii) the financial transaction data associated with the plurality of financial accounts, and (iii) location data indicating geographic locations of holders of the plurality of financial accounts; (2) the method may further include retrieving, by the one or more processors, first location data indicating geographic locations of a holder of the first financial account; and/or (3) selecting the first fraud classification may be performed by the one or more processors applying the fraud classification rules to (i) the first financial transaction data and (ii) the first location data.

VIII. Exemplary System Embodiments

In one aspect, a computer system for using customer online activity to detect financial fraud may include (1) an online activity database configured to store historical online activity data; (2) a rules database configured to store first fraud detection rules; (3) one or more processors; and/or (4) a non-transitory memory. The non-transitory memory stores instructions that, when executed by the one or more processors, may cause the one or more processors to (1) determine that a fraud risk is associated with a particular financial transaction, wherein the particular financial transaction may be associated with a financial account, (2) retrieve, from the online activity database, first online activity data indicative of past online activity of one or more customers associated with the financial account, (3) determine, by applying the first fraud detection rules stored in the rules database to the first online activity data, that the fraud risk cannot be ruled out as a false positive, at least by determining whether the past online activity indicates interest, by any of the one or more customers, in (i) a product or service associated with the particular financial transaction and/or (ii) a merchant associated with the particular financial transaction, and/or (4) in response to determining that the fraud risk cannot be ruled out as a false positive, cause a fraud alert or confirmation to be displayed to one or more people via one or more respective computing device user interfaces, wherein the fraud alert or confirmation may specify at least the particular financial transaction. The system may include additional, fewer or alternative components, features and/or functionality, such as any of those discussed elsewhere herein.

For instance, the system may further include an account records database. The rules database may be further configured to store second fraud detection rules. The instructions may cause the one or more processors to determine that the fraud risk is associated with the particular financial transaction at least by applying the second fraud detection rules stored in the rules database to a data record, in the account records database, that is associated with the financial account, and/or the instructions may cause the one or more processors to apply the second fraud detection rules stored in the rules database to the data record at least by (i) analyzing a dollar amount of the particular financial transaction and/or (ii) analyzing a geographic location at which the particular financial transaction was initiated.

Additionally or alternatively, the financial account may be a credit or debit card account associated with a particular card network entity. Additionally or alternatively, applying the second fraud detection rules may further include analyzing a fraud score provided by the particular card network entity.

Additionally or alternatively, the instructions may cause the one or more processors to determine that the fraud risk is associated with the particular financial transaction at least by (i) determining whether the dollar amount is above a threshold value and (ii) comparing the geographic location at which the particular financial transaction was initiated to a geographic location associated with a residence of at least one of the one or more customers.

Additionally or alternatively, the instructions may cause the one or more processors to determine that the fraud risk cannot be ruled out as a false positive at least by: (i) determining whether one or more web sites visited by at least one of the one or more customers indicate interest in (a) the product or service associated with the particular financial transaction and/or (b) the merchant associated with the particular financial transaction; (ii) determining whether one or more selections made by at least one of the one or more customers via one or more websites are indicative of interest in (a) the product or service associated with the particular financial transaction and/or (b) the merchant associated with the particular financial transaction; and/or (iii) determining whether at least one of the one or more customers endorsed one or both of (a) the product or service associated with the particular financial transaction, and (b) the merchant associated with the particular financial transaction, via a social media account.

Additionally or alternatively, the instructions may cause the one or more processors to: (1) determine that the fraud risk is associated with the particular financial transaction at least by determining that a geographic location at which the particular financial transaction was initiated is different than a geographic location associated with a residence of at least one of the one or more customers; and/or (2) determine that the fraud risk cannot be ruled out as a false positive at least by (i) determining that at least one of the one or more customers checked in to a flight to an airport proximate to the geographic location at which the particular financial transaction was initiated, and/or (ii) determining that one or more websites visited by at least one of the one or more customers are associated with the geographic location at which the particular financial transaction was initiated.

Additionally or alternatively, the instructions may further cause the one or more processors to generate or update the first fraud detection rules at least by training a machine learning program using at least (i) online activity data associated with a plurality of other financial accounts, and (ii) fraud determinations each corresponding to a respective one of the plurality of other financial accounts.

In another aspect, a computer system for using individual cardholder spending patterns to detect financial fraud relating to a financial account associated with multiple cardholders may include (1) an account records database configured to store data associated with a plurality of financial accounts; (2) a rules database configured to store fraud detection rules; (3) one or more processors; and/or (3) a non-transitory memory. The non-transitory memory stores instructions that, when executed by the one or more processors, may cause the one or more processors to (1) identify a plurality of cardholders associated with the financial account; (2) retrieve, from the account records database, financial activity data indicative of a plurality of past financial transactions associated with the financial account; (3) use the financial activity data to identify one or more spending patterns specific to a first cardholder of the plurality of cardholders; (4) use the financial activity data to identify one or more spending patterns specific to a second cardholder of the plurality of cardholders; (5) determine that a fraud risk is associated with a particular financial transaction associated with the financial account, at least by using (i) the fraud detection rules stored in the rules database, (ii) the identified one or more spending patterns specific to the first cardholder, and (iii) the identified one or more spending patterns specific to the second cardholder; and/or (6) cause a fraud alert or confirmation to be displayed to one or more people via one or more respective computing device user interfaces, the fraud alert or confirmation specifying at least the particular financial transaction. The system may include additional, fewer or alternative components, features and/or functionality, such as any of those discussed elsewhere herein.

For instance, the one or more spending patterns specific to the first cardholder may include a maximum dollar amount likely to be spent by the first cardholder in a single financial transaction, and/or the one or more spending patterns specific to the second cardholder may include a maximum dollar amount likely to be spent by the second cardholder in a single financial transaction.

Additionally or alternatively, the one or more spending patterns specific to the first cardholder may include a maximum dollar amount likely to be spent by the first cardholder in a particular time span, and/or the one or more spending patterns specific to the second cardholder may include a maximum dollar amount likely to be spent by the second cardholder in the particular time span.

Additionally or alternatively, the one or more spending patterns specific to the first cardholder may include a likelihood that the first cardholder would make a financial transaction via a first card information entry mode, and/or the one or more spending patterns specific to the second cardholder may include a likelihood that the second cardholder would make a financial transaction via the first card information entry mode.

Additionally or alternatively, the one or more spending patterns specific to the first cardholder may include a likelihood that the first cardholder would purchase a product or service corresponding to a first transaction or merchant category, and/or the one or more spending patterns specific to the second cardholder may include a likelihood that the second cardholder would purchase a product or service corresponding to the first transaction or merchant category.

In another aspect, a computer system for automating a fraud classification process may include (1) an account records database configured to store data associated with a plurality of financial accounts; (2) a rules database configured to store fraud classification rules; (3) one or more processors; and/or (4) a non-transitory memory. The non-transitory memory stores instructions that, when executed by the one or more processors, may cause the one or more processors to (1) generate or update the fraud classification rules, at least by training a machine learning program using at least (i) fraud classifications made in connection with a plurality of financial accounts, wherein the fraud classifications may include at least two different classifications corresponding to different types of fraud, and (ii) financial transaction data associated with the plurality of financial accounts; (2) retrieve, from the account records database, first financial transaction data associated with a first financial account; (3) select, by applying the fraud classification rules stored in the rules database to the first financial transaction data, a first fraud classification indicating a type of fraud potentially associated with the first financial account, wherein the first fraud classification may be selected from among a plurality of predetermined fraud classifications, and wherein the plurality of predetermined fraud classifications may include at least the two different classifications corresponding to different types of fraud; and/or (4) cause an indication of the first fraud classification to be displayed to one or more people via one or more respective computing device user interfaces, wherein the indication may further specify at least the first financial account. The system may include additional, fewer or alternative components, features and/or functionality, such as any of those discussed elsewhere herein.

For instance, the first fraud classification may include at least one of (i) a classification indicating counterfeit activity, (ii) a classification indicating forgery (iii) a classification indicating account takeover activity, (iv) a classification indicating fraudulent chargeback activity, (v) a classification indicating skimming activity, or (vi) a classification indicating a fraudulent application. Additionally or alternatively, the instructions may further cause the one or more processors to calculate one or more statistics indicative of a distribution of different fraud types using the first fraud classification and a plurality of other fraud classifications associated with a plurality of other financial accounts.

Additionally or alternatively, the instructions may further cause the one or more processors to receive an indication that one or more financial transactions associated with the first financial account have been flagged as potentially involving fraud, and/or the instructions may cause the one or more processors to retrieve the first financial transaction data in response to receiving the indication that the one or more financial transactions associated with the first financial account have been flagged. Additionally or alternatively, the instructions may cause the one or more processors to generate or update the fraud classification rules at least by training the machine learning program using at least (i) the fraud classifications made in connection with the plurality of financial accounts, (ii) the financial transaction data associated with the plurality of financial accounts, and (iii) online activity data associated with holders of the plurality of financial accounts.

Additionally or alternatively, the instructions may further cause the one or more processors to retrieve first online activity data associated with a holder of the first financial account, and/or the instructions may cause the one or more processors to select the first fraud classification by applying the fraud classification rules stored in the rules database to (i) the first financial transaction data and (ii) the first online activity data. Additionally or alternatively, the instructions may cause the one or more processors to generate or update the fraud classification rules at least by training the machine learning program using at least (i) the fraud classifications made in connection with the plurality of financial accounts, (ii) the financial transaction data associated with the plurality of financial accounts, and (iii) location data indicating geographic locations of holders of the plurality of financial accounts, and/or the instructions may further cause the one or more processors to (1) retrieve first location data indicating geographic locations of a holder of the first financial account; and/or (2) select the first fraud classification by applying the fraud classification rules to (i) the first financial transaction data and (ii) the first location data.

IX. Exemplary Computer-Readable Medium Embodiments

In one aspect, a non-transitory, computer-readable medium stores instructions that, when executed by one or more processors, may cause the one or more processors to: (1) determine that a fraud risk is associated with a particular financial transaction, wherein the particular financial transaction may be associated with a financial account; (2) retrieve, from a database storing historical online activity data, first online activity data indicative of past online activity of one or more customers associated with the financial account; (3) determine, by applying first fraud detection rules to the first online activity data, that the fraud risk cannot be ruled out as a false positive, wherein determining that the fraud risk cannot be ruled out as a false positive may include determining whether the past online activity indicates interest, by any of the one or more customers, in (i) a product or service associated with the particular financial transaction and/or (ii) a merchant associated with the particular financial transaction; and (4) in response to determining that the fraud risk cannot be ruled out as a false positive, cause a fraud alert or confirmation to be displayed to one or more people via one or more respective computing device user interfaces, wherein the fraud alert or confirmation may specify at least the particular financial transaction. The computer-readable medium may store instructions that include additional, fewer or alternative actions, such as any of those discussed elsewhere herein.

For instance, the instructions may cause the one or more processors to: (1) determine that the fraud risk is associated with the particular financial transaction at least by applying the second fraud detection rules to a data record, in an account records database, that is associated with the financial account; and/or (2) apply the second fraud detection rules to the data record at least by (i) analyzing a dollar amount of the particular financial transaction and/or (ii) analyzing a geographic location at which the particular financial transaction was initiated.

Additionally or alternatively, the instructions may cause the one or more processors to determine that the fraud risk is associated with the particular financial transaction at least by (i) determining whether the dollar amount is above a threshold value and (ii) comparing the geographic location at which the particular financial transaction was initiated to a geographic location associated with a residence of at least one of the one or more customers.

In another aspect, a non-transitory, computer-readable medium stores instructions that, when executed by one or more processors, may cause the one or more processors to: (1) identify a plurality of cardholders associated with a financial account; (2) retrieve, from an account records database, financial activity data indicative of a plurality of past financial transactions associated with the financial account; (3) use the financial activity data to identify one or more spending patterns specific to a first cardholder of the plurality of cardholders; (4) use the financial activity data to identify one or more spending patterns specific to a second cardholder of the plurality of cardholders; (5) determine that a fraud risk is associated with a particular financial transaction associated with the financial account, at least by using (i) fraud detection rules stored in a rules database, (ii) the identified one or more spending patterns specific to the first cardholder, and (iii) the identified one or more spending patterns specific to the second cardholder; and/or (6) cause a fraud alert or confirmation to be displayed to one or more people via one or more respective computing device user interfaces, wherein the fraud alert or confirmation may specify at least the particular financial transaction. The computer-readable medium may store instructions that include additional, fewer or alternative actions, such as any of those discussed elsewhere herein.

For instance, the one or more spending patterns specific to the first cardholder may include a maximum dollar amount likely to be spent by the first cardholder in a single financial transaction, and/or the one or more spending patterns specific to the second cardholder may include a maximum dollar amount likely to be spent by the second cardholder in a single financial transaction. Additionally or alternatively, the one or more spending patterns specific to the first cardholder may include a maximum dollar amount likely to be spent by the first cardholder in a particular time span, and/or the one or more spending patterns specific to the second cardholder may include a maximum dollar amount likely to be spent by the second cardholder in the particular time span.

Additionally or alternatively, the one or more spending patterns specific to the first cardholder may include a likelihood that the first cardholder would make a financial transaction via a first card information entry mode, and/or the one or more spending patterns specific to the second cardholder may include a likelihood that the second cardholder would make a financial transaction via the first card information entry mode. Additionally or alternatively, the one or more spending patterns specific to the first cardholder may include a likelihood that the first cardholder would purchase a product or service corresponding to a first transaction or merchant category, and/or the one or more spending patterns specific to the second cardholder may include a likelihood that the second cardholder would purchase a product or service corresponding to the first transaction or merchant category.

In another aspect, a non-transitory, computer-readable medium stores instructions that, when executed by one or more processors, may cause the one or more processors to (1) generate or update fraud classification rules, at least by training a machine learning program using at least (i) fraud classifications made in connection with a plurality of financial accounts, wherein the fraud classifications may include at least two different classifications corresponding to different types of fraud, and (ii) financial transaction data associated with the plurality of financial accounts; (2) retrieve, from an account records database, first financial transaction data associated with a first financial account; (3) select, by applying the fraud classification rules to the first financial transaction data, a first fraud classification indicating a type of the fraud associated with the first financial account, wherein the first fraud classification may be selected from among a plurality of predetermined fraud classifications, and wherein the plurality of predetermined fraud classifications may include at least the two different classifications corresponding to different types of fraud; and/or (4) cause an indication of the first fraud classification to be displayed to one or more people via one or more respective computing device user interfaces, wherein the indication may further specify at least the first financial account. The computer-readable medium may store instructions that include additional, fewer or alternative actions, such as any of those discussed elsewhere herein.

For instance, the first fraud classification may include at least one of (i) a classification indicating counterfeit activity, (ii) a classification indicating forgery (iii) a classification indicating account takeover activity, (iv) a classification indicating fraudulent chargeback activity, (v) a classification indicating skimming activity, or (vi) a classification indicating a fraudulent application.

Additionally or alternatively, the instructions may further cause the one or more processors to calculate one or more statistics indicative of a distribution of different fraud types using the first fraud classification and a plurality of other fraud classifications associated with a plurality of other financial accounts. Additionally or alternatively, the instructions may further cause the one or more processors to receive an indication that one or more financial transactions associated with the first financial account have been flagged as potentially involving fraud, and/or the instructions may cause the one or more processors to retrieve the first financial transaction data in response to receiving the indication that the one or more financial transactions associated with the first financial account have been flagged.

Additionally or alternatively, the instructions may cause the one or more processors to generate or update the fraud classification rules at least by training the machine learning program using at least (i) the fraud classifications made in connection with the plurality of financial accounts, (ii) the financial transaction data associated with the plurality of financial accounts, and (iii) online activity data associated with holders of the plurality of financial accounts. Additionally or alternatively, the instructions may further cause the one or more processors to retrieve first online activity data associated with a holder of the first financial account, and/or the instructions may cause the one or more processors to select the first fraud classification by applying the fraud classification rules to (i) the first financial transaction data and (ii) the first online activity data.

X. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method of detecting whether electronic fraud alerts are false positives prior to transmission to customer mobile devices based upon customer data, the method comprising:

training a first machine learning program using fraud classifications made in connection with at least one of a type of transaction data or a value of transaction data associated with a plurality of financial accounts, such that the first machine learning program learns a characteristic of the transaction data that is indicative of different fraud classifications;

receiving, by one or more processors, transaction data detailing a financial transaction associated with a customer, the data detailing the financial transaction being transmitted from a merchant computer terminal;

inputting, by the one or more processors, the data detailing the financial transaction into a rules-based engine that determines whether to generate an electronic fraud alert for the financial transaction based upon the data detailing the financial transaction;

when an electronic fraud alert is generated for the financial transaction, inputting, by the one or more processors, the data detailing the financial transaction into the first machine learning program, and determining, using the trained first machine learning program and based at least in part on a type of the transaction data or a value of the transaction data, a reason why the electronic fraud alert was generated, wherein the reason is a lost or stolen card, account takeover, a counterfeit card, or application fraud;

determining, by the one or more processors, that the reason why the electronic fraud alert was generated can be verified by customer data;

in response to determining that the reason can be verified by customer data, retrieving or receiving, by the one or more processors, first customer data;

verifying, by the one or more processors, that the electronic fraud alert is not a false positive based upon analysis of the first customer data; and transmitting, by one or more transceivers, the electronic fraud alert to a mobile device of the customer.

2. The computer-implemented method of claim 1, wherein the first customer data is associated with one or both of (i) a date of the financial transaction and (ii) a time of the financial transaction.

3. The computer-implemented method of claim 1, wherein the first customer data is associated with, or generated and transmitted by, a customer vehicle or a customer mobile device.

4. The computer-implemented method of claim 1, wherein the first customer data is associated with a customer location during one or both of (i) a date of the financial transaction and (ii) a time of the financial transaction.

5. The computer-implemented method of claim 1, wherein the first customer data is associated with customer online shopping activity or online customer online browsing activity.

6. The computer-implemented method of claim 1, wherein the first customer data is associated with customer shopping preferences or history, customer preferences for types of products or services, or customer-preferred merchants.

7. The computer-implemented method of claim 1, wherein verifying, by the one or more processors, that the electronic fraud alert is not a false positive based upon analysis of the first customer data includes inputting, by the one or more processors, the first customer data into a second machine learning program that is trained to verify whether electronic fraud alerts are false positives using customer data.

8. The computer-implemented method of claim 7, wherein the second machine learning program that is trained to verify whether electronic fraud alerts are false positives using customer data uses the first customer data to verify customer location at one or both of (i) a date of the financial transaction and (ii) a time of the financial transaction.

9. The computer-implemented method of claim 7, wherein the second machine learning program that is trained to verify whether electronic fraud alerts are false positives using customer data uses the first customer data to verify that customer browsing activity is related to a type of product or service purchased by the financial transaction.

10. The computer-implemented method of claim 1, wherein the identified one or more facts that caused the electronic fraud alert to be generated include one or more of:

a transaction amount;

a transaction type;

a transaction location or merchant location;

a merchant identity;

a merchant type; or a number or frequency of transactions.

11. The computer-implemented method of claim 1, wherein the identified one or more facts that caused the electronic fraud alert to be generated include one or more of:
   a type of card;
   a card issuer;
   a debit or credit card number;
   a cardholder name;
   a merchant;
   a merchant location;
   a transaction location;
   a transaction amount; or
   a type of transaction.

12. The computer-implemented method of claim 1, wherein verifying that the electronic fraud alert is not a false positive based upon analysis of the customer data includes comparing transaction location data or merchant location data associated with the data detailing the financial transaction to a customer location associated with the customer data to determine a mismatch, and wherein the customer data includes one or both of (i) data from the mobile device of the customer and (ii) vehicle GPS location data.

13. The computer-implemented method of claim 1, wherein verifying that the electronic fraud alert is not a false positive based upon analysis of the customer data includes comparing (i) a purchased item, identified using the data detailing the financial transaction, to (ii) previous items purchased by the customer, or items reviewed by the customer as identified by online browsing activity, to identify an unusual or unexpected item purchased.

14. The computer-implemented method of claim 1, wherein verifying that the electronic fraud alert is not a false positive based upon analysis of the customer data includes comparing a transaction amount identified by the data detailing the financial transaction to a purchasing history of the customer to identify an unusual or unexpected transaction amount or transaction.

15. A computer-implemented method of detecting whether electronic fraud alerts are false positives prior to transmission to customer mobile devices based upon customer data, the method comprising:
   training a machine learning program using fraud classifications made in connection with at least one of a type of transaction data or a value of transaction data associated with a plurality of financial accounts, such that the machine learning program learns a characteristic of the transaction data that is indicative of different fraud classifications;
   receiving, by one or more processors, transaction data detailing a financial transaction associated with a customer, the data detailing the financial transaction being transmitted from a merchant computer terminal;
   inputting, by the one or more processors, the data detailing the financial transaction into a rules-based engine that determines whether to generate an electronic fraud alert for the financial transaction based upon the data detailing the financial transaction;
   when an electronic fraud alert is generated for the financial transaction,
      inputting, by the one or more processors, the data detailing the financial transaction into the machine learning program, and
      determining, using the trained machine learning program and based at least in part on a type of the transaction data or a value of the transaction data, a reason why the electronic fraud alert was generated, wherein the reason is a lost or stolen card, account takeover, a counterfeit card, or application fraud;
   determining, by the one or more processors, that the reason why the electronic fraud alert was generated can be verified by customer data;
   in response to determining that the reason can be verified by customer data, retrieving or receiving, by the one or more processors, first customer data;
   verifying, by the one or more processors, that the electronic fraud alert is not a false positive based upon analysis of the first customer data; and
   transmitting, by one or more transceivers, the electronic fraud alert to a mobile device of the customer.

16. A computer system configured to detect whether electronic fraud alerts are false positives prior to transmission to customer mobile devices based upon customer data, wherein the computer system comprises one or more processors and one or more transceivers and is configured to:
   training a machine learning program using fraud classifications made in connection with at least one of a type of transaction data or a value of transaction data associated with a plurality of financial accounts, such that the first machine learning program learns a characteristic of transaction data that is indicative of different fraud classifications;
   receive transaction data detailing a financial transaction associated with a customer, the data detailing the financial transaction being transmitted from a merchant computer terminal;
   input the data detailing the financial transaction into a rules-based engine that determines whether to generate an electronic fraud alert for the financial transaction based upon the data detailing the financial transaction;
   when an electronic fraud alert is generated for the financial transaction,
      input the data detailing the financial transaction into the machine learning program, and
      determining, using the trained machine learning program and based at least in part on a type of the transaction data or a value of the transaction data, a reason why the electronic fraud alert was generated, wherein the reason is a lost or stolen card, account takeover, a counterfeit card, or application fraud;
   determine that the reason why the electronic fraud alert was generated can be verified by customer data;
   in response to determining that the reason can be verified by customer data, retrieve or receive first customer data;
   verify that the electronic fraud alert is not a false positive based upon analysis of the first customer data; and
   transmit the electronic fraud alert to a mobile device of the customer.

17. The computer system of claim 16, wherein the first customer data is associated with a one or both of (i) a date of the financial transaction and (ii) a time of the financial transaction.

18. The computer system of claim 16, wherein the first customer data is associated with, or generated and transmitted by, a customer vehicle or a customer mobile device.

19. The computer system of claim 16, wherein the first customer data is associated with a customer location during one or both of (i) a date of the financial transaction and (ii) a time of the financial transaction.

20. The computer system of claim 16, wherein the first customer data is associated with customer online shopping activity or online customer online browsing activity.

* * * * *